United States Patent
Rice et al.

(10) Patent No.: US 10,592,971 B2
(45) Date of Patent: *Mar. 17, 2020

(54) DATA-DRIVEN COLOR COORDINATOR

(71) Applicant: Behr Process Corporation, Santa Ana, CA (US)

(72) Inventors: Mary Rose Rice, Laguna Niguel, CA (US); Damien Reynolds, Huntington Beach, CA (US)

(73) Assignee: Behr Process Corporation, Santa Ana, CA (US)

(*) Notice: Subject to any disclaimer, the term of this patent is extended or adjusted under 35 U.S.C. 154(b) by 748 days.

This patent is subject to a terminal disclaimer.

(21) Appl. No.: 15/051,492

(22) Filed: Feb. 23, 2016

(65) Prior Publication Data

US 2016/0171598 A1    Jun. 16, 2016

Related U.S. Application Data

(63) Continuation of application No. 14/489,264, filed on Sep. 17, 2014, now abandoned, which is a
(Continued)

(51) Int. Cl.
*G09G 5/06* (2006.01)
*G06T 11/00* (2006.01)
(Continued)

(52) U.S. Cl.
CPC ....... *G06Q 30/0643* (2013.01); *G06F 3/0416* (2013.01); *G06F 3/0482* (2013.01);
(Continued)

(58) Field of Classification Search
None
See application file for complete search history.

(56) References Cited

U.S. PATENT DOCUMENTS 2,203,167 A   6/1940 Lodwick
4,112,594 A   9/1978 Impastato
(Continued)

FOREIGN PATENT DOCUMENTS

CN   1317521 A   10/2001
CN   1371073 A   9/2002
(Continued)

OTHER PUBLICATIONS

Fernando Lozano, Introduction to Relational Database Design, 2002, http://web.archive.org/web/20021208171737/http://www.edm2.com/0612/msql7.html.
(Continued)

*Primary Examiner* — Tize Ma
(74) *Attorney, Agent, or Firm* — Harness, Dickey & Pierce, P.L.C.

(57) ABSTRACT

A color selection and coordination system including a database of predetermined color relationships implementing a data-driven color model. A starting color is associated with a first color in the color database. One or more predefined color palettes associated with the first color may be retrieved, each palette including one or more coordinating colors, the coordinating colors being predetermined based on the first color and a color coordination algorithm.

29 Claims, 47 Drawing Sheets

Related U.S. Application Data continuation of application No. 13/298,186, filed on Nov. 16, 2011, now Pat. No. 9,330,410, which is a continuation of application No. 12/573,303, filed on Oct. 5, 2009, now Pat. No. 8,063,912, which is a continuation of application No. 11/789,276, filed on Apr. 23, 2007, now Pat. No. 7,605,824, which is a continuation of application No. 10/703,351, filed on Nov. 6, 2003, now Pat. No. 7,230,629.

(51) Int. Cl.

| | | |
|---|---|---|
| *G01J 3/46* | (2006.01) | |
| *G06Q 30/06* | (2012.01) | |
| *G06F 16/532* | (2019.01) | |
| *G06F 16/2455* | (2019.01) | |
| *G06Q 30/02* | (2012.01) | |
| *G06F 3/0484* | (2013.01) | |
| *G06F 3/0482* | (2013.01) | |
| *G06F 3/0488* | (2013.01) | |
| *G06F 3/041* | (2006.01) | |

(52) U.S. Cl.
CPC ........ *G06F 3/0488* (2013.01); *G06F 3/04842* (2013.01); *G06F 16/2455* (2019.01); *G06F 16/532* (2019.01); *G06Q 30/02* (2013.01); *G06Q 30/0621* (2013.01); *G06Q 30/0631* (2013.01); *G06T 11/001* (2013.01); *G09G 5/06* (2013.01); *G09G 2354/00* (2013.01)

(56) References Cited

U.S. PATENT DOCUMENTS

| | | | |
|---|---|---|---|
| 4,665,394 A | | 5/1987 | Coles et al. |
| 4,696,400 A | | 9/1987 | Warman |
| 4,794,382 A | | 12/1988 | Lai et al. |
| 4,931,929 A | | 6/1990 | Sherman |
| 5,103,407 A | | 4/1992 | Gabor |
| 5,254,978 A | | 10/1993 | Beretta |
| 5,291,395 A | | 3/1994 | Abecassis |
| 5,311,212 A | | 5/1994 | Beretta |
| 5,367,627 A | | 11/1994 | Johnson |
| H1506 H | | 12/1995 | Beretta |
| 5,473,738 A | | 12/1995 | Hamlin et al. |
| 5,504,499 A | | 4/1996 | Horie et al. |
| 5,615,320 A | | 3/1997 | Lavendel |
| 5,615,342 A | | 3/1997 | Johnson |
| 5,708,780 A | | 1/1998 | Levergood et al. |
| 5,751,829 A | | 5/1998 | Ringland et al. |
| 5,949,411 A | | 9/1999 | Doerr et al. |
| 5,953,725 A | | 9/1999 | Eprahim et al. |
| 5,960,411 A | | 9/1999 | Hartman et al. |
| 6,081,253 A | | 6/2000 | Luke et al. |
| 6,122,391 A | | 9/2000 | Ringland et al. |
| 6,270,123 B1 | | 8/2001 | Spangler |
| 6,331,858 B2 | | 12/2001 | Fisher |
| 6,343,264 B1 | | 1/2002 | Fenton et al. |
| D460,785 S | | 7/2002 | Rice |
| D460,986 S | | 7/2002 | Rice |
| D461,848 S | | 8/2002 | Rice |
| D462,720 S | | 9/2002 | Rice |
| D466,159 S | | 11/2002 | Rice |
| 6,491,750 B1 | | 12/2002 | Pace et al. |
| 6,507,824 B1 | | 1/2003 | Yon et al. |
| D470,191 S | | 2/2003 | Rice |
| 6,522,977 B2 | | 2/2003 | Corrigan et al. |
| 6,563,510 B1 * | | 5/2003 | Rice ........................ G01J 3/46 345/530 |
| 6,572,377 B2 | | 6/2003 | Masters |
| 6,581,109 B1 | | 6/2003 | Fields et al. |
| 6,632,093 B1 | | 10/2003 | Rice et al. |
| 6,727,925 B1 | | 4/2004 | Bourdelais |
| 6,740,154 B2 | | 5/2004 | Pace et al. |
| 6,842,654 B2 | | 1/2005 | Lawn et al. |
| 6,924,814 B1 | | 8/2005 | Ephanov |
| 6,924,817 B2 | | 8/2005 | Rice et al. |
| 6,925,196 B2 | | 8/2005 | Kass et al. |
| 7,034,960 B2 | | 4/2006 | Stone et al. |
| 7,180,524 B1 | | 2/2007 | Axelrod |
| 7,187,386 B2 | | 3/2007 | Rice et al. |
| 7,193,632 B2 | | 3/2007 | Rice et al. |
| 7,230,629 B2 | | 6/2007 | Reynolds et al. |
| 7,330,585 B2 | | 2/2008 | Rice et al. |
| 7,486,300 B2 | | 2/2009 | Rose |
| 7,605,824 B2 | | 10/2009 | Reynolds et al. |
| 7,641,474 B2 | | 1/2010 | Rice |
| 7,999,825 B2 | | 8/2011 | Webb et al. |
| 8,063,912 B2 | | 11/2011 | Reynolds et al. |
| 9,035,966 B2 | | 5/2015 | Rice et al. |
| 9,330,410 B2 | | 5/2016 | Reynolds et al. |
| 2001/0047309 A1 | | 11/2001 | Bartholomew et al. |
| 2002/0002497 A1 | | 1/2002 | Tilman |
| 2002/0006602 A1 * | | 1/2002 | Masters ................ G09B 25/04 434/72 |
| 2002/0059248 A1 | | 5/2002 | Farchione |
| 2002/0062264 A1 | | 5/2002 | Knight |
| 2002/0064302 A1 * | | 5/2002 | Massengill ............ G06Q 50/22 382/128 |
| 2002/0089513 A1 | | 7/2002 | Blanchard et al. |
| 2002/0099725 A1 * | | 7/2002 | Gordon .................. G06Q 10/06 |
| 2002/0123941 A1 | | 9/2002 | Donahue et al. |
| 2002/0184232 A1 | | 12/2002 | Menner et al. |
| 2003/0078794 A1 | | 4/2003 | Knapp |
| 2003/0151611 A1 * | | 8/2003 | Turpin .................. G06F 3/0481 345/589 |
| 2003/0158788 A1 | | 8/2003 | Turpin et al. |
| 2003/0216972 A1 | | 11/2003 | Gotou et al. |
| 2003/0231185 A1 | | 12/2003 | Kupersmit |
| 2004/0004639 A1 | | 1/2004 | Simonis |
| 2004/0046802 A1 | | 3/2004 | Wright |
| 2004/0158505 A1 | | 8/2004 | Kurns et al. |
| 2004/0161727 A1 | | 8/2004 | Brodine |
| 2005/0033662 A1 | | 2/2005 | Buch et al. |
| 2005/0091008 A1 | | 4/2005 | Green et al. |
| 2005/0157926 A1 | | 7/2005 | Moravec |
| 2006/0001677 A1 | | 1/2006 | Webb et al. |
| 2006/0195369 A1 | | 8/2006 | Webb et al. |
| 2008/0228599 A1 | | 9/2008 | Webb et al. |
| 2010/0194776 A1 | | 8/2010 | Chong et al. |
| 2014/0198125 A1 | | 7/2014 | Rice et al. |
| 2014/0375674 A1 | | 12/2014 | Rice et al. |
| 2015/0002533 A1 | | 1/2015 | Rice et al. |
| 2015/0002534 A1 | | 1/2015 | Rice et al. |
| 2015/0002535 A1 | | 1/2015 | Rice et al. |

FOREIGN PATENT DOCUMENTS

| | | |
|---|---|---|
| CN | 1443333 A | 9/2003 |
| FR | 2838593 A1 | 10/2003 |
| JP | H0969959 A | 3/1997 |
| WO | WO-0229628 A2 | 4/2002 |
| WO | WO-03069526 A1 | 8/2003 |

OTHER PUBLICATIONS

Response to official requirements communications in Mexican Patent Application PA/a/2006/005069 dated Nov. 25, 2009—Mexican Office Action Response byJavier Eduardo Lizardi Calderon.
Response to official requirements communications in Mexican Patent Application Pa/a/2006/005069 dated Jul. 9, 2009—Mexican Office Action Response by Luis Burgeno Colin.
Response to official requirements communications in Mexican Patent Application PA/a/2006/005069 dated Sep. 10, 2008—Mexican Office Action Response by Javier Eduardo Lizardi Calderon re: 55733.
Response to official requirements communications in Mexican Patent Application PA/a/2006/005069 dated Sep. 10, 2008—Mexican Office Action Response by Javier Eduardo Lizardi Calderon re: 99968.

(56) References Cited

OTHER PUBLICATIONS

Response to official requirements communications in Mexican Patent Application PA/a/2006/005069 dated Sep. 7, 2006—Mexican Office Action Response by Luis Burgeno Colin.
Statement of Response to Office Action of SIPO dated Nov. 27, 2009 in Chinese Patent Application No. 200480038938.7 by China Science Patent and Trademark Agent Ltd (CSPTAL).
Statement of Response to Office Action of SIPO dated Jul. 24, 2009 in Chinese Patent Application No. 200480038952.7 by China Science Patent and Trademark Agent Ltd (CSPTAL).
Statement of Response to Office Action of SIPO dated Sep. 7, 2010 in Chinese Patent Application No. 200480038952.7 by China Science Patent and Trademark Agent Ltd (CSPTAL).
Statement of Response to Office Action of SIPO dated Jul. 24, 2009 in Chinese Patent Application No. 200480038950.8 by China Science Patent and Trademark Agent Ltd (CSPTAL).
Statement of Response to Office Action of SIPO dated Sep. 7, 2010 in Chinese Patent Application No. 200480038950.8 by China Science Patent and Trademark Agent Ltd (CSPTAL).
Reply to Official Letter in Indian Patent Application 2924/DELNP/2006/165 dated Apr. 9, 2009 by Satya Pal Arora.
Reply to Official Letter in Indian Patent Application 2923/DELNP/2006 dated Dec. 11, 2009 by Satya Pal Arora.
Submission of Written Response After Hearing—Hearing Letter E-E/A/11 dated Jan. 4, 2011 in Indian Patent Application No. 2923/DELNP/2006 by Satya Pal Arora.
Reply to Official Letter in Indian Patent Application 2925/DELNP/2006 dated Apr. 9, 2009 by Satya Pal Arora.
Reply to the EPO Communication pursuant to Article 96(2) dated Sep. 20, 2006 in relation to European Patent Application 04810576.1-2221 by Gilberto L. Petraz.
Reply to the EPO Communication pursuant to Article 96(2) dated Sep. 27, 2006 in relation to European Patent Application 04810469.9-2221 by Gilberto L. Petraz.
Reply to the EPO Communication pursuant to Article 96(2) dated Sep. 20, 2006 in relation to European Patent Application 04800879.1-2221 by Gilberto L. Petraz.
Response to Examiner's Report dated May 5, 2010 in Canadian Patent Application Serial No. 2,544,783 by Michael D. Cooper of Barrigar Intellectual Property Law.
Response to Examiner's Report dated Dec. 29. 2008 in Canadian Patent Application Serial No. 2,544,783 by Anne M. Flanagan of Barrigar Intellectual Property Law.
Response to Examiner's Report dated Sep. 22. 2008 in Canadian Patent Application Serial No. 2,544,778 by Michael D. Cooper of Barrigar Intellectual Property Law.
Response to Examiner's Report dated Jul. 15, 2009 in Canadian Patent Application Serial No. 2,544,778 by Michael D. Cooper of Barrigar Intellectual Property Law.
Amendment After Allowance dated Oct. 4, 2010 in Canadian Patent Application Serial No. 2,544,778 by Michael D. Cooper of Barrigar Intellectual Property Law.
Adrian Reusser, "Vernetzte Fahrscheinautomaten in Los Angeles," tec. Das Technische Magazin von ASCOM, ASCOM Holding, Bern, CH, No. 3. Jan. 1993, 13-15, XP-000435503.
Barnett, Stacie, "Self Service Kiosk News", kiosks.Org, Apr. 1, 2003, 1-2, XP-002322388.
"New Tools to Help Consumers Choose Color", Interior Deocrating, Jul. 14, 2003, 1-1, XP-002322389.
Anon., "Home Depot to Sell Its Wares on Web Sites Beginning in the Fall" (Abstract only), Wall Street Journal, vol. CCXXXII, No. 126, p. A4, Jun. 30, 1999.

Mann, S., "Internet News," Leadership and Organizational Development Journal, vol. 21, No. 1/2, pp. 131-132, 2000.
Anon., "A Home Decorator's Guide," Gleaner, Oct. 25, 2000.
Warner, C., "Web Design: Fundamentals of E-Commerce: Tips to Building a Better Web Site." Bangkok Post, p. 4, Nov. 22, 2000.
Anon., "Web Reviews: Fired Earth," Carpet/Flooring/Retail, p. 39, Jan. 8, 2002.
Slatalla, M., "With Paint, Seeing Isn't Always Believing," New York Times, p. G4, Jun. 26, 2003.
Anon., "Restoration Hardware Increases Conversion Rates Using Scene7's eCatalog and e-Merchandising Solutions; Customers Browsing via eCatalog Have Higher Conversion Rate by 2×," PR Newswire, Mar. 23, 2004.
Anon., "Bonus Issue," Malaysian Business, Apr. 16, 2004.
Milmo, S., "Services Offset Slow Growth: Is Service the Ticket to Growth and Profitability?" Coatings World, vol. 9, No. 8, p. 18, Aug. 2004.
Anon., "Superscape: Virtual Kitchens on the Web from Whirlpool," M2 Presswire, Aug. 4, 1999.
Ledson, S., "Building Suppliers Woo Web-savvy Shoppers," Plastics News, p. 26, Dec. 7, 1999.
Microsoft PhotoDraw 2000 (Microsoft Corp. .COPYRGT. 1995-1999, version 2.0.0. 1229, Screenshots 1-17).
"Painting on Location Lesson—RCW, The Original Real Color Wheel," Jusko, Donald A. http://www.mauigateway.com/.about.donjusko/rcwmap.htm. Last updated Sep. 14, 2003. Accessed on May 2, 2005.
Stacie Barnett, "Self Service Kiosk News," Kiosks.Org, Apr. 1, 2003, 1-2, XP-002322388.
"New Tools to Help Consumers Choose Color," Interior Decorating, Jul. 14, 2003, 1-1, XP-002322389.
Non-Final Office Action regarding U.S. Appl. No. 14/489,308, dated Sep. 5, 2017.
Non-Final Office Action regarding U.S. Appl. No. 14/490,491 dated Sep. 14, 2017.
Non-Final Office Action regarding U.S. Appl. No. 14/491,793, dated Oct. 3, 2017.
Decision on Appeal regarding U.S. Appl. No. 14/490,491, dated Apr. 3, 2017.
Notice of Allowance and Fees Due regarding U.S. Appl. No. 14/490.491, dated Jun. 13, 2017.
Decision on Appeal regarding U.S. Appl. No. 14/491,793, dated May 25, 2017.
Notice of Allowance and Fees Due regarding U.S. Appl. No. 14/491.793, dated Aug. 15, 2017.
Office Action regarding Canadian Patent Application No. 2,950,062 dated Dec. 14, 2017.
First Office Action regarding Chinese Patent Application No. 201610136089.3, dated Dec. 19, 2018. Translation provided by CSPTAL.
Office Action regarding Canadian Patent Application No. 2,950,062, dated Oct. 30, 2018.
Office Action regarding Canadian Patent Application No. 2,950,062, dated Jul. 16, 2019.
Notification of Grant of Ridhgts for Invention Patent regarding Chinese Patent Application No. 201610136089.3, dated Nov. 5, 2019. Translation provided by CSPTAL.
Decision on Appeal regarding U.S. Appl. No. 14/161,135, dated Sep. 26, 2019.
Decision on Appeal regarding U.S. Appl. No. 14/704,708, dated Sep. 30. 2019.

\* cited by examiner

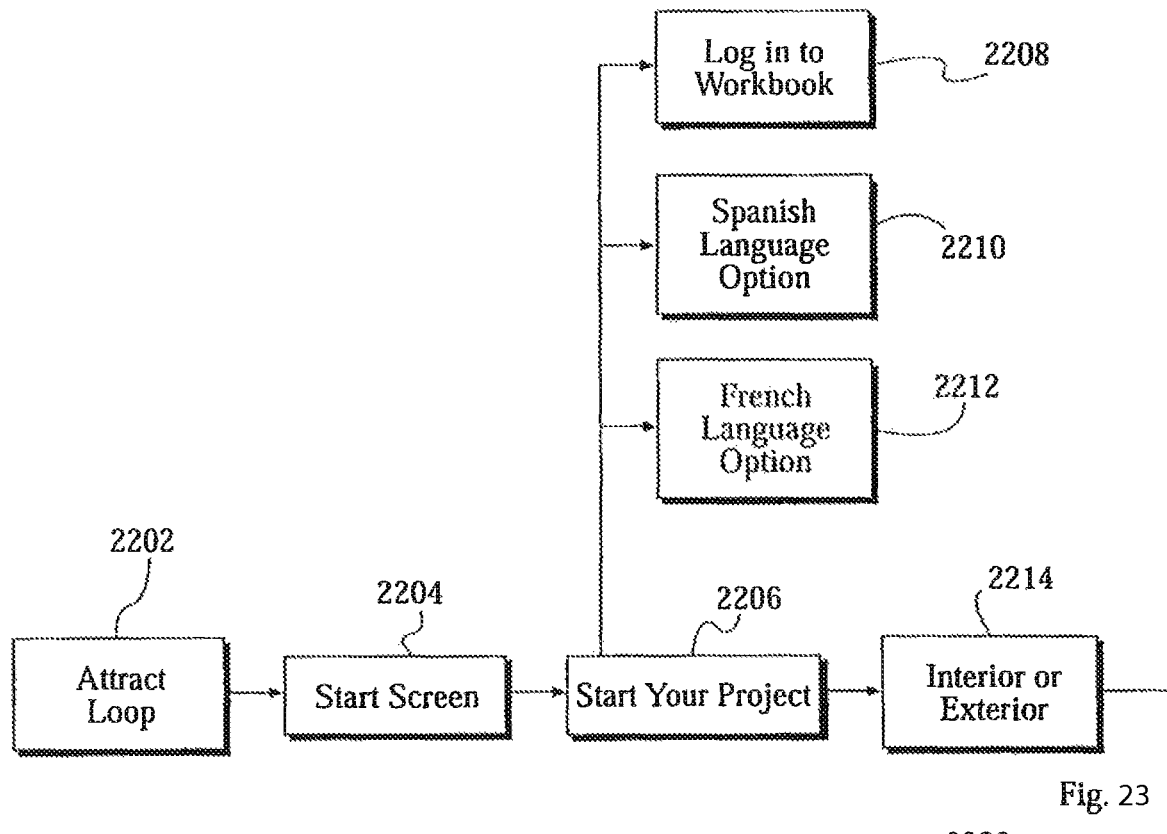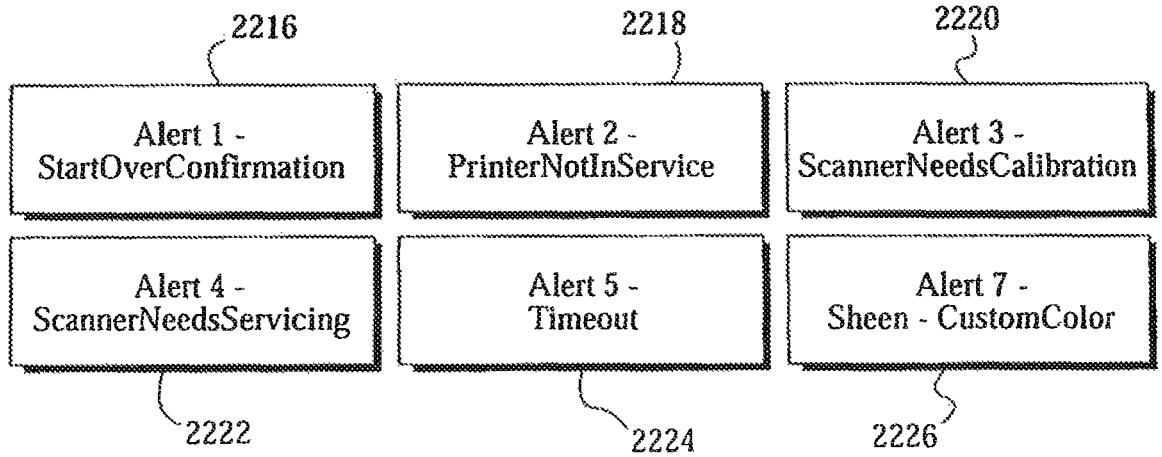
Fig. 22

DATA-DRIVEN COLOR COORDINATOR

RELATED APPLICATIONS

This application is a continuation of U.S. patent application Ser. No. 14/489,264, entitled "Data-Driven Color Coordinator," filed on Sep. 17, 2014, which is a continuation of U.S. patent application Ser. No. 13/298,186, entitled "Data-Driven Color Coordinator," filed on Nov. 16, 2011, which is a continuation of U.S. patent application Ser. No. 12/573,303, entitled "Data-Driven Color Coordinator," filed on Oct. 5, 2009, and issued as U.S. Pat. No. 8,063,912, which is a continuation of U.S. patent application Ser. No. 11/789,276, entitled "Data-Driven Color Coordinator," filed on Apr. 23, 2007, and issued as U.S. Pat. No. 7,605,824, which is a continuation of U.S. patent application Ser. No. 10/703,351, entitled "Data-Driven Color Coordinator," filed on Nov. 6, 2003, and issued as U.S. Pat. No. 7,230,629, the contents of each of the above-listed applications and patents being hereby incorporated herein by reference in their entireties.

FIELD OF THE INVENTION

Various embodiments of the invention pertain to facilitating the selection of harmonious colors. More particularly, at least one embodiment of the invention relates to a distributed system and method for aiding consumers in the selection of complementary paint

DESCRIPTION OF RELATED ART

Consumers typically begin a new painting project because of a desire for change. This typically stems from wanting a new look, being tired of the old look, boredom, seeing an interior elsewhere (e.g., model home tour, friend's house, magazine photo, etc.) to replicate, and/or wanting to match a new piece of furniture, fabric, window treatment, etc. In other instances, a new event or occurrence (e.g., new baby, children growing up or moving out, relatives visiting, water damage from roof leak/flooding, etc.) may motivate a consumer to paint a room or rooms.

The home painting process typically starts with color selection and this is typically the more emotional part of the process. Many consumers are concerned of making a mistake in the color selection process and then having to live with it or do it over.

A paint project involves the selection of one or more colors, which a consumer typically wishes complement each other, the floor, and/or furniture pieces. A consumer may start a paint project with a color in mind, or try to match furniture or other decorative item, or simply be looking for a new color. Regardless of how they start, most consumers want to achieve a decorated look when finished. They typically look to brands, retailers, printed material and even computer programs to help them.

However, because most paint marketing programs often fail to encourage daring or personal color selection, the vast majority of consumers are reluctant to try new colors. Instead, they stick to the standard "whites and neutrals," which, while minimizing the danger of making a mistake, also limits their emotional attachment to the process and the brand.

SUMMARY

One embodiment of the invention provides a color selection and coordination system including a database of predetermined color relationships implementing a data-driven color model. A starting color is associated with a first color in the color database. One or more predefined color palettes associated with the first color are retrieved, each palette including one or more coordinating colors, the coordinating colors being predetermined based on the first color and a color coordination algorithm. The predetermined relationship between one or more colors in the color database enables quick retrieval of colors as well as fast modification of color characteristics such as lightness, darkness, hue, chroma, etc.

BRIEF DESCRIPTION OF THE DRAWINGS

FIG. 22 illustrates a first part of a block diagram for a color coordination and selection application that may be implemented in an in-store kiosk according to one embodiment of the invention.

Figure 1:
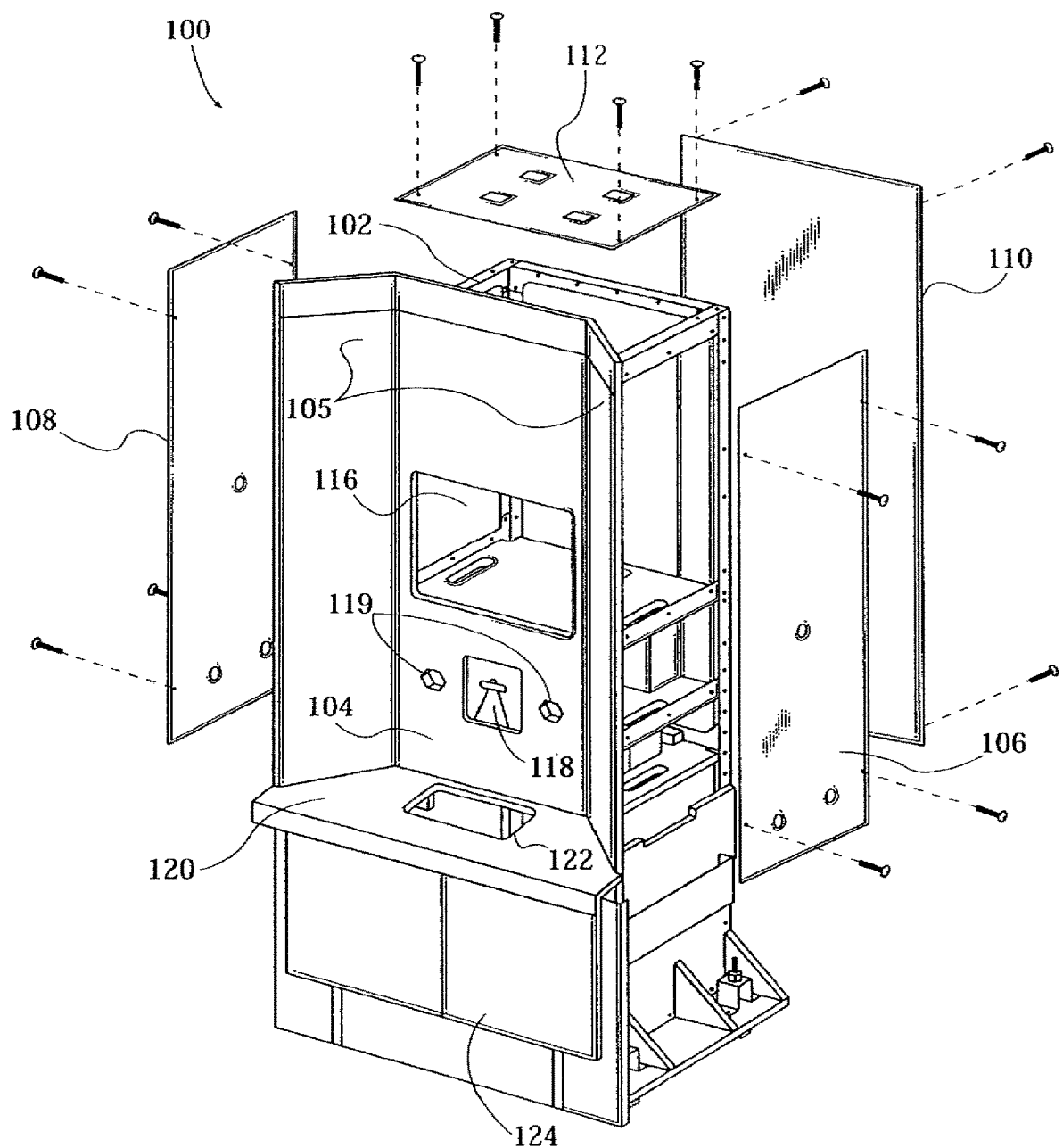
FIG. 1 illustrates a front-side perspective view of the color coordination kiosk cabinet according to one embodiment of an aspect of the invention.

In the following description, certain terminology is used to describe certain features of one or more embodiments of the invention. For instance, "kiosk" includes any type of device, computer, processing unit, etc. The term "color coordination" refers to any system, method, data structure or model, software, and/or device that provides a set of colors that is in harmony with, complement, and/or is aesthetically pleasing when combined with, a starting color. The terms "starting color" and "core color" are interchangeably used to refer to any color that may be selected or provided by a user to coordinate around. The term "hue" refers to the angle of the color when mapped into color space; hue ranges from 0-360 degrees. The term "triad" refers to a color approximately 120 degree from the core color (hue). The terms "complement" or "complementary", such as complementary colors, refers to a color approximately 180 degree from the core color, such that complement plus core equals white. The term "analogous" color refers to a color with a slightly different hue angle but belonging to the same general color area in color space. The term "shade" is a relative term meaning darker color but otherwise similar hue and relative chroma. The term "tint" is a relative term meaning lighter color but otherwise similar hue and relative chroma. The term "color family" refers to colors within a hue range of about 4 to 8 degrees. The term "accent", in painting, refers to a color used to add an interesting splash to a room but is not used consistently across the room. An accent color may be used across the room through other decorative items such as fabrics, etc. In exteriors, doors are often treated as accents. The term "trim", in painting, includes baseboards, windows, crown molding, and fascia boards. A trim color often contrasts with a core color in lightness value and/or hue. The term "depth" is another term for "lightness". The term "warm", such as a warm color or triad, refers to colors that can be associated with fire, such as reds, oranges, and yellows. The term "cool", such as a cool color or triad, refers to colors that can be associated with water, such as blues and greens. Generally, colors that are more green than yellow are cool (and vice versa) and colors that are more red than blue are warm (and vice versa).

DETAILED DESCRIPTION

In the following description numerous specific details are set forth in order to provide a thorough understanding of the invention. However, one skilled in the art would recognize that the invention may be practiced without these specific details. In other instances, well known methods, procedures, and/or components have not been described in detail so as not to unnecessarily obscure aspects of the invention.

In the following description, certain terminology is used to describe certain features of one or more embodiments of the invention. For instance, "kiosk" includes any type of device, computer, processing unit, etc. The term "color coordination" refers to any system, method, data structure or model, software, and/or device that provides a set of colors that is in harmony with, complement, and/or is aesthetically pleasing when combined with, a starting color. The terms "starting color" and "core color" are interchangeably used to refer to any color that may be selected or provided by a user to coordinate around. The term "hue" refers to the angle of the color when mapped into color space; hue ranges from 0-360 degrees. The term "triad" refers to a color approximately 120 degree from the core color (hue). The terms "complement" or "complementary", such as complementary colors, refers to a color approximately 180 degree from the core color, such that complement plus core equals white. The term "analogous" color refers to a color with a slightly different hue angle but belonging to the same general color area in color space. The term "shade" is a relative term meaning darker color but otherwise similar hue and relative chroma. The term "tint" is a relative term meaning lighter color but otherwise similar hue and relative chroma. The term "color family" refers to colors within a hue range of about 4 to 8 degrees. The term "accent", in painting, refers to a color used to add an interesting splash to a room but is not used consistently across the room. An accent color may be used across the room through other decorative items such as fabrics, etc. In exteriors, doors are often treated as accents. The term "trim", in painting, includes baseboards, windows, crown molding, and fascia boards. A trim color often contrasts with a core color in lightness value and/or hue. The term "depth" is another term for "lightness". The term "warm", such as a warm color or triad, refers to colors that can be associated with fire, such as reds, oranges, and yellows. The term "cool", such as a cool color or triad, refers to colors that can be associated with water, such as blues and greens. Generally, colors that are more green than yellow are cool (and vice versa) and colors that are more red than blue are warm (and vice versa).

While various embodiments aspects of the invention refer to a paint selection and coordination system, the present invention is to be interpreted broadly to cover any color selection and/or coordination system, application, and/or device.

Various aspects of the invention provide a novel system for aiding buyers in the selection and coordination of paint colors for various types of paint projects. One aspect of the present invention provides an interactive paint selection system and expert coordinator that provides consumers with a new and unique way of shopping and selecting paint and stain products. The interactive paint selection system and expert coordinator is aimed at encouraging and enabling consumers to unleash their creative powers confidently with products and services that inspire and engage them in home improvement projects.

Another aspect of the invention provides a distributed paint selection and coordination system that permits users to remotely access an automatic and interactive paint coordinator/advisor, setup a project, and select desired colors. A user may access the previously saved project from an in-store kiosk with a very similar graphical user interface. The distributed system permits updating software and data to the in-store kiosks as well as the remote user application.

An interactive system presents a unique opportunity to establish a "one-on one" relationship with customers. However, there are some difficulties particular to the paint industry that makes developing an interactive marketing effort challenging. Foremost is paint's high dependence on color. Consumers are sophisticated enough to know that they can't trust the color on a display screen, which begs the question as to why use a "screen" to pick colors. Color discrepancies should be minimized and the ultimate color choice should be made with traditional means.

Most consumers are uncomfortable choosing colors. They are conscious that any colors they choose are a reflection of themselves. They are afraid to make mistakes that broadcast to their friends and neighbors that they have poor taste. Beyond this fear, consumers yearn to express themselves creatively and confidently. Having a tool that calms their fears, inspires creative expression, and verifies color choices is viewed as an extremely powerful potential feature of the program.

One aspect of the invention provides a paint selection kiosk designed to house an apparatus configured to aid a consumer to select complementary colors. Another aspect of the invention provides a navigation system that permits a user to select a paint color, be provided with a plurality of complementary color combinations, and preview the different complementary color combinations on a sample room or house.

FIG. 1 illustrates a front side perspective view of the paint selection kiosk cabinet 100 according to one embodiment of an aspect of the invention. The paint selection and coordination kiosk 100 includes a cabinet frame 102, which may be made from a metal, wood, and/or other materials, onto which a front panel 104, side panels 106 and 108, a back panel 110 and a pop cover 112 are attached with fasteners. According to one embodiment of the invention, slanted portions 105 may be coupled along the vertical edges of the front panel 104. The front panel 104 may also include a first opening 116 to permit viewing of a display screen that may be mounted within the cabinet 100. Furthermore, the front panel 104 may include a second opening to hold a color-sensing device 118. In one embodiment of the invention, the front panel 104 also includes one or more openings 119 behind which one or more speakers may be mounted.

According to one embodiment of the invention, the front of the paint selection and coordination kiosk 100 may also include a horizontal or semi-horizontal surface 120 with an opening 122 from which printer paper may be collected. Below the horizontal surface 120, a pair of vertically swinging doors 124 enclose a compartment area. The doors may be hung from the cabinet frame 102.

Figure 2:
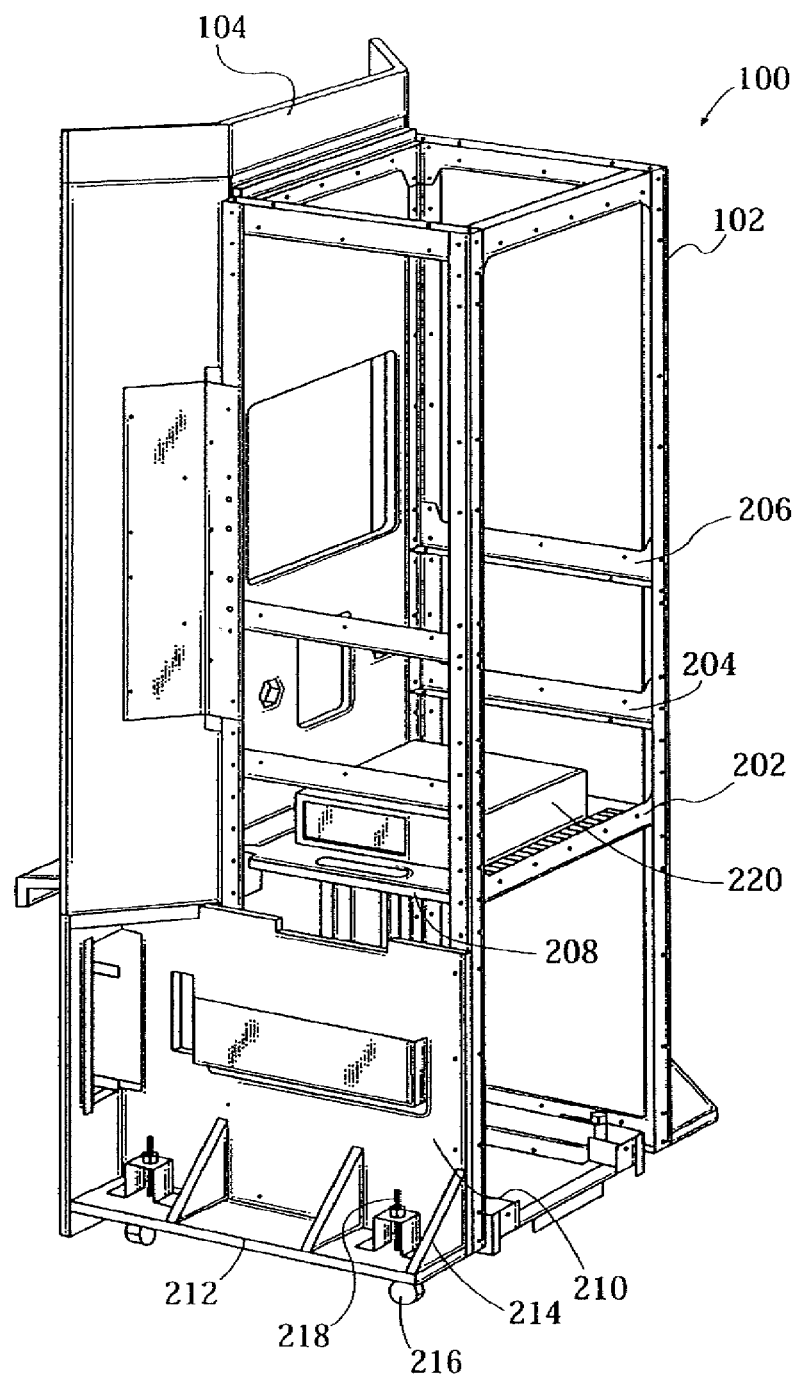
FIG. 2 illustrates a back-side perspective view of the color coordination kiosk and how a first horizontal surface and computer may be mounted in the kiosk cabinet according to one embodiment of the invention.

FIG. 2 illustrates a back-side perspective view of the paint selection and coordination kiosk 100 according to one embodiment of the invention. The kiosk frame 102 may define a plurality of spaces and include a plurality of rails 202, 204, 206. One or more of these rails 202, 204, and 206 may serve to support one or more horizontal surfaces. For example, a first horizontal surface 208 may be supported by and/or coupled to a lower rail 202. The kiosk cabinet frame 102 may also have side panels 210 fastened to a lower portion of the cabinet frame 102. Supporting members 212 may be coupled to the lower side panel 210 by one or more brackets or perpendicularly supporting members 214. The supporting members 212 may serve to support the cabinet 100 on a plurality of legs or wheels 216. The supporting legs or wheels 216 may include a leveling or height adjusting mechanism such as a nut and thread bolt.

According to one embodiment of the invention, a processing unit (e.g., computer) 220 may be mounted within the kiosk on top of the horizontal surface 208. The processing unit 220 may be secured to the horizontal surface 208 or cabinet frame 102.

Figure 3:
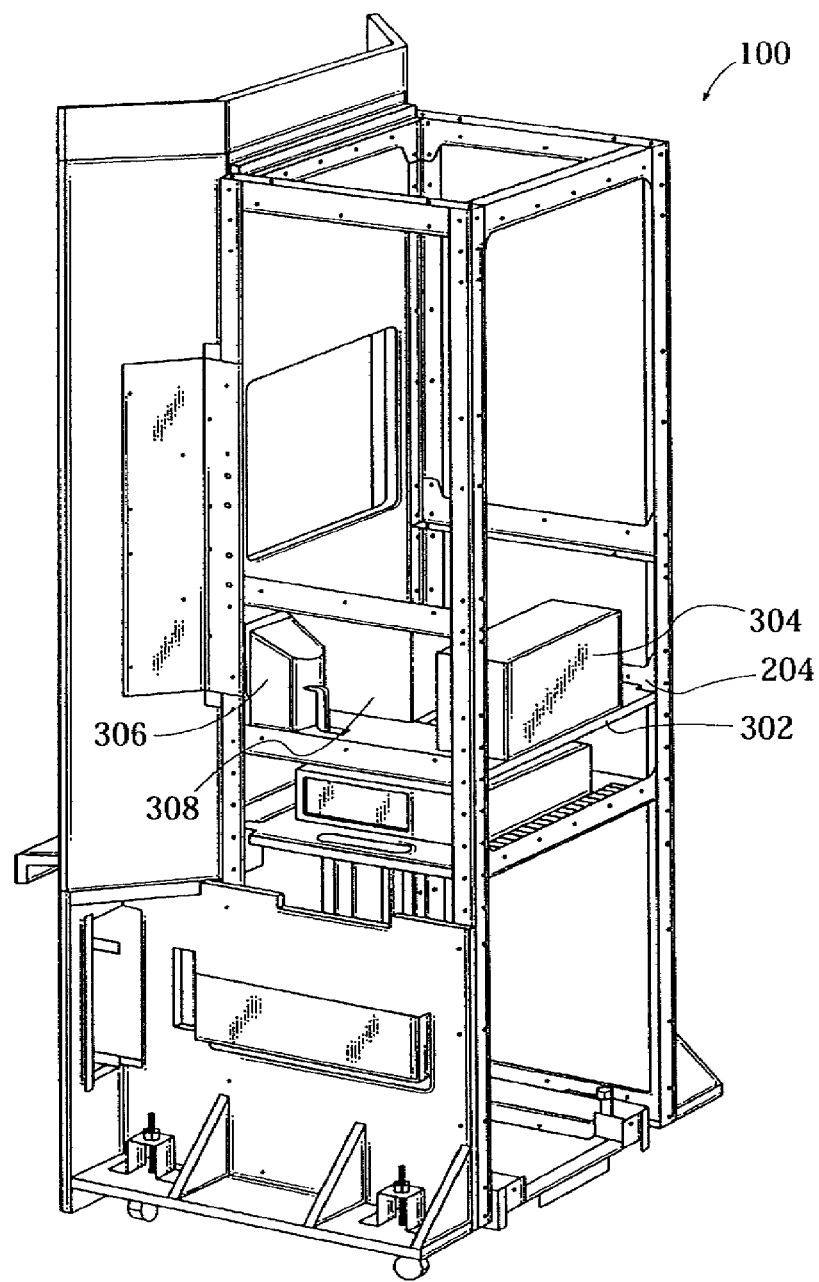
FIG. 3 illustrates how a second horizontal supporting surface may be mounted within the color coordination kiosk cabinet according to one embodiment of the invention.

FIG. 3 illustrates how a second horizontal supporting surface 302 may be supported by or coupled to horizontal rails 204 according to one embodiment of the invention. Horizontal surface 302 may serve to support one or more devices. For example, in one implementation, a power supply 304, speakers 306, and a color sensing device or spectrophotometer 308 may be mounted to and/or attached to the horizontal surface 302. Various different brackets or fasteners may be used to secure the speakers 306, color sensing device 308 and power supply device 304 without deviating from the invention.

Figure 4:
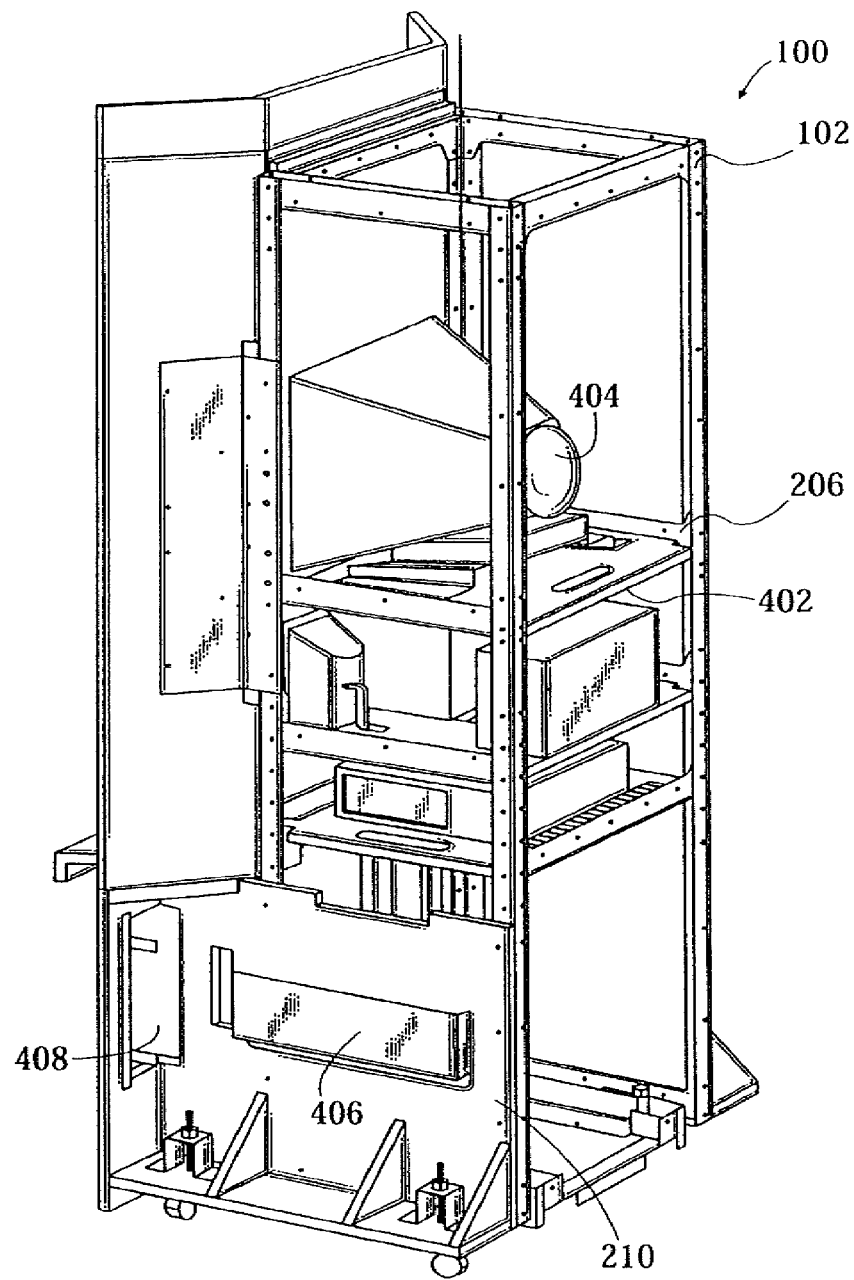
FIG. 4 illustrates a back-side perspective view of the color coordination kiosk where other features of the kiosk are shown according to one embodiment of the invention.

FIG. 4 illustrates a back-side perspective view of the kiosk 100 where other features of the kiosk are shown according to one embodiment of the invention. A third horizontal surface 402 may be mounted on and/or secured to the horizontal rails 206 of the cabinet frame 102. A display device (e.g. monitor and/or screen) 404 may be mounted on the third horizontal surface 402 such that the display surface of the device 404 is visible through an opening 116 in the front panel 104 of the kiosk 100.

According to one embodiment of the invention, a keyboard holder and/or mouse holder 406 may be mounted on the side panel 210 on the lower portion of the cabinet frame 202. A keyboard or mouse stored in the holder 406 may be accessed through an opening 408 in the front of the paint selection kiosk. According to one embodiment of the invention, the opening 408 may be accessed by opening one of the lower doors 124 of the kiosk 100.

Figure 5:
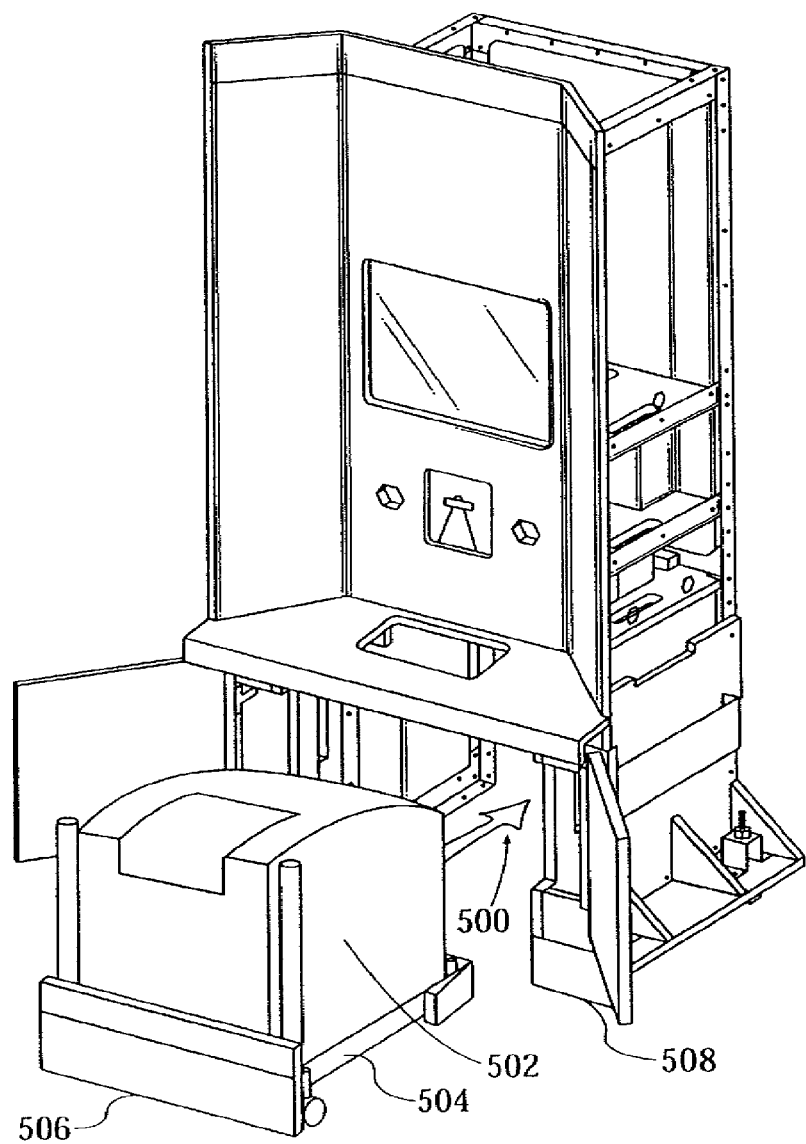
FIG. 5 illustrates a front side perspective view of the color coordination kiosk showing how a printer may be integrated as part of the kiosk according to one embodiment of the invention.

FIG. 5 illustrates a front perspective view of the kiosk 100 showing how a printer 502 may be integrated as part of the kiosk 100. The printer 502 may be mounted on a rolling platform or cart 504 so that it may be easily moved in and out of the kiosk compartment 500. The printer platform 504 may also include a trim 506 along the lower front part of the printer platform or dolly 504 such that it matches the trim 508 along the lower edge of the kiosk cabinet 100. The printer 506 may be communicatively coupled to the computer or processing unit 220 in such a way that permits removal of the printer 502. In one implementation of the invention, the printer 502 may be coupled to the power supply 304 and/or computer 220 by cables long enough to permit removing the printer 502 and cart 504 from the compartment 500.

Figure 6:
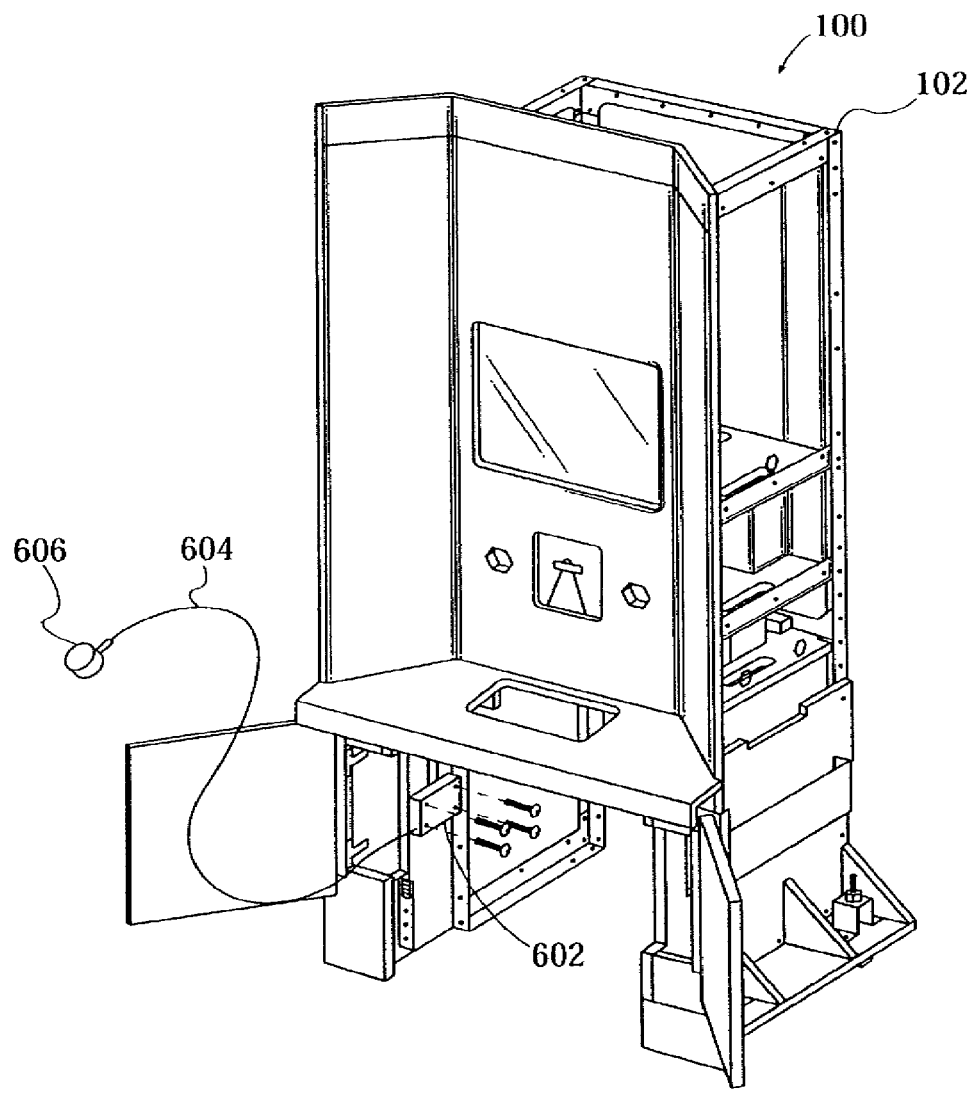
FIG. 6 illustrates how the printer may be secured to the color coordination kiosk to prevent theft according to one embodiment of the invention.

FIG. 6 illustrates how the printer 502 may be secured to the kiosk 100 to prevent theft according to one embodiment of the invention. For example, a pull box 602 may be attached to the frame 102 or side panel 210 of the kiosk 100. A cable 604 may be coupled to the pull box 602 at one end and a securing apparatus 606 at an opposite end. The securing apparatus 606 serves to secure the printer 502 to the kiosk cabinet. According to one embodiment of the invention, the securing apparatus 606 may include a color calibration chip to calibrate the color spectra.

The kiosk illustrated in FIGS. 1-6 may be configured to aid a person in selecting a starting color (e.g., starting or desired paint color) as well as provide complementary, harmonious, and/or aesthetically pleasing corresponding. In one implementation, such kiosk may serve as a paint color selector and coordinator for paint projects such as a painting interior areas (e.g., rooms, etc.) or the house exteriors.

In one implementation of the invention, a user is able to navigate through various graphical user interfaces, screens, and/or modules which advise and suggest to the user which colors are most likely to provide an appealing scheme or combination. The color sensor or spectrophotometer 308 permits a user to use a swatch or sample of their desired color and enter it into the color selection and coordination system. The color sensor 308 may be one of a number of color sensing devices that is attached to the color selection and coordination system and provides the system with information about the desired color sample. The speaker(s) 306 may provide the user with audio cues or information such as, for instance, audio/video clips about painting and other decorating ideas, and product training and information.

The printer 502 may provide the user with printouts of selected colors and/or color schemes or combinations. In various embodiments of the invention, an input device, such as a touch screen, a pointing device and/or a voice-activated input system, may be used to permit a user to navigate the color selection and coordination process and provide inputs to the system.

Generally, a color selection and coordination system may provide the user with the options of color matching and coordination. Consumers may provide a starting color in several ways. For instance, using a spectrophotometer, a customer can "scan" the color of an item from their house such as tile, fabric, window treatment, pillow, etc. Based on the starting color, a system implementing one embodiment of the invention may select a close match from a color library, or may custom-formulate a color to match the item scanned. In addition, the color coordination system may recommend other colors, or combination of colors, that coordinate, are harmonious or aesthetically pleasing, or complementary to the starting color. The customer is provided a "palette" that can be adjusted according to how they want the original starting color to be used (e.g., accent color versus main color versus trim color). Potentially, palettes may be adjusted according to the user's region, size of room, room function, and style preferences.

Another way to use the system is to simply pick a color, from a color table for instance, and find out what other colors go with it. The user may specify a starting color visually or by entering a color code and the expert color coordinator then recommends color combinations. Lightness and gray levels of individual combination colors can be adjusted.

The system may also provide a visualization tool that allows consumers to see how their colors look in a simulated environment. The system may function in a way that allows users to upload their own photos and the adjust them based on the user's color selections. In another implementation of the invention, a user may select a similar room or exterior from a collection of preformatted rooms or exterior. The wall, trim, accents, etc., of the selected room or exterior is then colored with a selected color combination from among the recommended color combinations.

FIGS. 7-18 illustrate a paint selection and expert coordination system that may be implemented in one embodiment of the kiosk illustrated in FIGS. 1-6. While the system illustrated in FIGS. 7-18 describes a paint selection and expert coordination system, it should be clear that this is merely an exemplary application and that various aspects of the invention are applicable to color selection and advising in general.

Figure 7:
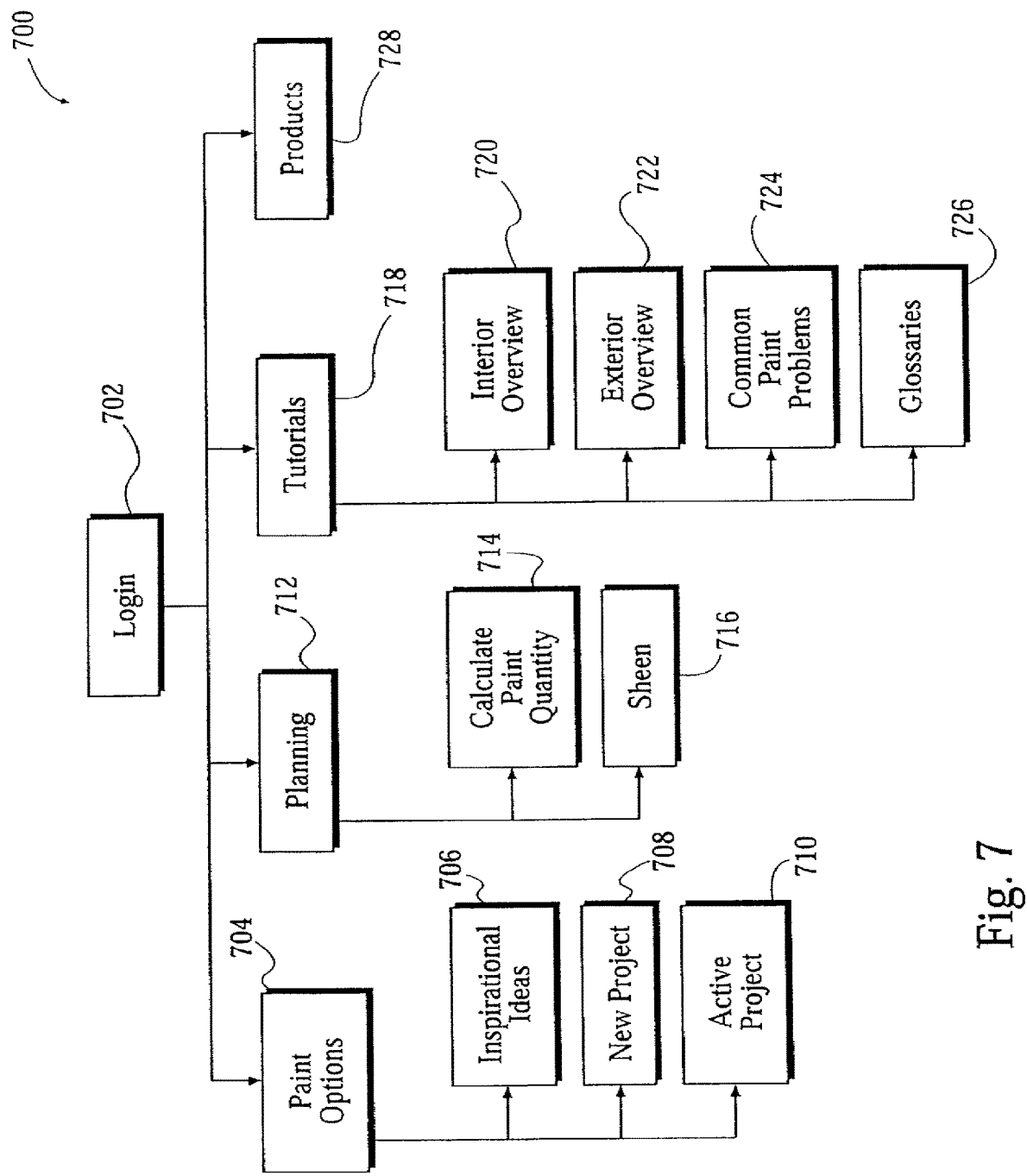
FIG. 7 illustrates a block diagram of a paint color selection and coordination system according to one embodiment of the invention.

FIG. 7 illustrates a block diagram of a paint selection and expert coordination system according to one embodiment of the invention. The paint selection and coordination system 700 may be implemented within one embodiment of a paint selection and coordination kiosk (e.g., kiosk 100). According to one embodiment of the invention, a log-in component 702 may requests a user to enter either an existing user identification number and/or register to use the paint selection and expert coordination system. In another embodiment of the invention, the system may permit a user access to some or all features of the paint selection and coordination system without first registering, using a password, or setting up an account.

Once in the system, a user may select from a number of different options. For example, the paint coordinator option or component 704 permits a user to browse inspirational paint ideas 706 from which to select a color or color scheme, start a new paint project 708 or recall an active paint project 710. A planning option 712 permits a user to estimate or calculate the quantity of paint that may be necessary for the particular project (e.g., room to be painted) 714 or select from different paint sheens depending on whether an interior or exterior paint project is involved 716. A tutorial option 718 permits a user to select from various instructional or tutorial information about painting. For example, a user may select from interior overview information 720, exterior overview information 722, common paint problems 724 and/or a glossary of terms common to painting 726. A user may also select from a products option 728 which may list various paints and/or paint products from one or more companies.

Figure 8:
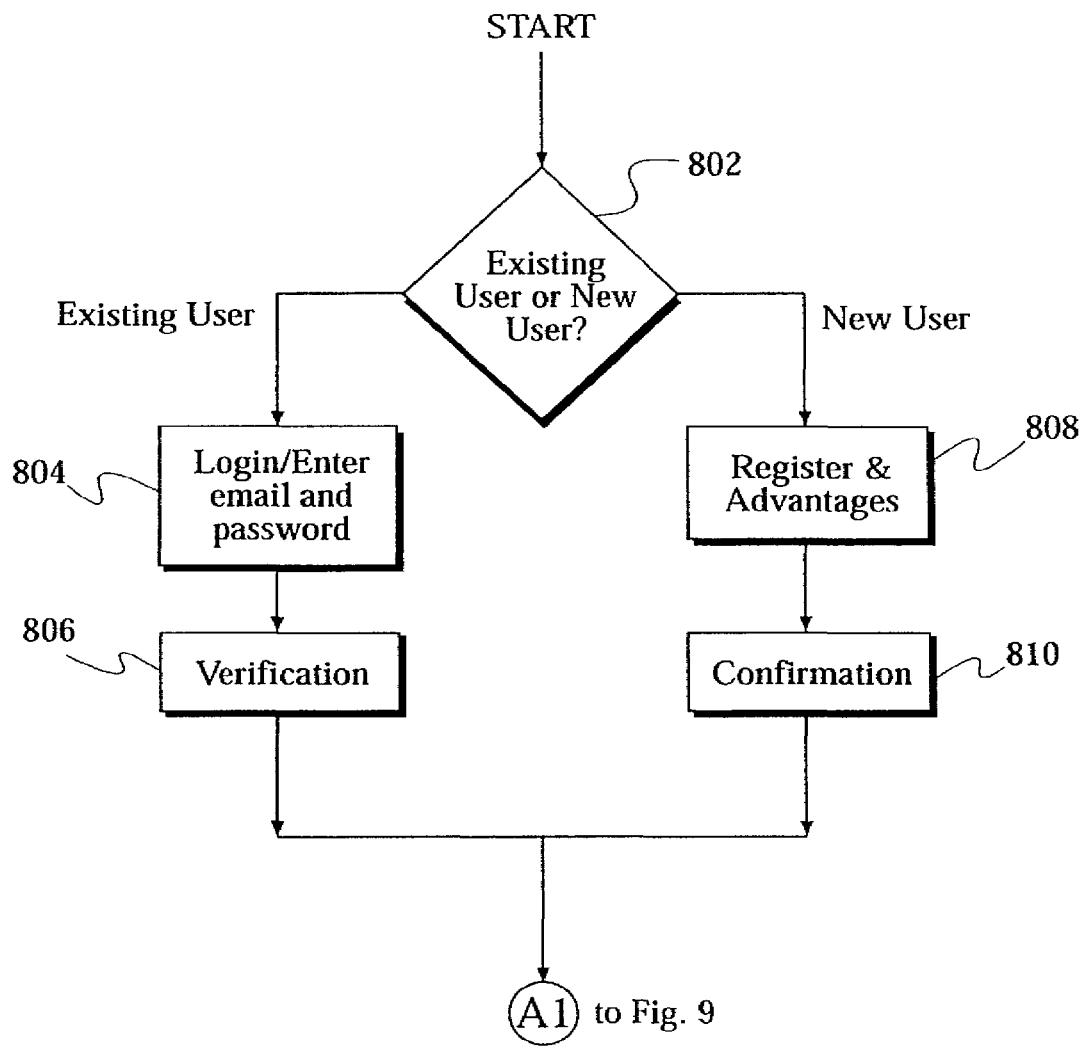
FIG. 8 illustrates one embodiment of a log-in and/or registration system according to one implementation of the paint selection and coordination invention.

FIG. 8 illustrates a log-in and/or registration system according to one implementation of the invention. A user may start by selecting between an existing user option and a new user option 802. If the existing user option is selected, the user may log-in to the system by entering information such as a user name, e-mail address, unique identifier, and/or password 804. This information is then verified by the system 806 and, if accurate, permits the user to proceed by displaying various selection options. Alternatively, is the user selects the new user option, a registration option 808 permits a user to register with the system. In one embodiment of the invention, the advantages of registering may be displayed to a user who wishes to register. Once such registration is confirmed 810, a user is permitted to access the various features of the paint selection and expert coordination system. Note that in other embodiments of the invention, a user may be permitted to access all or some of the various features of the paint selection and expert coordination system without registering or logging-in.

Figure 9:
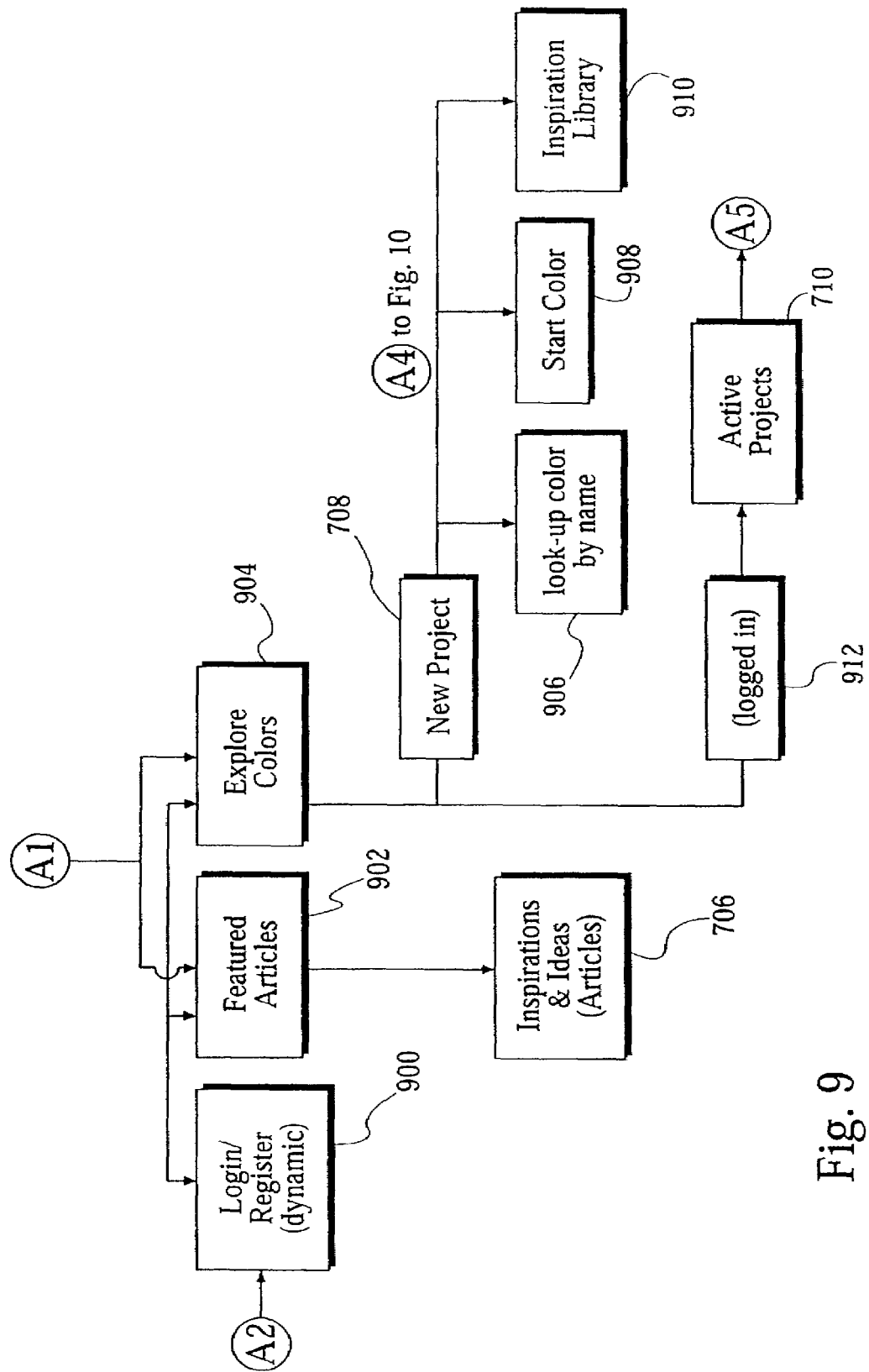
FIG. 9 illustrates various components and navigation paths that a user may select once the user has logged in or otherwise been allowed to enter the paint selection and coordination system.

FIG. 9 illustrates various components and navigation paths that a user may select once the user has logged in or otherwise been allowed to enter the system.

For instance, a user may select from a number of feature articles 902 which provide ideas and inspiration for painting projects, color schemes and reference information 706. The purpose of the inspirational section is two fold. First, it should give users ideas for how to complete a project that they already have in mind, and second, it should encourage users to take on new projects that they haven't yet considered. It may serve to get users charged up emotionally, showing them how they can improve their lifestyle by adding color and self-expression. The inspirational ideas and/or articles may recommend products across product lines and provide decorating/painting information, for instance, showing how to accent with faux finishes. Today, consumers look for inspiration from magazines, touring model homes, visiting friends' houses, television shows, etc. This same experience may be extended by the inspirational ideas of the paint selection and coordination system. Inspirational content may be organized by themes such as region, styles, moods, function, and color families. In addition, seasonal content may offer an opportunity to refresh the inspirational ideas constantly.

A user may also elect to explore colors 904 by starting a new project 708 or continuing to active or existing project 710.

According to one implementation of the invention, a user has several options when starting a new project 708 and can select a starting color in a number of different ways. For instance, the user may look-up a color by name 906, provide a starting color sample 908, or browse or search through an inspirational color library and/or palette for a desired color 910. If the user elects to provide a starting color 908, he or she may provide such start color by providing a color sample to a color sensor 108. If the user elects to continue a previously saved project 710, the system may first determine if the user is logged in, and if not, request that the user log in 912. The user may also select a starting color from a color library or palette. In an embodiment of the invention, the user may also fine-tune the starting color to obtain a desired color.

Figure 10:
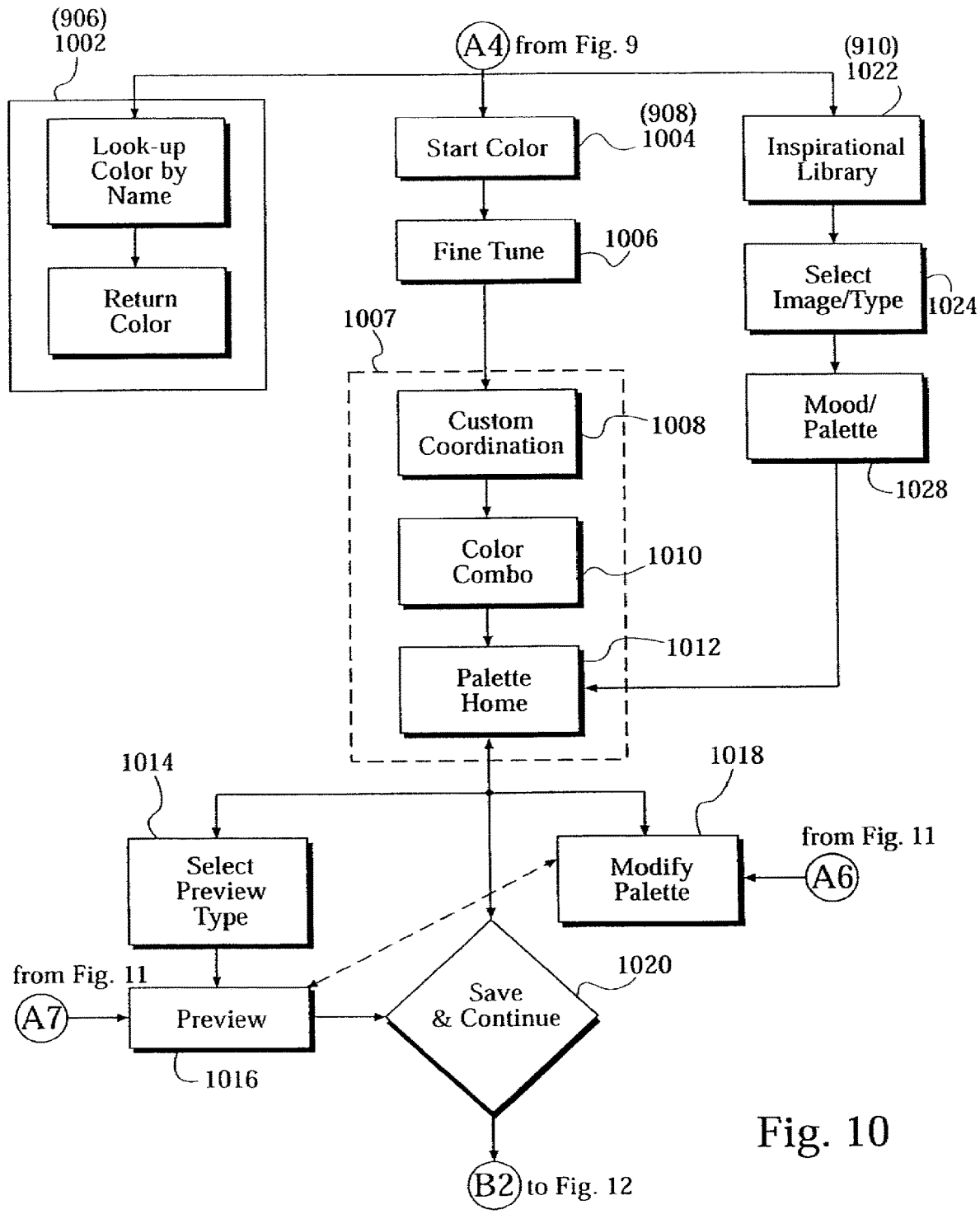
FIG. 10 illustrates the path or trajectory that may be followed in the selection or editing of colors according to one embodiment of the color selection system.

FIG. 10 illustrates the path or trajectory that may be followed when starting a new project and selecting a starting color according to one embodiment of the color selection and coordination system.

If the user elects to start a new project 708, he or she is given the option to select a color from various sources 906, 908, 910. The desired color may be looked up by name in a database 1002, and, if the color is found, it is returned to the user for fine-tuning 1006. Fine-tuning may permit a user to make a color lighter or darker and/or more or less muted. Such fine-tuning may be performed by allowing a user to incrementally increase or decrease one or more of its characteristics (e.g., hue, chroma, etc.). In one implementation of the invention, the colors available in the system have associated predetermined relationships with other colors. Thus, if a user wishes to lighten a first color, for instance, the user may select a "lighter" button, arrow, or symbol, to incrementally go to the next lightest color associated with the first color, thus obtaining a second color. Similarly, if the user wishes to darken a first color, the user may select a "darker" button, arrow, or symbol to go the next darkest color associated with the first color, thus obtaining a second color. Similarly, the hue or chroma of a first color may be incrementally modified by retrieving the associated hue and/or chroma colors to provide a desired second color. The second color may also be similarly modified to achieve a desired final color.

A user may also provide a sample 908 of the desired color 1004 and then may be permitted to fine-tune that color 1006 as described above. That is, the fine-tuning process 1006 may involve changing the color's hue, chroma, etc., by incrementally increasing or decreasing these qualities.

In either one of these instances, a user is given the option to then use an expert color coordinator 1007 be given suggestions as to complementary, harmonious, or aesthetically pleasing colors that may be combined with the starting color.

In one embodiment of the invention, the expert color coordinator 1007 may include a custom coordination component 1008 which, based on the starting color, automatically selects a plurality of color combinations that are complementary, harmonious to, and/or are aesthetically pleasing in combination with the starting color.

These color combinations may be determined in different ways according to various embodiments of the invention. The color combinations provided to the user may be selected based on a number of color theory implementations. In one implementation, the color combinations are pre-determined and stored in a database such that, once a desired starting color is selected, its characteristics or metrics (e.g., hue, chroma, tint, shade, etc.) are determined and matched to a color in the database with the closest corresponding metrics. The system then uses the matching color from the database to determine the complementary color combinations.

In another embodiment of the invention, metrics for the desired color are determined and then used to calculate, determine, or retrieve complementary colors that are either dynamically determined or retrieved from a pre-compiled database.

One or more of the color combinations may also be based on the corresponding warm triad and cool triad for the starting color.

In one implementation of the invention, the combination of colors may be retrieved from a database of colors. The database of colors being a data structure in which corresponding complementary colors have been identified for every color in the database or a color palette. Various color theories, including a complementary color model, tertiary color model, analogous color model (e.g., monochromatic color model), may be employed to generate the various relationships between colors stored in the database. In another embodiment of the invention, the corresponding complementary colors are dynamically determined upon selection of a first or desired color.

Additionally, in one embodiment of the invention, the color coordinator may interpolate between two or more colors in a database to generate better matching complementary colors for a given starting color. This interpolation may be based on the color theory employed and/or the inherent metrics or characteristics associated with the starting color.

Additionally, the color coordinator may also be configured to take into account human factors. That is, the relationship between colors may be modified based on human expertise. For example, the complementary color relationships generated using color theory may be modified so as to achieve a more aesthetically pleasing combination of colors. Thus, the color database of complementary color relationships may be based on both color theory and expert input.

Once the expert color coordinator 1007 has returned one or more color combinations 1010 based on the desired or starting color, the user may select a desired color combination, an interior or exterior template 1014 (e.g., interior room or exterior home facade) and preview it 1016.

The preview feature 1014 and 1016 permits a user to see what a particular color combination would look like when painted on an interior room, exterior facade, etc. In one implementation of the invention, sample interior rooms and or exterior facades are provided for the user's selection. The available preview rooms and facades are tagged such that the walls, trim, doors, floor, ceiling, etc., are identified as separate elements. This way, a user may indicate which colors in the selected color combination will be used to paint the walls, trim, doors, floor, ceiling, etc. The system paints the different surfaces with one or more selected colors from the color combination. The user may then preview the selected template (e.g., interior room or exterior facade) with the selected colors in the selected surfaces. In yet another embodiment of the invention, the user may upload a picture of the desired project (e.g., living room, dining room, house exterior, etc.) and select the color desired for each surface (e.g., door, trim, walls, floors, etc.)

The user may modify a color combination by using a color palette 1018. In various embodiments of the invention, such characteristics as the tint, shade (e.g., lightness and/or darkness), hue, and/or chroma may be modified. Once the user is satisfied with a selected color combination, that combination may be saved 1020.

When a user elects to start a new project using the inspiration library 910, various categories may be available from which to choose a color 1022. Each category may enable a user to choose from various types of images, themes and/or types of rooms that may be desired 1024. For one or more of these selections, the user may also be able to select a mood or theme palette 1028. Once the system retrieves an image satisfying the desired characteristics, the user may then modify the colors based on color palette 1012. Once a desired color combination has been obtained, the user may preview what such color combination would looks like in a particular room or exterior of a home 1014 & 1016 and save it 1020.

At any time during the browsing, the combination of colors provided by the expert coordination system or the previewing of the selected image, if the user wishes to further modify the color, this may be done by modifying the color palette 1020.

Similarly, if a user elects to continue working on an existing project or active project 710, the previously selected or saved color(s) may be revised by modifying the color palette or the color may be previewed by entering the preview module.

If the user elects to continue working on an active project 710, a different set of options may be available. For example, FIG. 11 illustrates one embodiment of the invention with various options that may be available to a user when electing to work in an active project 710.

A user may be able to revise or edit a color 1102 to preview a selected color 1104 to revise a quantity of paint that may be necessary for a project 1106, to revise the sheen of the paint 1108, to print samples of the color 1110 or to edit the account information associated with the user 1112 and 1114.

Selection of the revise color option 1102 permits modifying the color palette 1018. Selection of the preview color option 1104 opens the preview module 1016 and permits a user to see the selected color and modify it using the modify color palette 1018, if desired.

Figure 11:
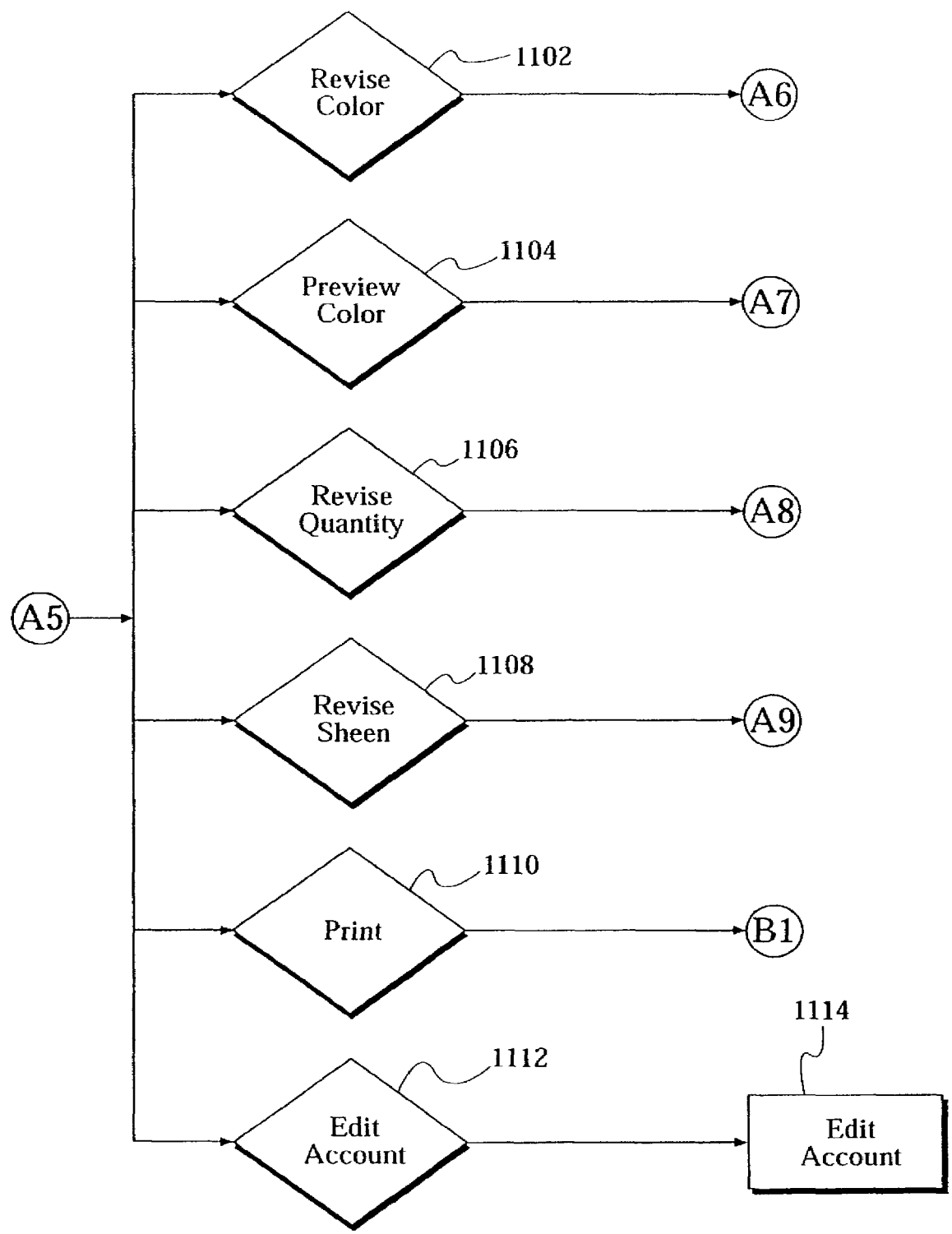
FIG. 11 illustrates one embodiment of the invention with various options that may be available to a user when electing to work in an active project.
Figure 12:
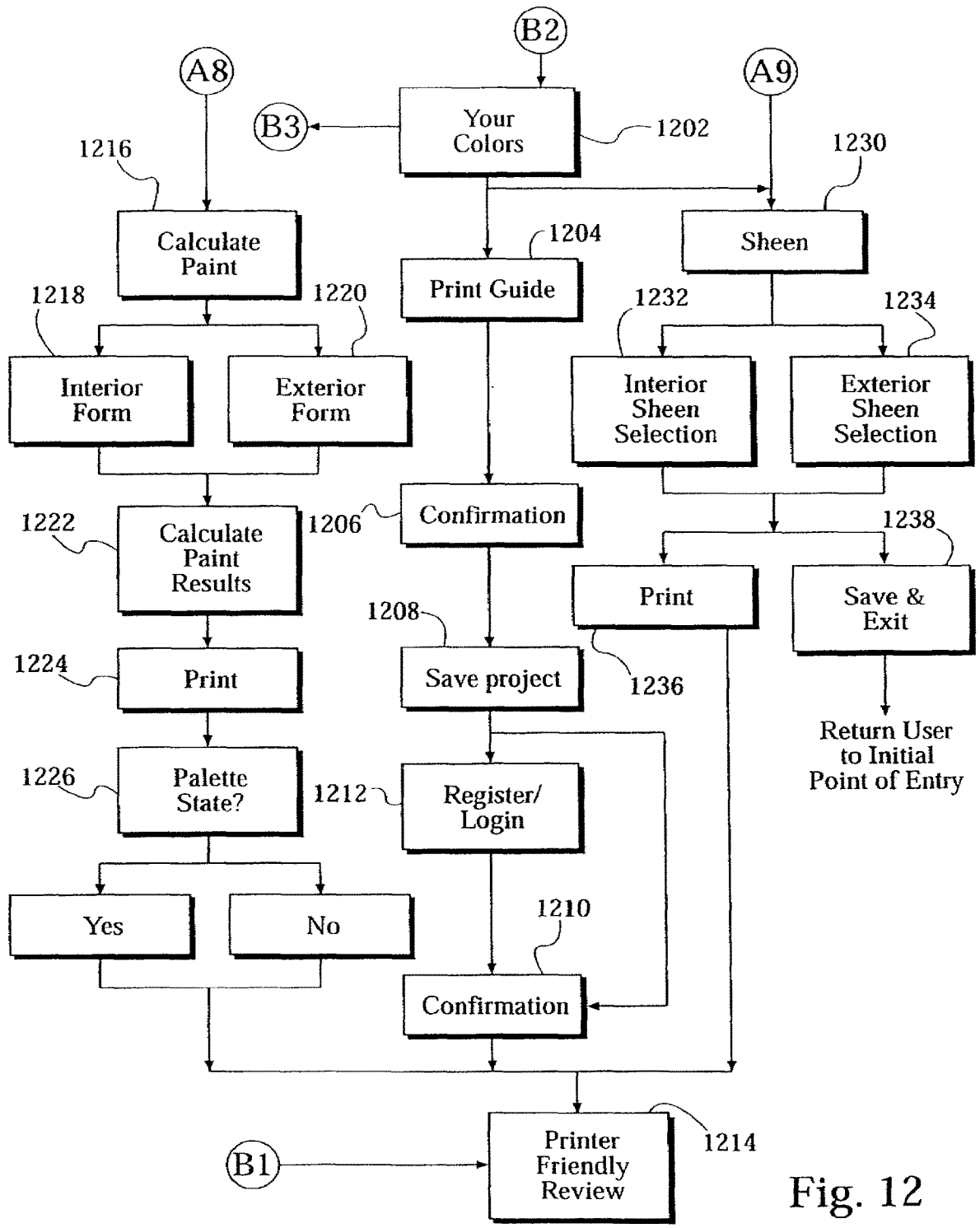
FIG. 12 is a block diagram illustrating the processing of various options in FIG. 11 according to one embodiment of the invention.

FIG. 12 is a block diagram illustrating the processing of various options in FIG. 11 according to one embodiment of the invention.

Selection of the revise paint quantity option 1106 permits the user to calculate or estimate the amount of paint necessary for a particular task 1216 (FIG. 12). As shown in FIG. 12, a user may select between an interior 1218 and exterior 1220 paint job. According to one embodiment of the invention, these two options 1218 & 1220 may provide the user with sample shapes of rooms or exteriors of various sizes from which to choose. According to one embodiment of the invention, the paint estimator 1222 may provide the user the amount of paint necessary for a paint job rounded up to the nearest standard paint unit in which the paint is sold (i.e., quarts or gallons). The paint estimator 1222 may also calculate or estimate the amount of paint needed for a project based on number of coats needed and on whether the particular paint color will be used on the trim, wall, ceiling, doors, etc. Once the user has entered the desired options, the system calculates the approximate amount of paint required for a job 1222 and may print this information for the user's convenience. Prior to printing, the system checks the palette state 1226 to determine if more information needs to be gathered from the user.

Referring again to FIG. 11, if the user elects to revise the paint sheen 1108, a sheen selection option 1230 permits the user to select from either interior sheens 1232 or exterior sheens 1234 and determine the desired sheens to use for their type of project. After selecting a desired paint sheen, the user may choose to either print the color formula to create the particular color and sheen 1236 or so save the results and return to the previous menu (i.e. 1202 or FIG. 11).

If a user elects to print a paint color 1110, then the paint color is previewed 1214 and printed. On occasion, there are discrepancies between the on-screen colors selected and the colors that may be printed by a printed. In order to provide printed colors that closely match the true colors selected, the system may include either a hardware or software color calibration module that configures the printer or commands to the printer so as to provide printed colors that closely match the real colors.

A user may also edit account information, such as user name, password, etc., by selecting the edit account option 1112 and modifying the existing information 1114.

Referring again to FIG. 10, once a user decides to print a color or color combination, the selection is previewed 1016, adjusted as necessary 1018 and saved 1020. After saving and/or storing the color selection 1020, the user is given the options 1202 of printing the chosen colors 1204 or revising/selecting paint sheen 1230. If the paint sheen option 1230 is selected, the user may choose from either interior 1232 or exterior 1234 sheens, and print 1236 and/or save the selection 1238. If the print option is selected 1204, the user may confirm the choice to print 1206, save the project 1208, and print the selected paint color and/or color combination 1214. According to one embodiment of the invention, a user may be requested to login or register 1212 prior to being allowed to print. When logging in, the user's information may be confirmed 1210.

Figure 13:
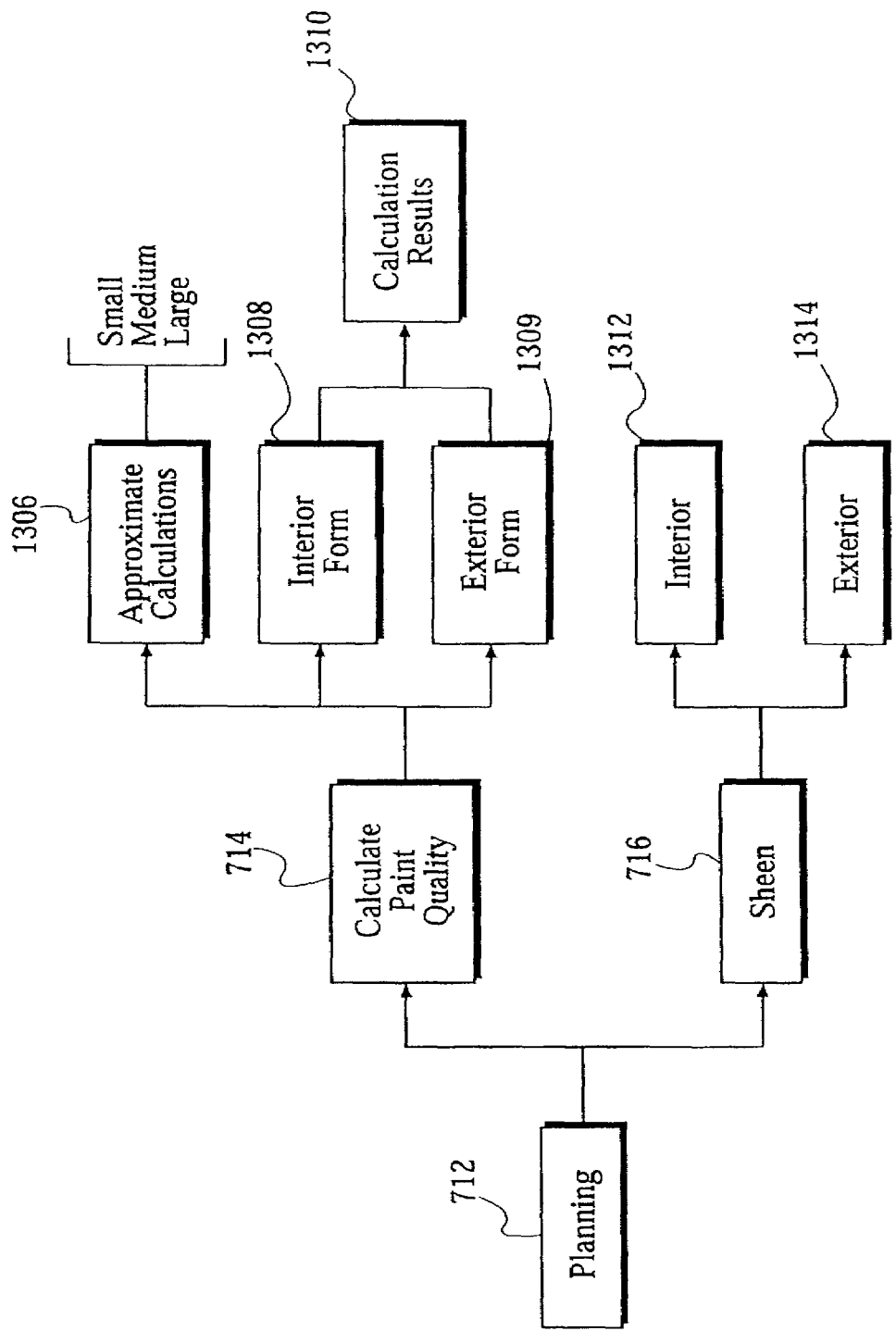
FIG. 13 is a block diagram of a planning feature of the paint selection system according to one embodiment of the invention.

FIG. 13 is a block diagram of a planning feature 712 (FIG. 9) of the paint selection system according to one embodiment of the invention. The planning feature 712 may permit a user to calculate a quantity of paint 714 based on approximate room sizes 1306 or whether it is an interior 1308 or exterior 1309 project. A user may then be provided with the calculation results 1310 for each color of paint of the selected combination that may be needed for a project.

Similarly, the user may be able to compare sheen 716 characteristics for paints for either interior 1312 or exterior 1314 projects. That is, for the same paint, a user may be shown on the display screen what the interior paint looks like and what the exterior paint looks like.

FIGS. 14-17 are flow diagrams illustrating various user options that may be provided under the tutorials option 718 (FIG. 7) by the paint selection and coordination system according to one embodiment of the invention.

Figure 14:
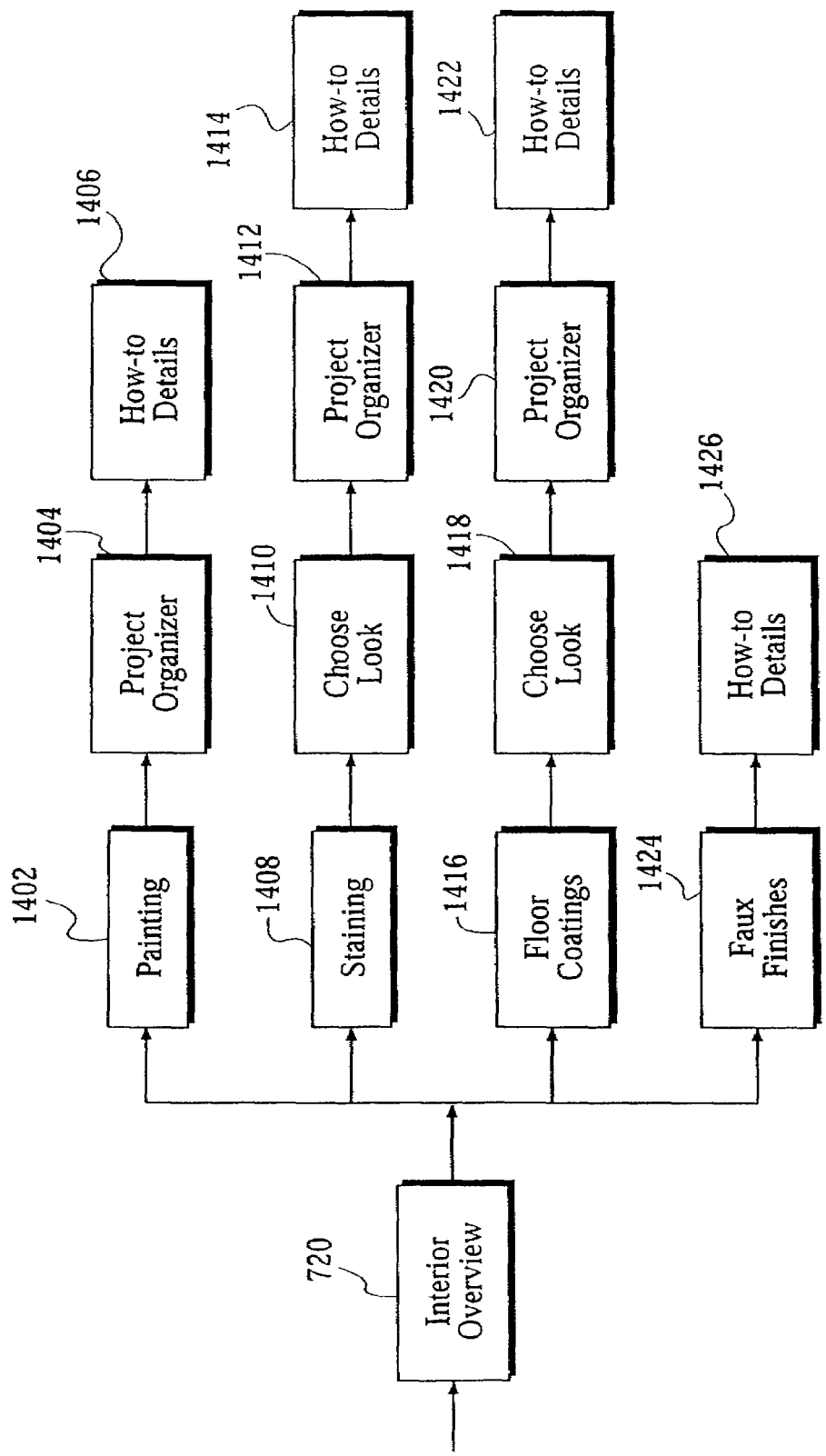
FIG. 14 is a flow diagram of an interior painting tutorial that is provided by the paint selection and coordination system according to one embodiment of the invention.

FIG. 14 illustrates features related to interior painting projects 720 (FIG. 7). For example, a user may be provided with specific painting information for a project 1402, how to organize that project and details on the rules and equipment that may be necessary for their project 1406. Similarly, the user may be provided with staining information 1408, including selecting type of look that is desired 1410, organizing a staining project 1412 and details and additional useful information 1414 that may be necessary for doing a staining project. Users may also be provided with information on floor coatings 1416 such as paints for interior floors by selecting a look or scene 1418 and information on organizing the project 1420 and details on how to perform such project 1422. Similarly, the user may be provided with information about faux finishes 1424 and details on how to perform such projects 1426.

How-to instructions or tutorials 1414 and 1422 may be organized in several ways. For instance, first by project type such as interior painting, exterior painting, deck, fence, etc. Next, they may be broken down into stages including organizing the project, proper preparation, using a primer, applying the topcoat, cleaning-up. How-to instructions may include text, audio, and video demonstrations. Supply lists for particular paint projects may also be provided. All instructions and supply lists may be printable for the customer's convenience.

Figure 15:
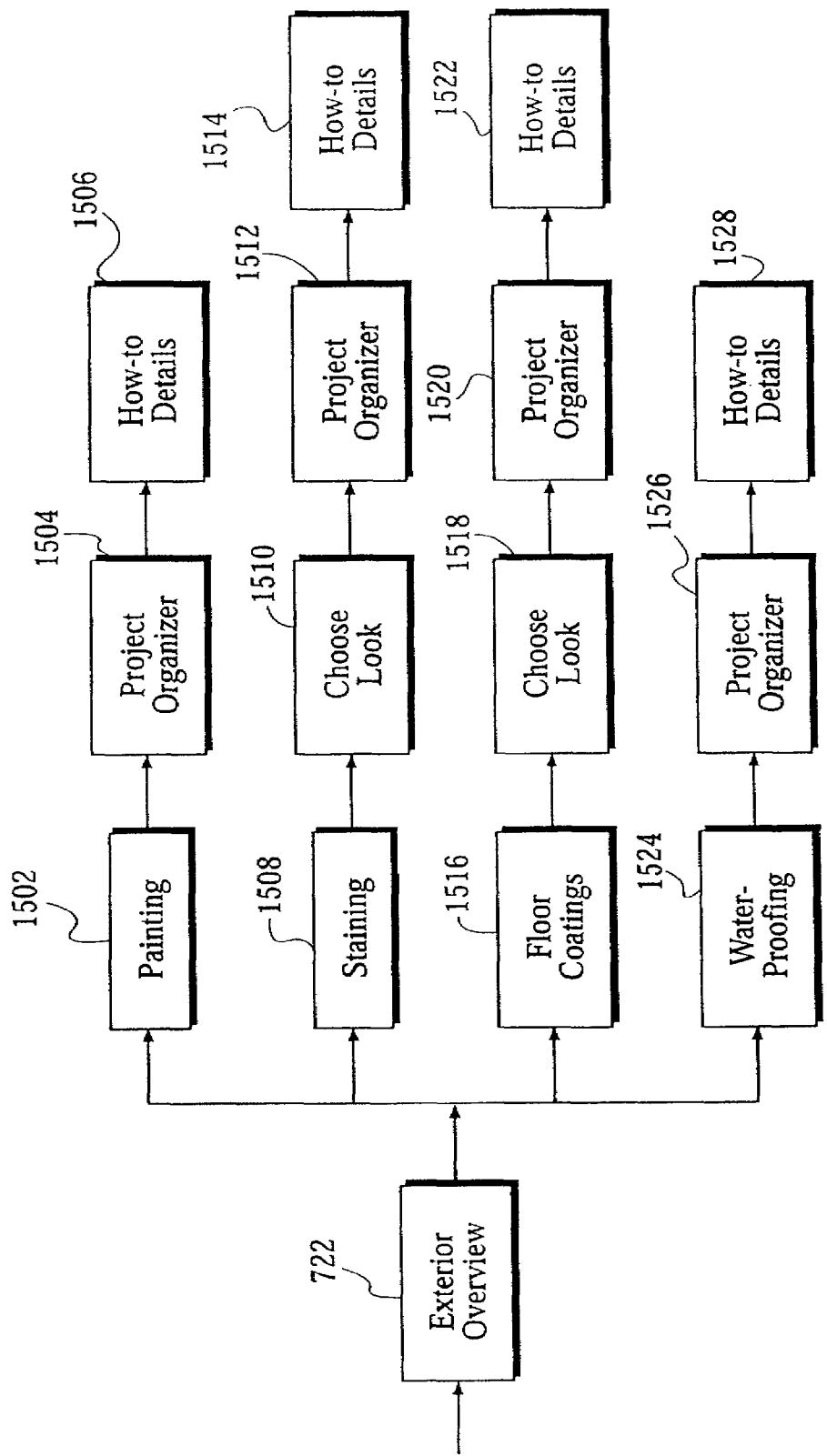
FIG. 15 is a flow diagram of an exterior painting tutorial that is provided by the paint selection and coordination system according to one embodiment of the invention.

FIG. 15 illustrates other tutorials 718 and information pertaining to exterior paint projects 722. As before, the system provides painting information for exterior projects 1502, as well as organization 1504 and other project details 1506. Likewise, the tutorials for exterior paint projects may also provide information on staining 1508 and floor coatings 1516 as in FIG. 14. Additionally, the exterior projects tutorials may include information on waterproofing surfaces 1524, organization of such projects 1526 and other details on how to perform waterproofing projects 1528.

Figure 16:
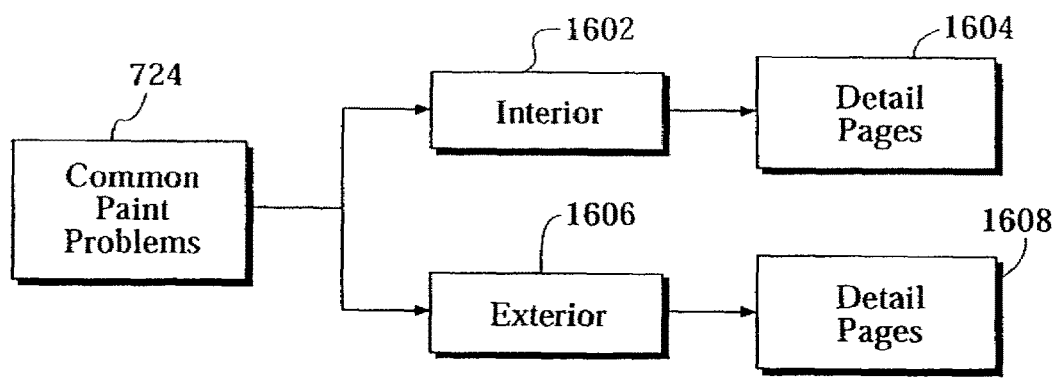
FIG. 16 is a flow diagram of a paint problem tutorial that is provided by the paint selection and coordination system according to one embodiment of the invention.

Another tutorial option may permit a user to browse or read through common paint problems 724, as illustrated in FIG. 16. The user may be given the option of selecting between interior paint projects 1602 and exterior paint projects 1606. For each of these categories, detailed information regarding paint problems 1604 and 1608 may be provided to the user. The user may also be able to perform a search based on a key phrase or word related to a particular paint problem.

Figure 17:
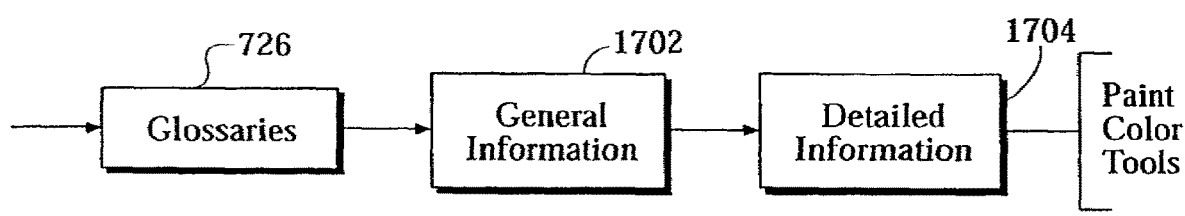
FIG. 17 is a flow diagram of a tutorial providing a glossary according to one embodiment of the invention.

FIG. 17 illustrates another aspect of the invention where one of the tutorial options 718 may include a glossary 726 from which a user may access general information 1702 and/or search for particular terms, colors, phrases, etc. 1704.

Figure 18:
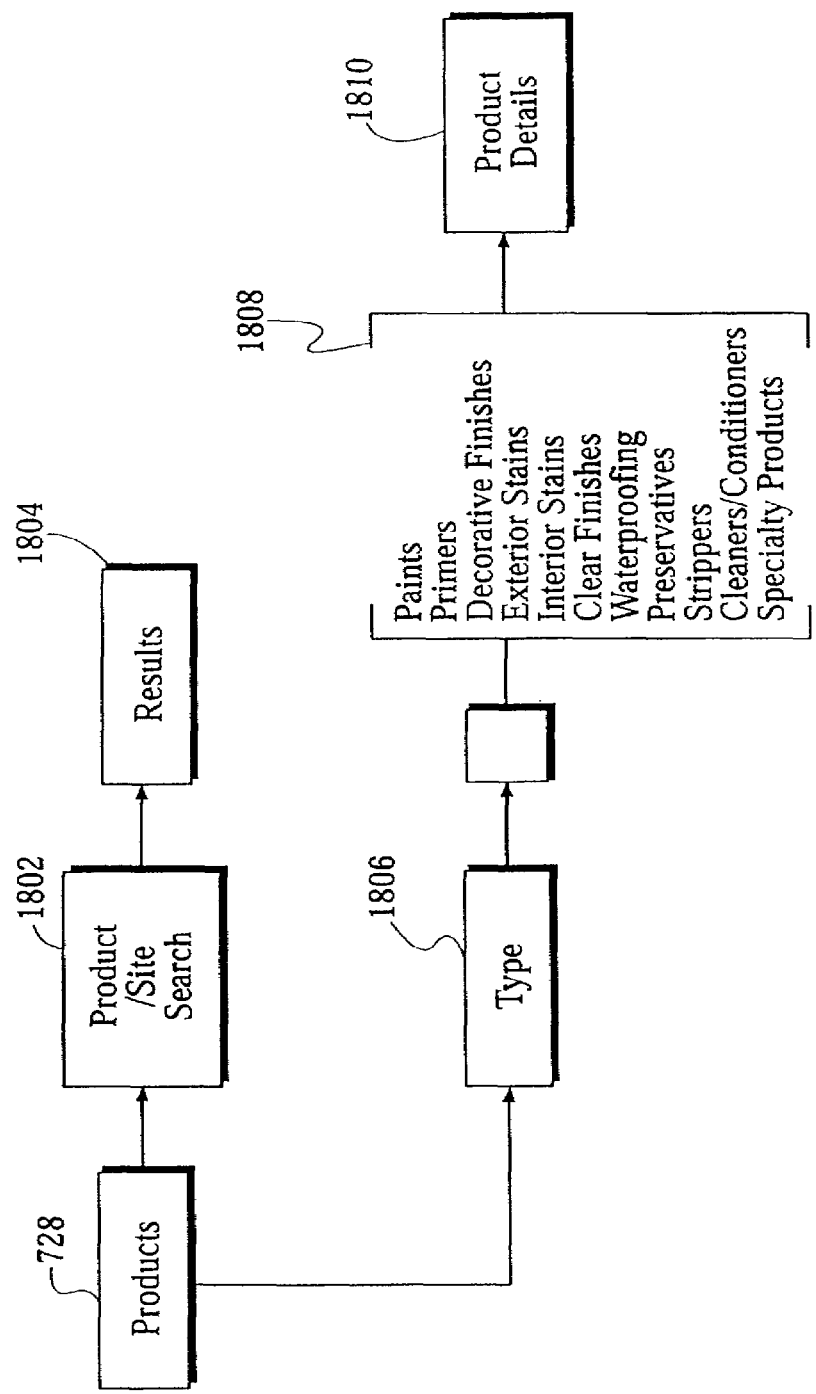
FIG. 18 illustrates one embodiment of a products option according to one implementation of the paint selection and coordination system.

FIG. 18 illustrates one embodiment of a products option 728 according to one implementation of the paint selection and coordination system. This products option 728 permits the advertising and/or display of various painting and decorating products. A user may search the site 1802 based on one or more key term(s) or word(s) or phrase(s) for a desired tool or product. The system may then provide the results 1804 meeting the search criteria. In the alternative, the user may select from a list of types of products 1806, to browse only those products of interest, or be provided with a list of product categories 1808. Once a product or category is selected, details about said product or product category may be shown to the user 1810.

In one embodiment of the invention the kiosk may have multiple modes of operations. For instance, aside from serving as a color selection and coordinator, the kiosk may also operate as a training system. An in-store personnel training feature may provide text, video, and/or audio training information to personnel. New sales associates may have access to an electronic seminar about particular products. According to one embodiment of the invention, this feature may be enabled by switching the kiosk over to training mode.

Another aspect of the invention provides a distributed paint color selection and coordination system that permits users to remotely access an automatic and interactive paint coordinator/advisor, setup a project, select a desired color, and be provided with complementary, harmonious colors in response to the selected desired color. A user may access the previously saved project from an in-store kiosk with a very similar graphical user interface. The distributed system permits updating software and data to the in-store kiosks as well as the remote user application.

Figure 19:
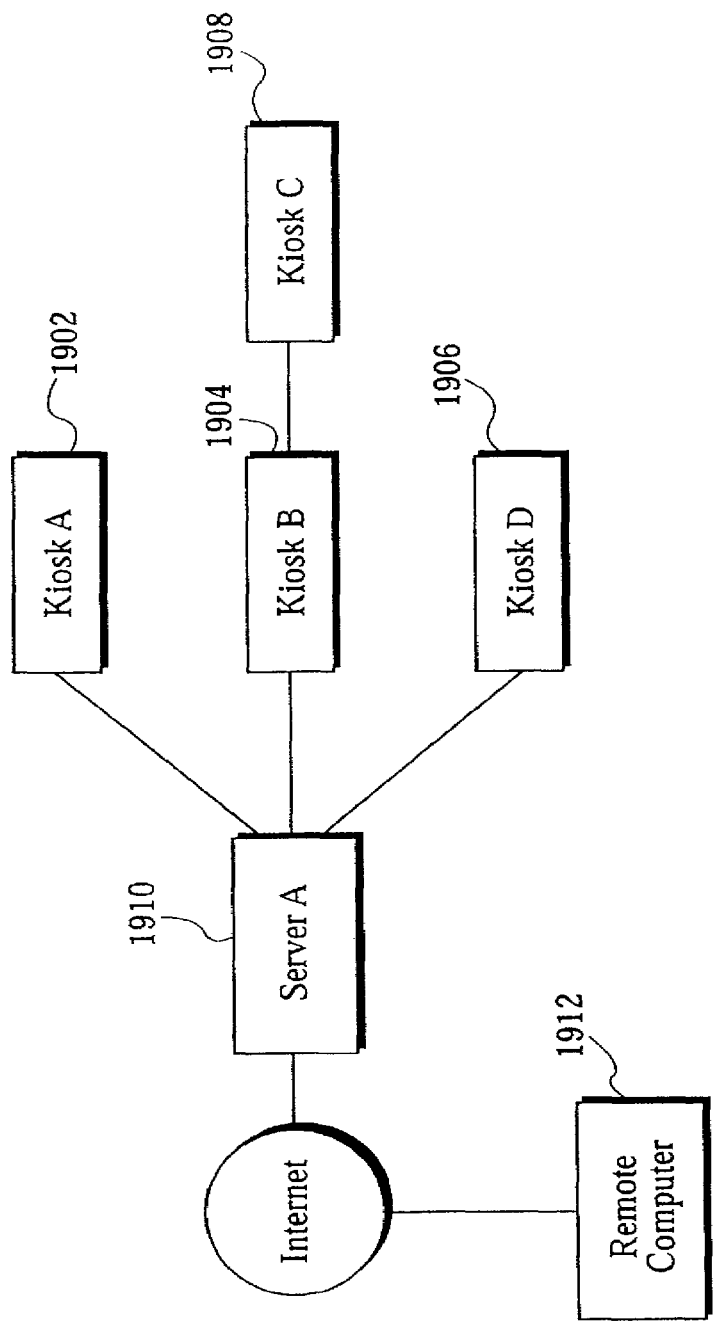
FIG. 19 illustrates a block diagram of a distributed system in which multiple in-store kiosks and remote computers may access the same paint color selection and coordination system according to one embodiment of the invention.

FIG. 19 illustrates a block diagram of a distributed system in which multiple in-store kiosks and remote computers may access the same paint color selection and coordinator system. The distributed system may include multiple in-store kiosks 1902, 1904, 1906, and 1908 coupled to a central server 1910. The central server 1910 may provide the kiosks 1902, 1904, 1906, and 1908 with updated software, data, and information periodically or as needed. The kiosks 1902, 1904, 1906, and 1908 may be communicatively coupled to one or more servers 1910 via various communication links, including the Internet, radio waves, and point-to-point communication links. The server 1910 may be coupled to the Internet and provide a paint color selection and coordinator application to remote terminals/computers 1912.

The distributed system enables a paint manufacturer to establish a relationship with the customers, educate the customer about the manufacture's paint products, and extend that relationship from the home to the store.

A user utilizing a remote terminal/computer 1912 may access the paint color selection and coordinator application(s), which may have similar functionality, user interfaces, and navigation as the system illustrated in FIGS. 7-18 and described above. Such system permits a user to become familiar with look and use of paint color selection and coordination application, start a paint project, select one or more desired colors, and be advised as to the complementary colors corresponding to the selected colors. One implementation of the distributed paint color selection and coordination system serves to entice consumers to become more comfortable and familiar with the look and use of paint colors beyond the standard white and neutral colors.

One implementation of the distributed system permits a user at home or at the store to create a personal project portfolio that includes information such as their projects, palettes, how-to info, etc. This project portfolio is accessible either online (e.g., via the Internet) or in the store (e.g., using the kiosk) via some sort of user identification. Scenarios include someone choosing their colors at home but going back to the store for chips and adjustments, or beginning a project profile at the store and adjusting within their own time frame while at home. According to one embodiment of the invention, a personal profile created on a store kiosk may be periodically downloaded to a central server or system so that it may be accessed by the user via a network (e.g., the Internet). Conversely, a profile created over the Internet (e.g., via a home computer) may be sent to the local store, which may be selected by the user, so that it is available when the user visits the store. In another embodiment of the invention, an in-store kiosk may retrieve the user's profile and/or previously entered project information when the user logs-in at the kiosk. The newly Internet-created projects may be sent only to those kiosks which the user indicates are within his/her local area or store.

The in-store kiosks may include a storage device to store a plurality of projects which were initiated either in the kiosk or on a remote computer/terminal. Stored projects may be retrieved from a remote terminal or from an in-store kiosk for further editing, review, and/or printing. In one embodiment of the invention, the stored project may be stored in one or more servers 1910 from where it may be retrieved.

Figure 20:
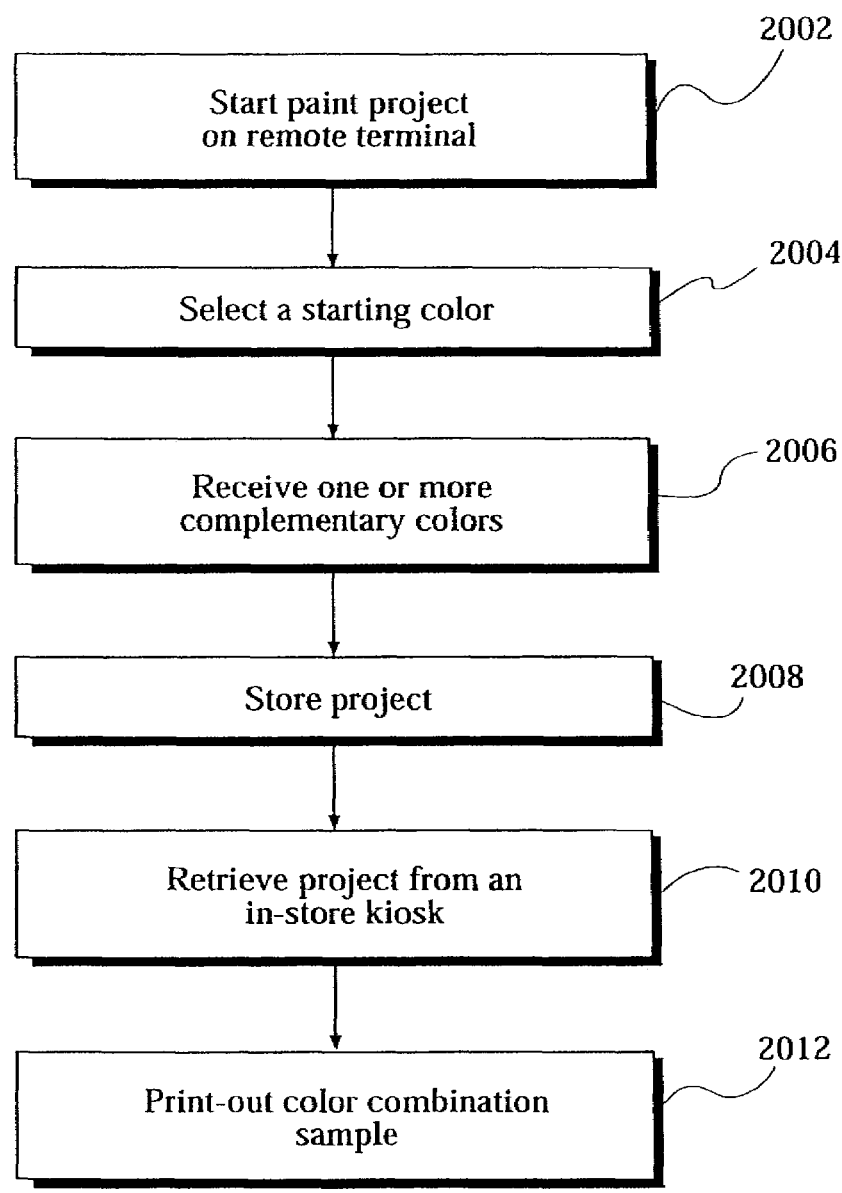
FIG. 20 illustrates one method of using the distributed paint color selection and coordination system according to one implementation of the invention.

FIG. 20 illustrates one method of using the distributed paint color selection and coordination system according to one implementation of the invention. A user may use a home computer to access the Internet and start a paint project 2002, select a starting color 2004, and receive one or more complementary color combinations 2006. The user may familiarize himself or herself with the system and, once done, store the project 2008. The user may then continue his experience with the paint color selection and coordination system when he/she visits a store to purchase the paint needed for the project. The user may utilize a kiosk, such as the one illustrated in FIGS. 1-6, to retrieve the previously stored project 2010, review complementary color combinations provided by the system, fine-tune colors, and/or print out a preview of a selected color combination 2012.

From either a home computer or in-store kiosk, a user may print out an estimate of the different paint colors that will be necessary for the project and/or the color mix or formula for each of the colors in the color combination selected.

Another aspect of the distributed system may include heartbeat monitoring feature. This feature minimizes system downtime by having an in-store kiosk 1902 monitor itself and alert an administrator (e.g., via a server 1910, telephone message, email, blinking light, audible alarm, etc.) if a kiosk stops responding, runs out of paper or ink, some other alert is triggered, etc.

A remote update feature permits content to be distributed to various store locations from a central location. Stores or kiosks can be grouped according to different criteria, such as region, store type, market, etc., and content can be rolled out to various criteria groups. For example, a central server may update a kiosk's color palette, software, graphical user interfaces, etc., remotely. Additionally, different forms of content (e.g., advertising) may be displayed on the kiosk's screen based on the type of store in which it resides.

Figure 21:
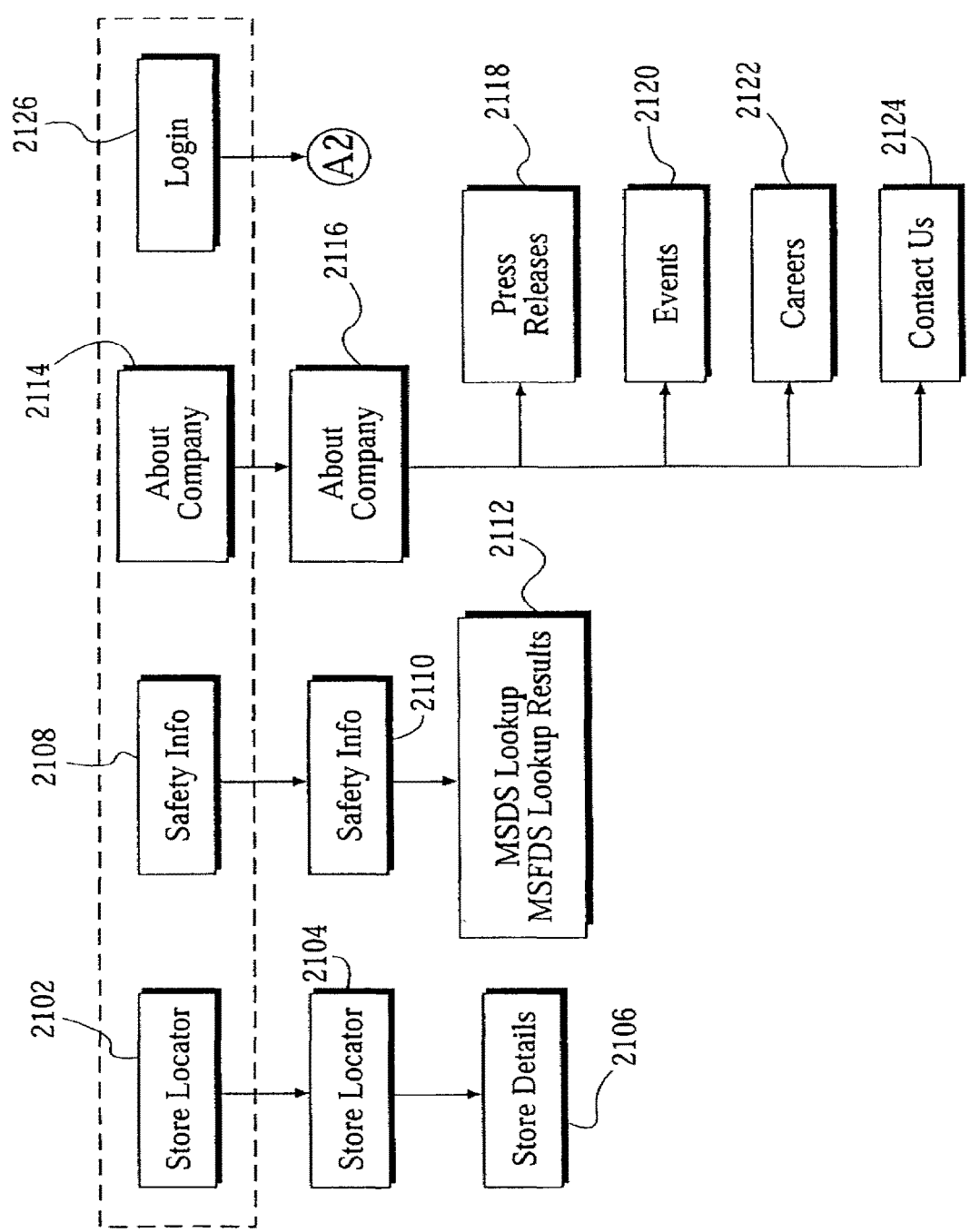
FIG. 21 illustrates one embodiment of a system that may be implemented over the Internet to permit a user to access the paint color selection and coordination system according to one embodiment of the invention.
Figure 23:
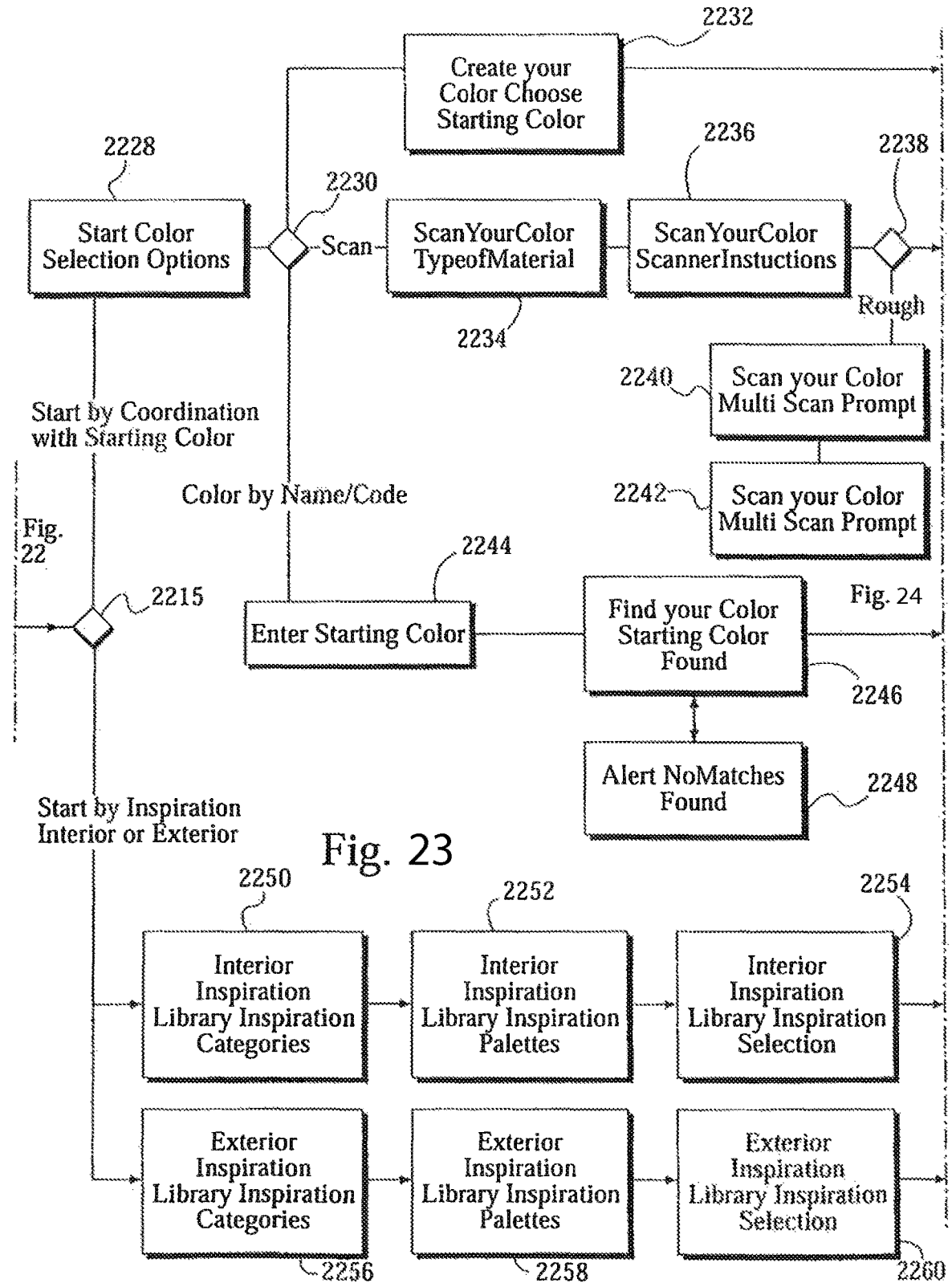
FIG. 23 illustrates a second part of the block diagram for a color coordination and selection application that may be implemented in an in-store kiosk according to one embodiment of the invention.
Figure 24:
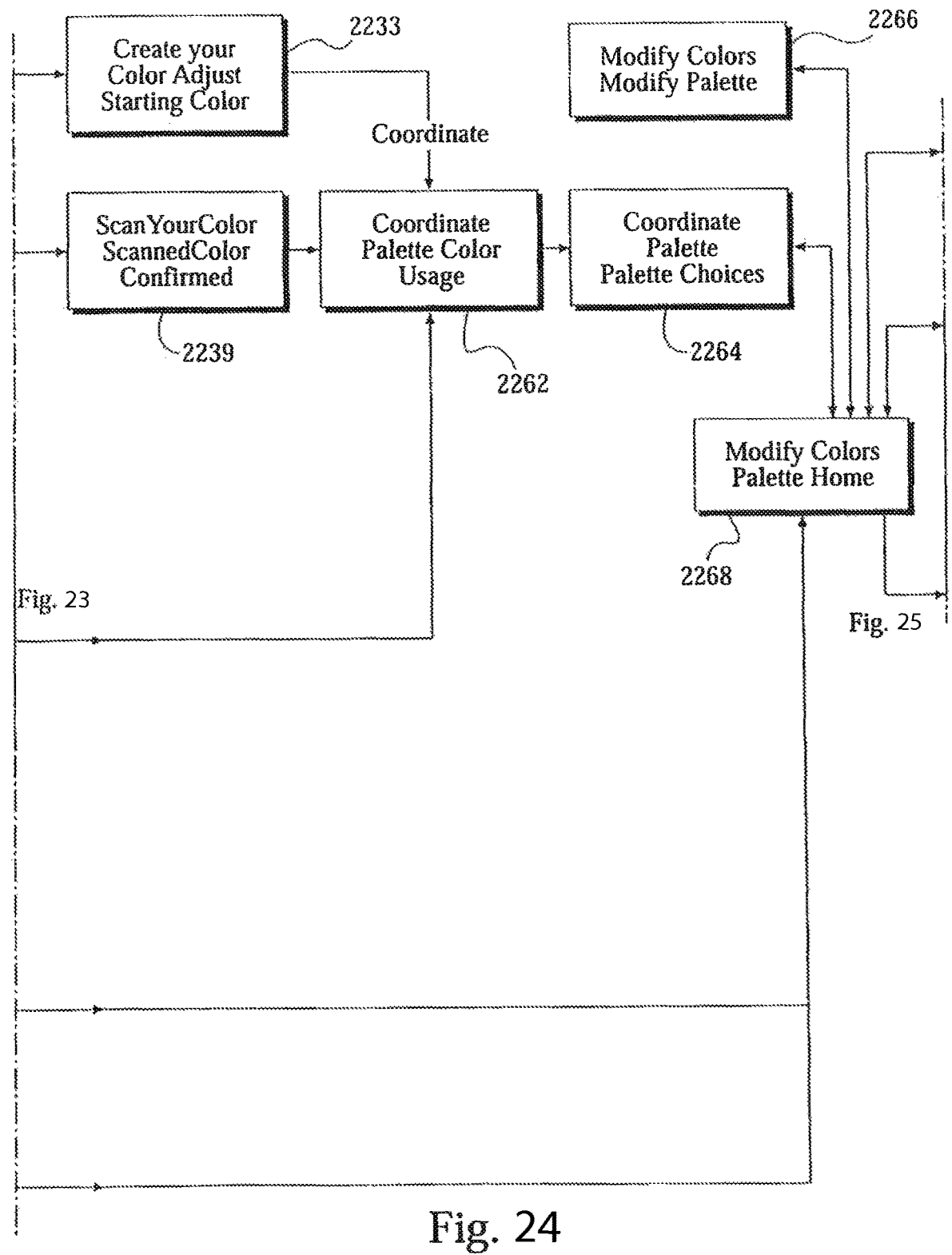
FIG. 24 illustrates a third part of the block diagram for a color coordination and selection application that may be implemented in an in-store kiosk according to one embodiment of the invention.

FIG. 21 illustrates one embodiment of a system that may be implemented over the Internet to permit a user to access the paint color selection and coordination system, described above, over the Internet. A web page may be used where the user can access the color selection and coordination system via the Internet. Such web page may include a store locator option 2102 to permit a user to search and locate a store 2104 and provide details of such store 2106. The web page interactive system may also include safety information 2108 to educate users about paint products, such as the material safety datasheets for one or more products.

The web page may also include a company information option 2114 providing such information as press releases 2118, events 2120, career or employment opportunities 2122 and contact information 2124 for the one or more companies deploying the paint color selection and coordination system. Such web page may also include a login or registration window 2126 to access the paint selection and coordination system over the Internet.

FIGS. 22-27 comprise a block diagram for a color coordination and selection application that may be implemented in an in-store kiosk according to one embodiment of the invention. Referring to FIG. 22, the kiosk may have in an attract loop 2202 in which the kiosk displays a start screen 2204 to entice potential consumers to use the color coordination and selection kiosk. If a user elects to use the kiosk, the start project module 2206 provides the option of logging into an existing project or workbook 2208. Additionally, the module 22065 may also permit the user to view the content in the color coordination and selection kiosk in a different language, such as Spanish 2210 or French 2212. The user may start a project by identifying whether the paint project is an interior or exterior paint project 2214.

The user may then choose a starting color for the project in different ways. One option is for the user to provide the starting paint color 2228. In such option, the user may choose a starting color from a color wheel or table 2232, scan a sample of the desired starting color 2234, or identify the starting color by name, number, or code 2244.

According to one implementation of the invention, a user may be given several options from which to select the starting color 2230. For example, the user may create or choose a starting color by browsing a color palette, color wheel, or any other arrangement of colors 2232 and then adjust that starting color 2233 to the desired hue, chroma, lightness, shade, etc. The user may also scan the desired starting color 2234 based on a sample, such as a fabric or paint chip. The system then provides scanning instructions 2236 to enable the user to scan the color sample into the system. The user is then allowed to scan the color sample 2238, 2240, 2242. Once the color sample has been scanned, a confirmation message notifies the user that the scanning is has been completed 2239. According to a third way of choosing a starting color, a user may provide a color name, number and/or code by which to identify the starting color 2244. The starting color is then searched in a database of color names, numbers, or codes 2246. If a color is not found, the user is alerted 2248.

Once the user has selected a desired starting color, the desired use of the color is specified at step 2262 (FIG. 24), such as interior, exterior, ceiling, walls, floors, etc. Such information permits the system to narrow its color coordination search to the appropriate paint colors. The system then uses its internal color coordination database to provide one or more color coordination schemes that include the desired color 2264. Said color coordination schemes may include one or more colors that are complementary to the selected starting color. The user is then allowed to select one of the color schemes provide by the system.

The selected color scheme may be then be modified 2268 or fine-tuned to desired final colors. For instance, for anyone of the colors shown in the selected color scheme, the user may modify the chroma, hue, shade or tint, lightness or darkness off that color. For this purpose, the system may include a database through which each color that is modified can be referenced 2266. This database permits identifying the next lightest and/or darkest color available. Such database may also permit a user fine-tune retrieve other colors similar in hue or chroma for any given color.

The user is also permitted to print the selected color scheme 2284 (FIG. 25), preview the color scheme 2276 as it would appear in a room, or preview the color scheme as it would appear on an exterior 2270. If the user elects to preview the color scheme in a room 2276, the type or style of room is first selected 2278, such as living room, dining room, kitchen, bathroom, bedroom, etc. The user is then asked to associate the colors in the selected color scheme with one or more of the various surfaces in the room 2280, such as walls, floors, trim, doors, accents, etc. The selected sample room is then displayed in a display screen showing the colors selected by the user on the appropriate surfaces and allowed to fine-tune each color and/or reassign the surface on which it is placed 2282. Similarly, if the user elects to visualize a sample exterior, the user may select an exterior type 2270, and associate the one or more colors of the selected color scheme with the various surfaces 2272, such as exterior walls, doors, trim, accents, etc. The user is then shown the exterior with the selected colors on the associated surfaces 2274 and can fine-tune each color and/or reassign the surface on which it is placed. Note that a particular color in the color scheme may not be used at all or may be place on more than one surface of the preview modules.

The user may then proceed to print out the color scheme and/or room or exterior samples 2284. The print module 2284 provides a user multiple options before printing the selected color scheme. For instance, a user may request an estimate or calculation of the amount of paint that is necessary to paint a room or exterior of the house 2295 and 2296 (FIG. 26), or the user may specify or select sheens for the different surfaces to be painted 2297 and 2298.

According to one implementation of the invention, the system provides the interior paint calculation option 2295. The user is requested to provide the length and width of a room, the number of doors, windows, as well as trim information. Additionally, if a ceiling is being painted, the ceiling type may also be specified. If touchup paint is desired, that option is also provided to the user. Using all this information, the system then provides an estimate or calculation of the amount of paint that would be necessary for such job. This result may provide a user with the amount of each paint color that will be necessary to paint the ceiling, walls, trim, accents, etc. In one implementation of the invention, the user may be given the estimates rounded up to the nearest standard paint container size. Similarly, if the user is intending to do an exterior paint job 2296, the user may be requested to enter the square footage of the home, the number of exterior doors, windows and shutters, garage size, and garage door types, and whether touchup paint is desired. The system then calculates the amount of each paint color that is necessary for such paint job and provides it to the user.

The user may also specify the sheen for the interior and/or exterior paint projects 2297 and 2298. For instance, the user may specify the wall, trim, door, ceiling, shutters, garage, or other paints for either interior or exterior paint projects 2297 and 2298. A summary of the amounts of paint for each color in the selected color scheme is then provided to the user.

Figure 25:
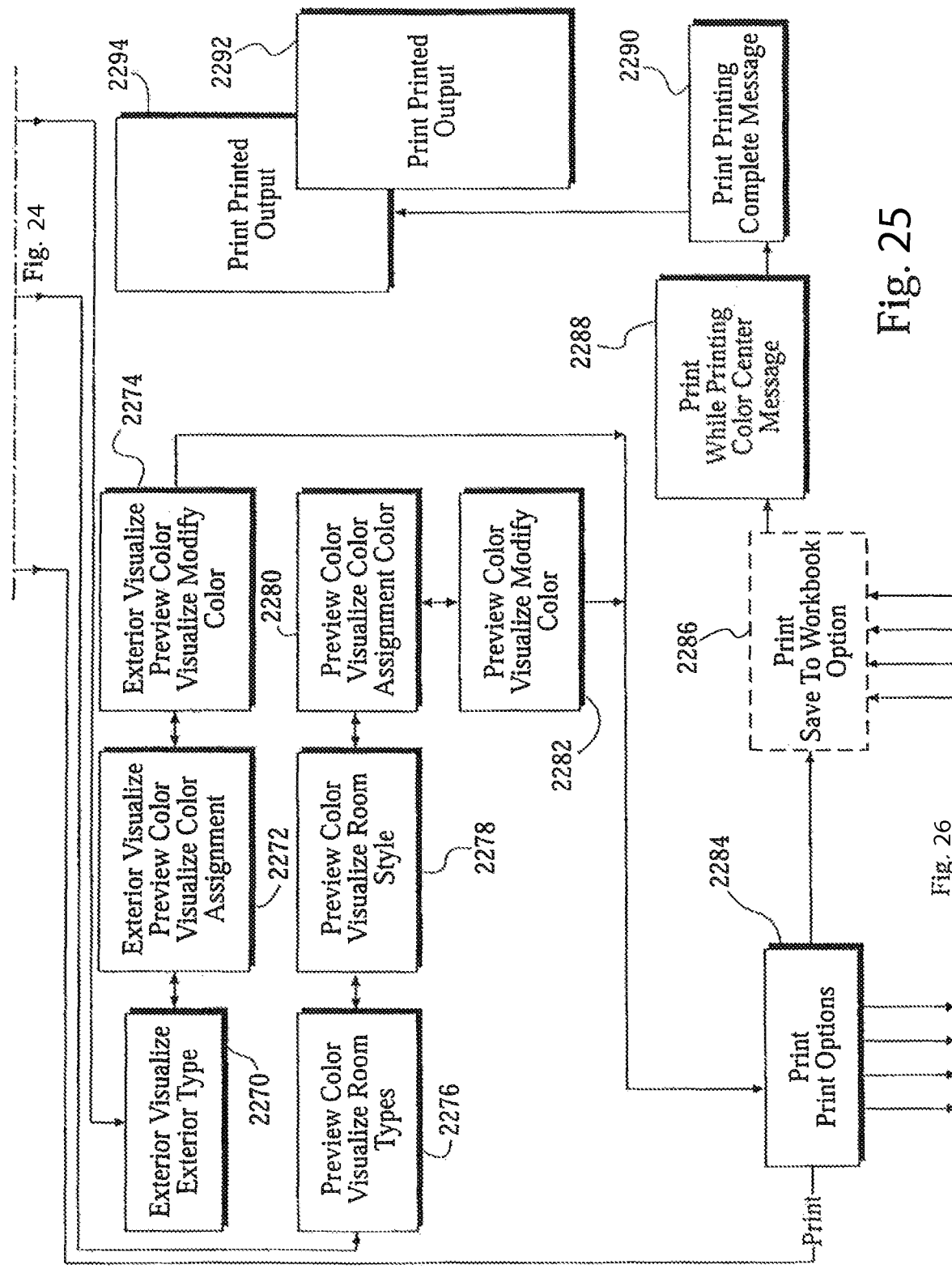
FIG. 25 illustrates a fourth part of the block diagram for a color coordination and selection application that may be implemented in an in-store kiosk according to one embodiment of the invention.
Figure 26:
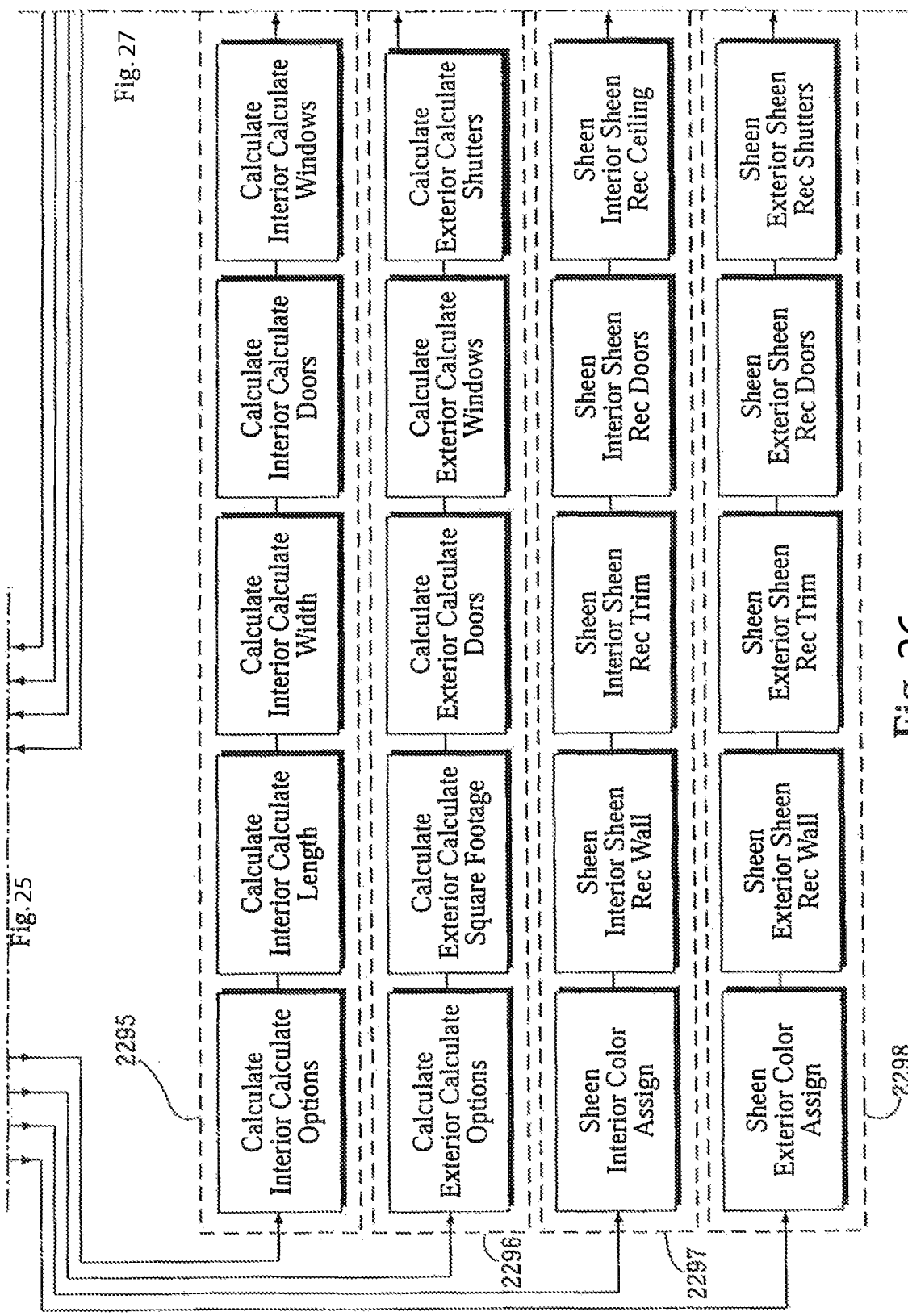
FIG. 26 illustrates a fifth part of the block diagram for a color coordination and selection application that may be implemented in an in-store kiosk according to one embodiment of the invention.
Figure 27:
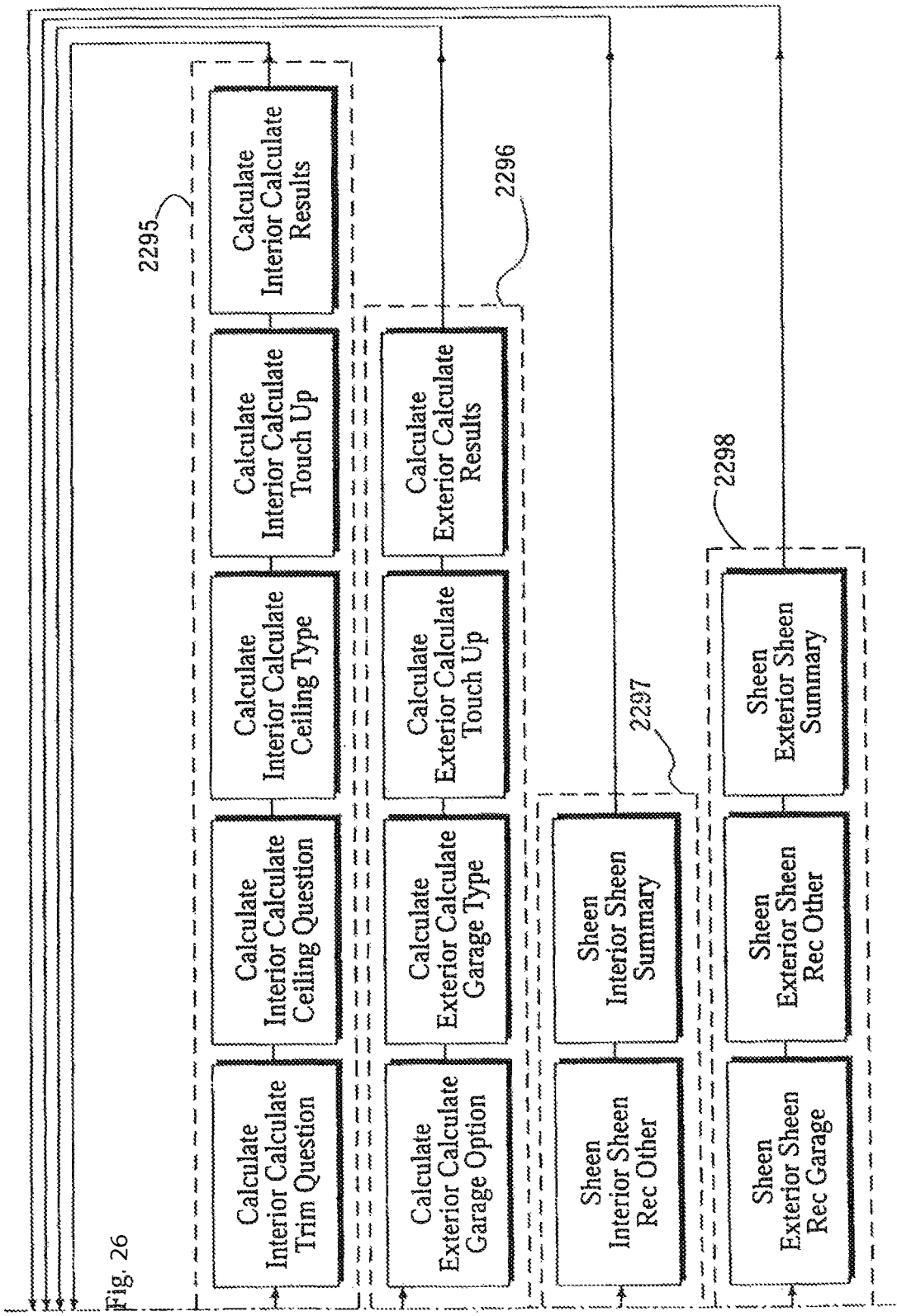
FIG. 27 illustrates a sixth part of the block diagram for a color coordination and selection application that may be implemented in an in-store kiosk according to one embodiment of the invention.
Figure 28:
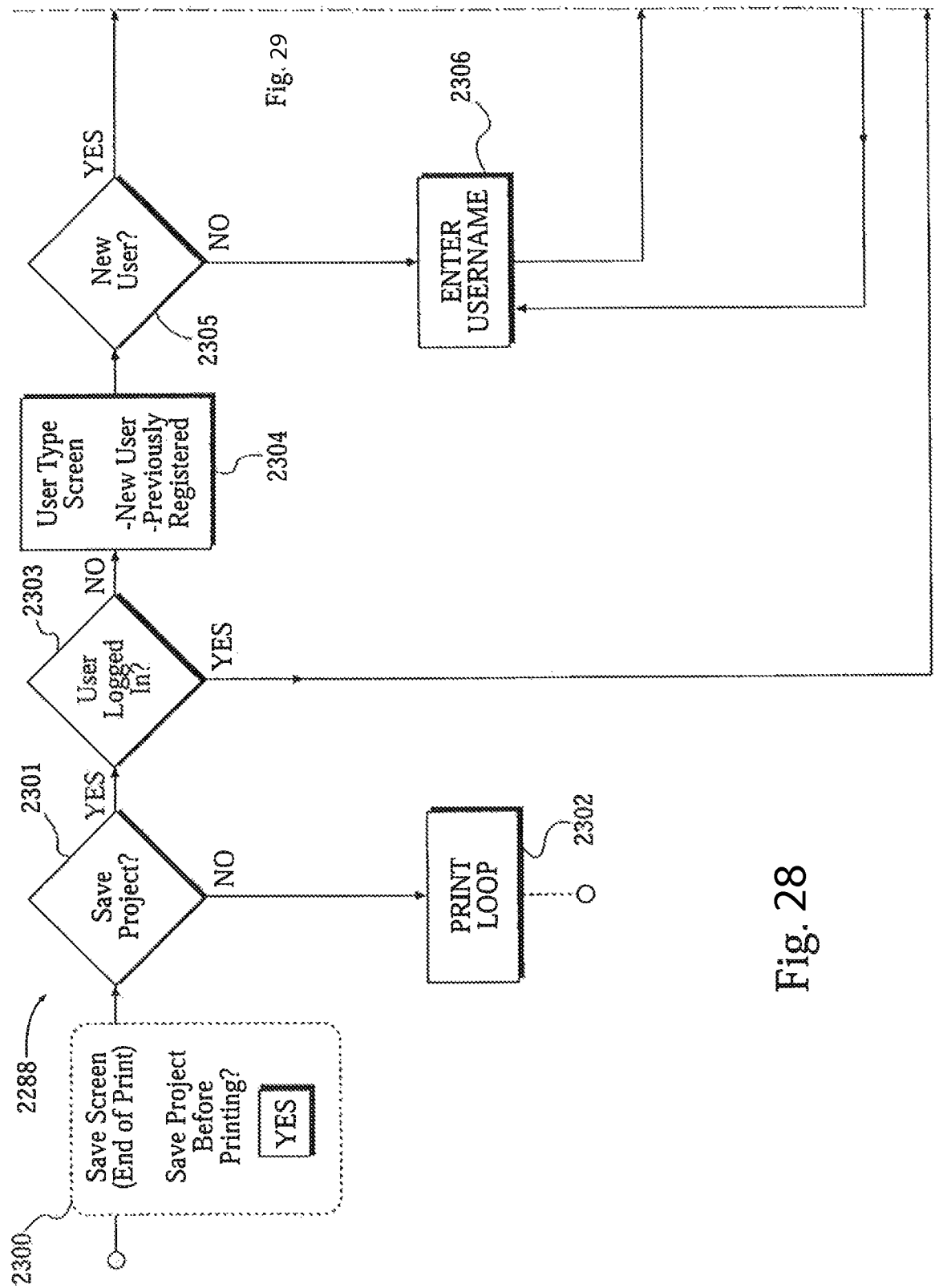
FIG. 28 illustrates part of a block diagram illustrating the details of the printing process of block 2288 of FIG. 25 according to one implementation of the invention.

The user is then given the option to either print or save the selected and/or fine-tuned color scheme and information 2286 (FIG. 25). If the user elects to print, a message appears on a screen 2288 while the selected color scheme is printed. When the system is done printing the information, a message is displayed which indicates that the printing has been completed 2290, and the printed pages are outputted from the color coordination kiosk 2292 and 2294 (FIG. 25).

Referring again to FIG. 23, the user may also elect to use the interior or exterior inspiration libraries 2250 and 2256, which include one or more inspiration categories from which to choose color schemes or ideas. The inspiration libraries may also include inspiration palettes, such as color wheels or color tables, 2252 and 2258 from which the user may make a selection 2254 and 2260. Having selected a desired color scheme, the user is taken to the color scheme home 2268 from where the user may print out, edit, preview or save color schemes as previously described.

According to one implementation of the invention, the system may include one or more alerts to enable various features. For instance, the system may provide the user a start-over feature and confirmation 2216 (FIG. 22) to enable the user to go back to the starting window 2206. Another alert may indicate that the printer is not in service 2218 or that the color sample scanner needs calibration 2220. Yet other alerts indicate where the scanner needs servicing 2222. Additionally, the system may also indicate that a question is found out or that a particular sheen color is a custom color 2226. The system may also keep track of the percentage of times sessions have timed out, the number of times the customers have requested to start over, and generally how many times each time of alert has been triggered.

FIGS. 28-32 comprise a block diagram illustrating the details of the printing process of block 2288, in FIG. 22, according to one implementation of the invention. The user is asked whether the project will be saved prior to printing 2300 and 2301. If not, then the color scheme and information are printed 2302. However, if the user elects to save the project prior to printing, the system then checks if the user is logged in 2303.

If the user is already logged in, then the process proceeds to requesting a project name 2356 (FIG. 32) for the project. Once the user provides a name for the project 2356, the system then checks if it is connected 2359 to a server or other storage facility for instance. If the system is connected to a server or storage facility, then the project is saved 2358. Otherwise, if the system is not connected, then the system indicates the project will be saved upon the next successful connection 2360, and then proceeds to print the color scheme and information selected 2362. The system then displays a print complete message 2290 (FIG. 25).

Figure 29:
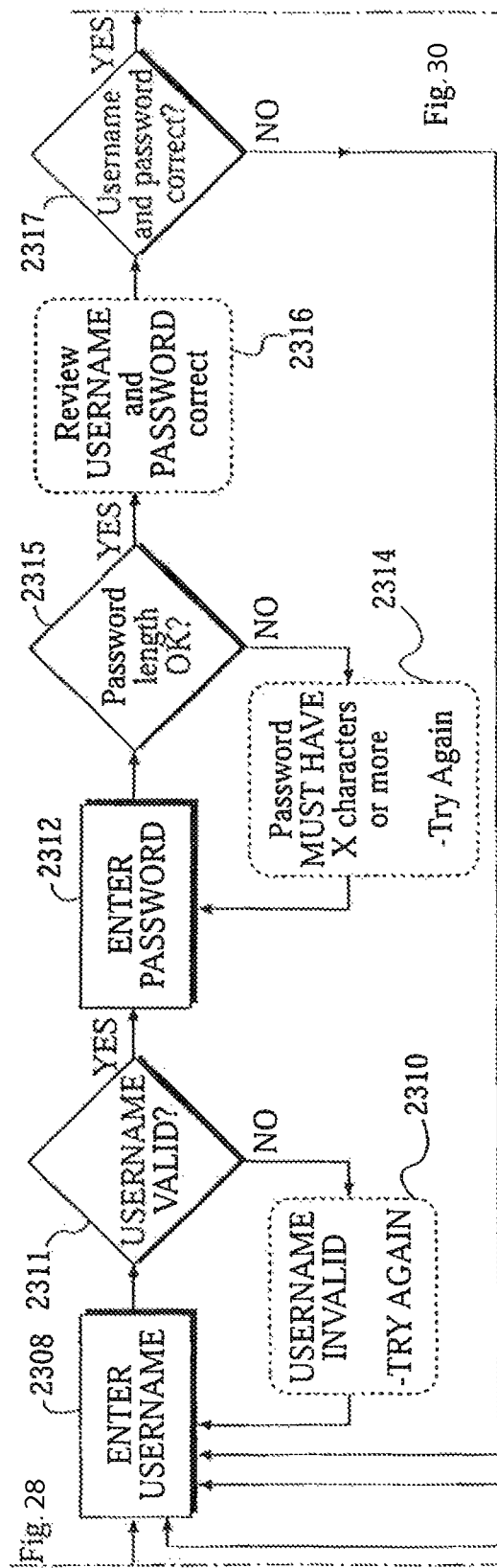
FIG. 29 is a second part of the block diagram illustrating the details of the printing process of block 2288 of FIG. 25 according to one implementation of the invention.
Figure 30:
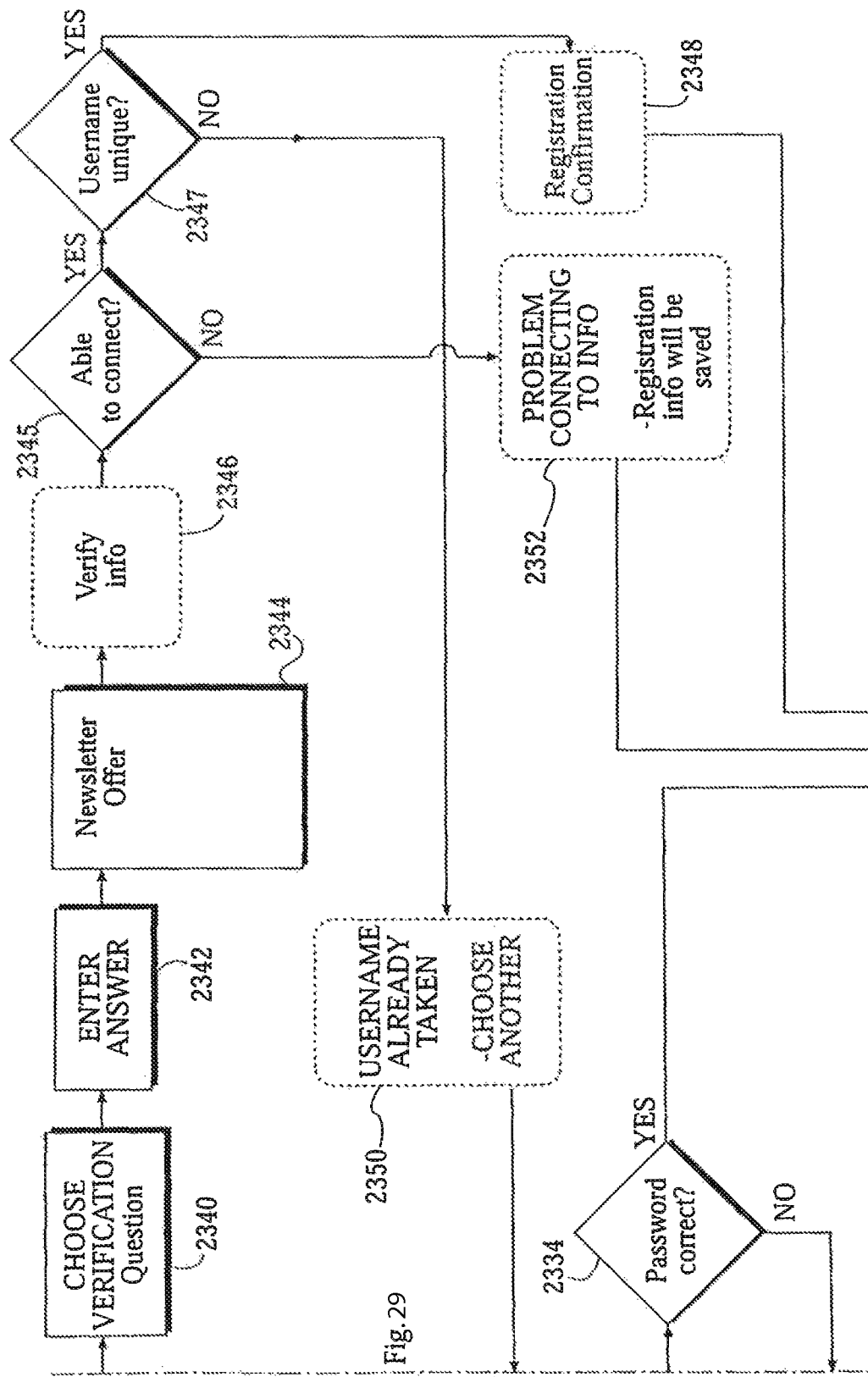
FIG. 30 is a third part of the block diagram illustrating the details of the printing process of block 2288 of FIG. 25 according to one implementation of the invention.
Figure 32:
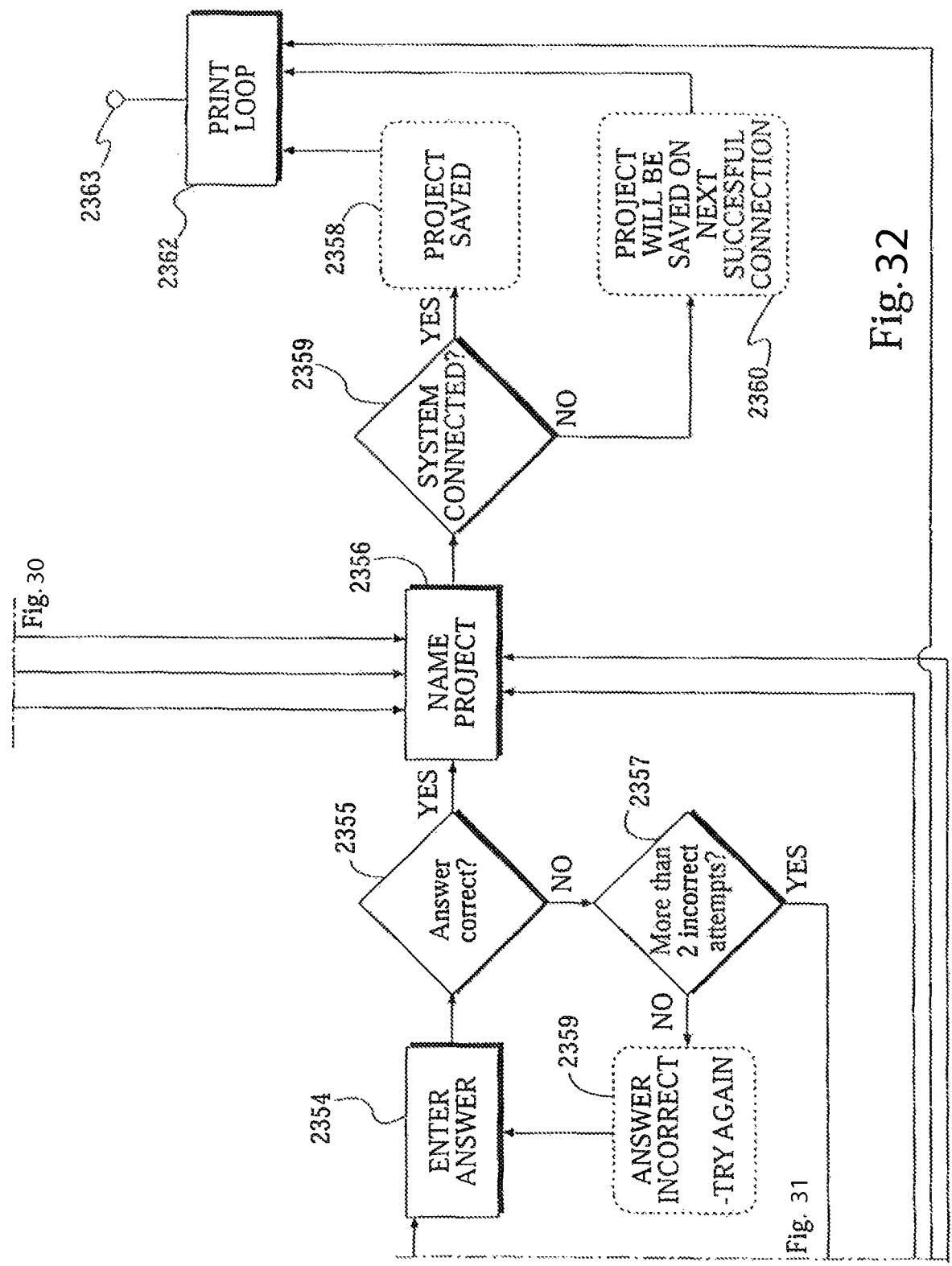
FIG. 32 is a fifth part of the block diagram illustrating the details of the printing process of block 2288 of FIG. 25 according to one implementation of the invention.

Referring again to FIG. 28, if the user is not logged into the system 2303, the user is given an option to either register as a new user or login as a previously registered user 2304. If the user elects to register as a new user 2305, then the user is requested to enter a username 2308 (FIG. 29). The system then checks if the username is valid 2311. For instance, the system may check if the username is a valid e-mail address. If a user name is not valid 2310, the system requests that the user enter a valid username 2310. Upon providing a valid username, the system then requests the user to enter a password 2312. The system may check the password to see if it is of an appropriate length 2315. For instance, the system may require a password be greater than three characters long. If a password does not have the minimum required number of characters 2314, then the system requests that the user enter another password 2312. Upon entering an appropriate password of an appropriate length, the system then requests the user to review the username and password 2316. If the username and password are correct 2317, then the new user is asked to choose a verification question 2340 (FIG. 30). A verification question serves to identify a user who has forgotten either the username and/or password. A user may select from a number of predefined verification questions or may provide their own verification questions 2340. The system then requests the user enter an answer for the verification question 2342. When the user has entered all this information, the system may also give the new user the opportunity to sign up for a newsletter offer or some other offer 2344. The system then verifies 29 the information provided by the user 2346. The system may check whether it is connected to a central database or server 2345 in which it can check the username and/or password provided. When the system is able to connect to a central database or server, for instance, it then checks whether the username is unique 2347. If the username is unique, then the user is provided with confirmation of the registration 2348. If the username is not unique, then the system informs the user that the username is already taken 2350 and requests that the user provide another username. If the system is unable to connect, then it informs the user that it is having problem s connecting to verify the information 2352 and notifies the user that the registration information will be saved and verified later. The system then proceeds to permit the user to enter a project name 2356 (FIG. 32). From this point on, the system checks whether it is connected and can save the project, and then proceeds to save and/or print the project as previously described.

Referring again to FIG. 28, if the user is not a new user 2305, then the system requests the user enter a username 2306. The system then verifies whether the username is correct 2318 (FIG. 29). In one implementation, the system may check whether the username provided is in the format of a valid email address. In another implementation, the system may check a local user registry first. If a username is incorrect or not found 2318, then the system may access a central database or server 2322 and request user information.

Figure 31:
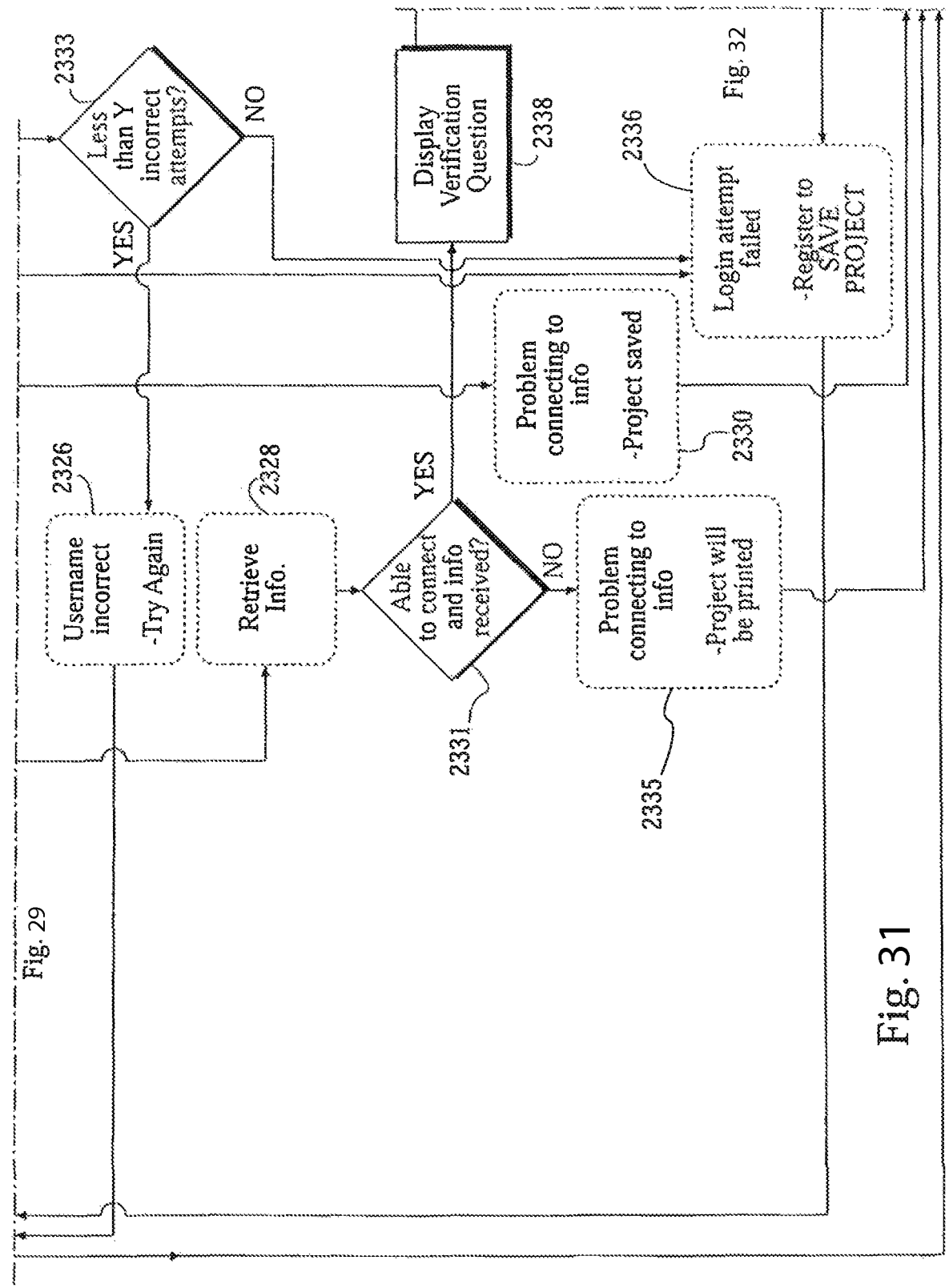
FIG. 31 is a fourth part of the block diagram illustrating the details of the printing process of block 2288 of FIG. 25 according to one implementation of the invention.

If the system is able to connect to the central database 2329, it then verifies whether the username is correct 2332. If the username is correct, then the user is requested to enter a password 2320. If a user has not forgotten his password, then the username and password are checked. The system connects to the database 2322, retrieves the information, and checks it 2329. If a username and password are correct 2332, 2334 (FIG. 30), then the user is requested to enter the project name 2356 (FIG. 32), and may proceed to save the project as well as print the selected color scheme 2363. If the user's name is incorrect 2332 (FIG. 29), the user is requested to try to enter the correct name again 2326 (FIG. 31). In one implementation of the invention, the system may keep track of how many times the user has entered an incorrect username 2333 (FIG. 31). If the maximum number of times has been reached, then the system indicates to the user that login has failed 2336 and requests that the user register as a new user to save his project.

If a user's password is incorrect 2334 (FIG. 30), then the system indicates to the user that the password is incorrect 2324 (FIG. 29) and requests that another password be entered 2320. If the user indicates that he has forgotten his password 2321, then the system may retrieve such information 2328 (FIG. 31). If the system is able to connect or retrieve such information 2331, then the system displays the verification question for the user 2338 and requests that a user provide an answer 2354 (FIG. 32). If the answer is correct 2355, then the user may proceed to enter a project name and save and print the project. If a user's answer is incorrect, then system indicates to the user that the answer is incorrect 2359, and requests that a new answer be entered 2354. If the system detects that the user has entered more than the maximum number of incorrect answers 2357, then the system may request that the user register to save the project 2336 (FIG. 31). According to one implementation of the invention, the system may also operate over a private or public network and/or the Internet.

Figure 33:
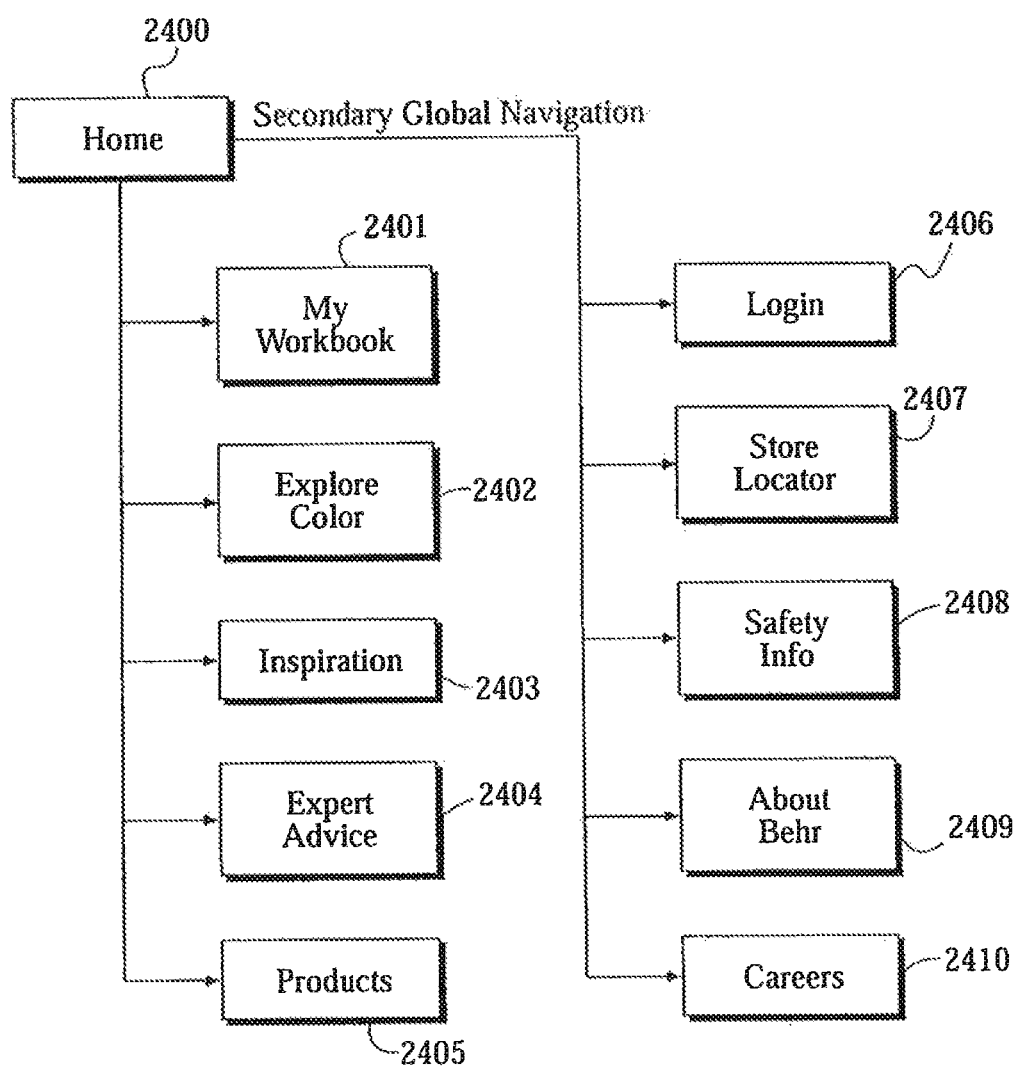
FIG. 33 illustrates a first part of a block diagram illustrating of a network-based color coordination and selection application according to one implementation of the invention.
Figure 34:
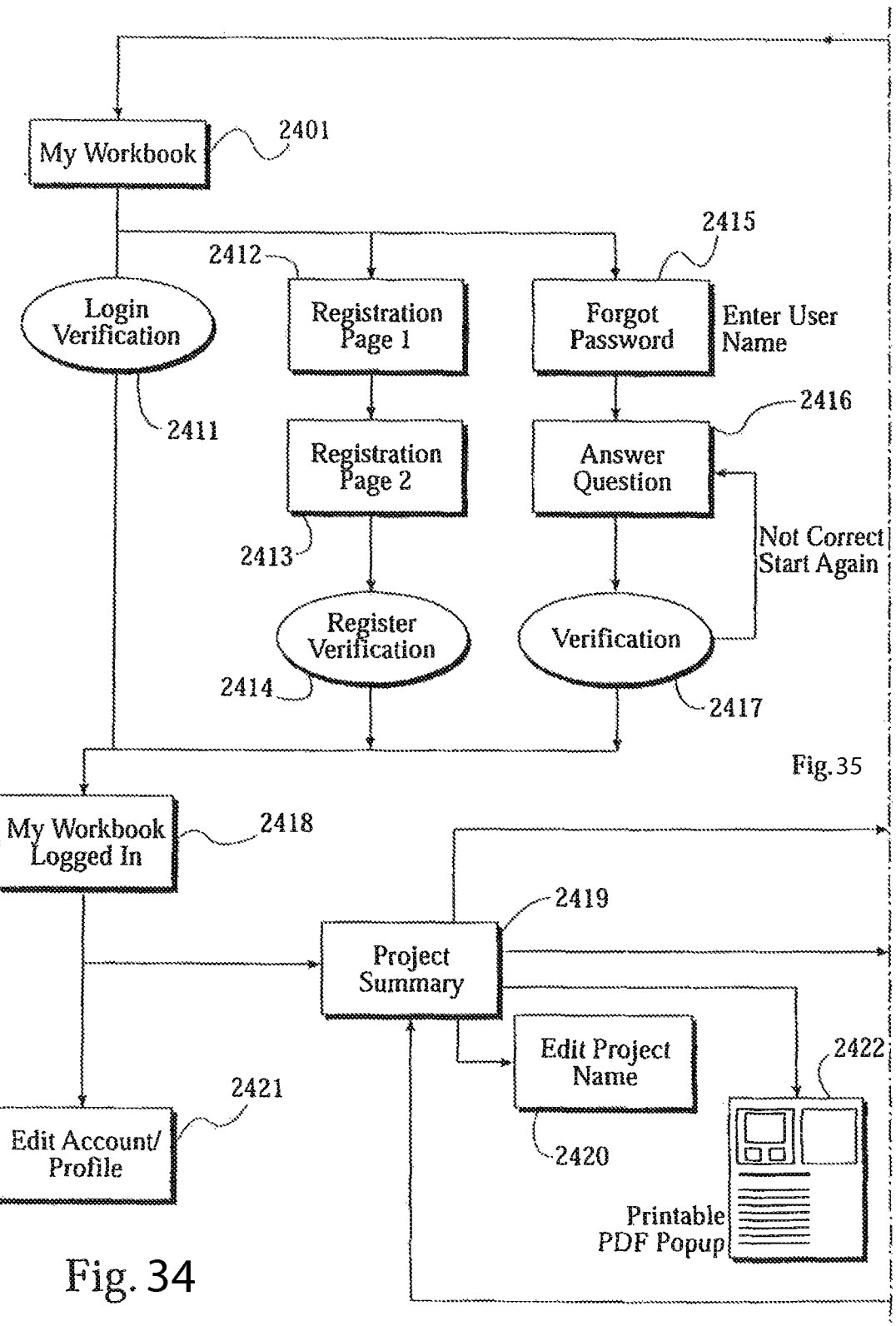
FIG. 34 is a second part of the block diagram of a network-based color coordination and selection application according to one implementation of the invention.

FIGS. 33-34 are a block diagram illustrating a network-based color coordination and selection application according to one implementation of the invention.

FIG. 33 is an overview of the system indicating the starting point 2400 from which the user can select several color coordination and selection options. Along the color coordination options, the user may select to work in a Workbook 2401 which may include previously saved projects, explore new colors from a color palette 2402, browse inspirational ideas 2403, seek expert advice 2404 on painting and painting tools, and/or may request product information 2405. Additionally, a secondary set of menu options permits the user to log into the system 2406, find store locations 2407, request safety information 2408, find out more about the paint particular company 2409, or seek out careers within that paint company 2410.

FIG. 34 illustrates the options that are available to the user under the Workbook 2401 category. The user may log into the system 2411 or register as a new user 2412, 2413. The system then verifies the user registration information 2414.

If the user has forgotten his or her password, the user may seek to retrieve said password 2415. The system asks the user to answer a particular verification question 2416 which was selected by the user and for which the user has provided an answer during registration. The system verifies whether the answer provided by the user is correct 2417. If said answer is correct, then the user is allowed to proceed 2418. Otherwise, the user is requested to enter the answer again.

Figure 35:
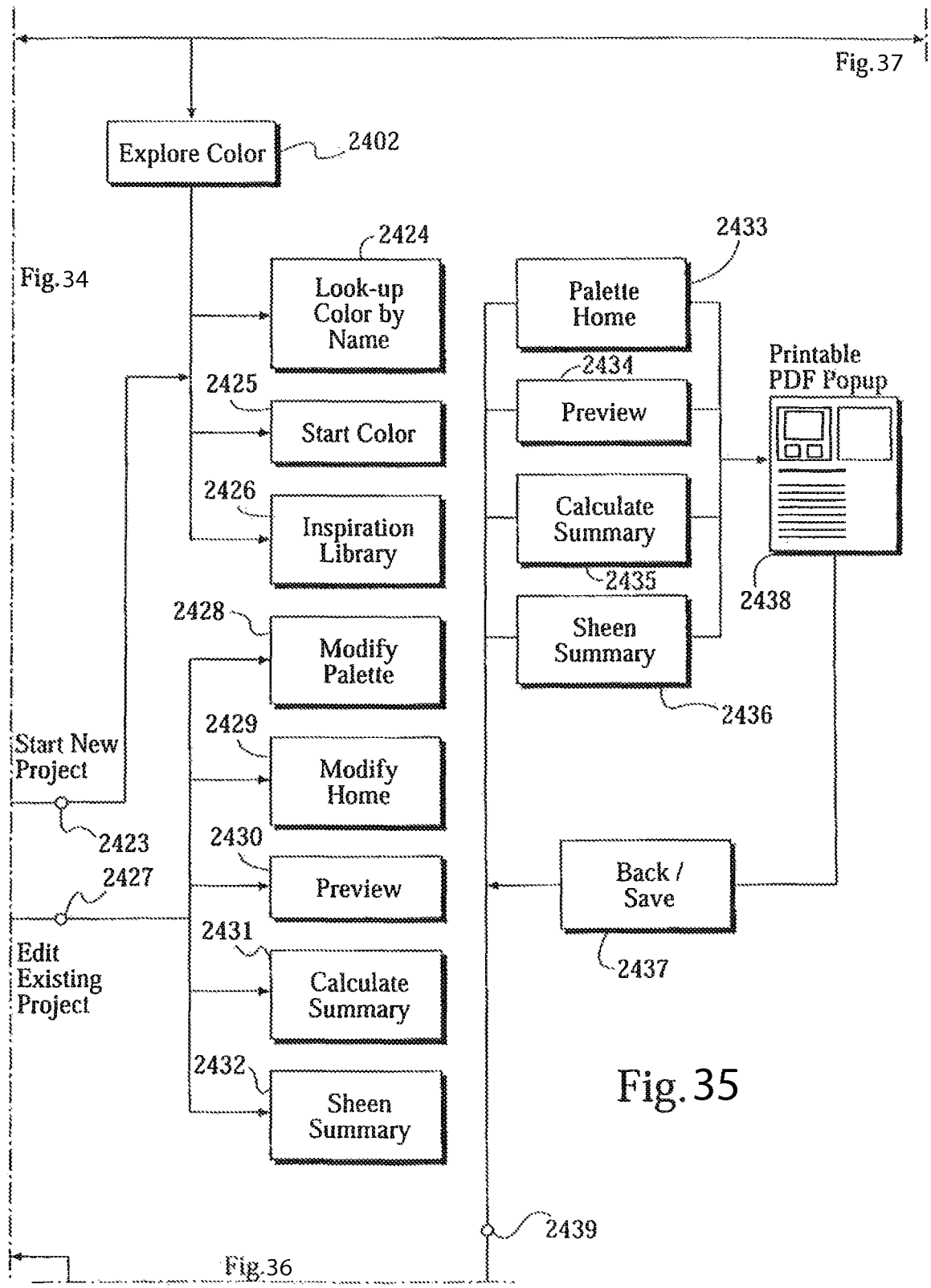
FIG. 35 is a third part of the block diagram of a network-based color coordination and selection application according to one implementation of the invention.

If the user is allowed to proceed through any of these login options, then an indication is given that he or she is logged in 2418. The user is permitted to edit a previously saved project 2419, create a new project, and/or edit account information or profile information 2421. For the project summary 2419, the user may either enter a new project name or edit an existing project name 2420. The user may then proceed to either start a new project or edit an existing project. If the user elects to start a new project 2423 (FIG. 35), various options are available to the user in starting said project. Through the Explorer color module 2402, the user is able to look up a color by name or number 2424, select a starting color from a color palette or table 2425, or browse an inspiration library 2426 for a desired color. Additionally, if the user wishes to edit an existing project 2427, the user is given the option to modify a color palette, modify a color palette 2428, modify the previously selected color scheme 2429, or preview the desired color scheme within a sample room or exterior of a house 2430. Additionally the user is given the option to calculate the amount of paint that is necessary 2431 and edit the paint color sheen of the selected paint colors 2432. With any of the above mentioned color selection and modification options, the system enables a user to save and/or print a selected color scheme. The user may print the selected color palette 2433, print the preview showing the colors on an interior room and/or exterior of the house 2434, print out a summary of the amount of paint that is necessary for a particular project 2435, or print out a summary of the sheens that have been selected for the particular project 2436. Through any of these options, a printable pop-up window displays 2438 that permits a user to either print and/or save said window 2437. The system then proceeds to save the desired project 2439.

Figure 36:
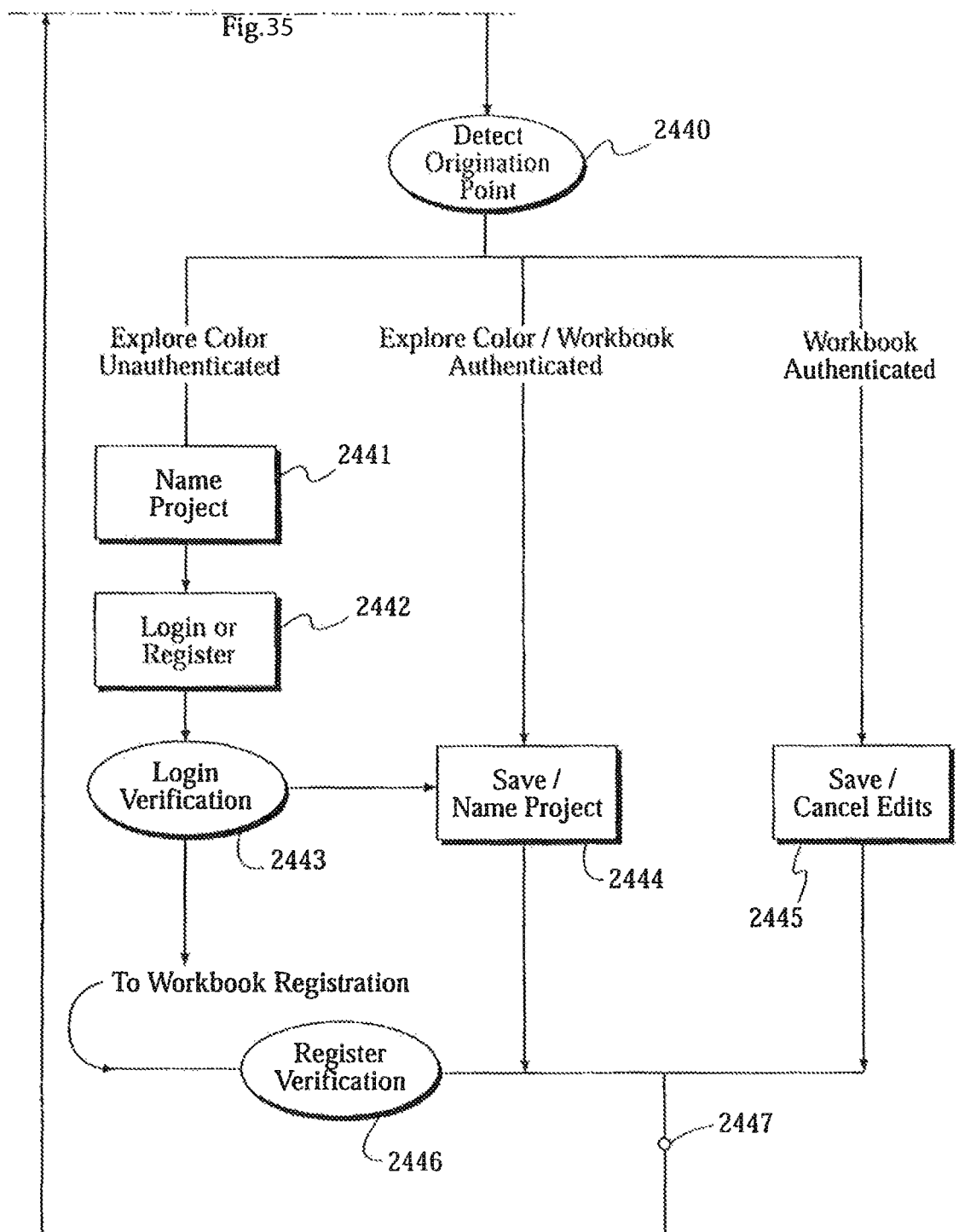
FIG. 36 is a fourth part of the block diagram of a network-based color coordination and selection application according to one implementation of the invention.

Referring to FIG. 36, the system detects the origination point of the project 2440. That is, the system determines whether the user has come through the Explorer Color option 2403 or My Workbook option 2401 and/or whether the user is registered or logged in. If the system detects that the Workbook 2401 is authenticated or the user is logged in, the system proceeds to save the project under a new name 2444 or without saving changes 2445. The system then returns to the project summary window 2419 (FIG. 34).

If a user is not authenticated or not logged in, the project name is requested 2441 (FIG. 36), and then the user is requested to log in or register 2442. If a user logs in, then the login information is verified 2443, and the project is saved 2444. Alternatively, if the user is a new user, the user is requested to register and the registration information is verified 2446. The project is then saved and the user returned to the project summary window 2419 (FIG. 34).

Figure 37:
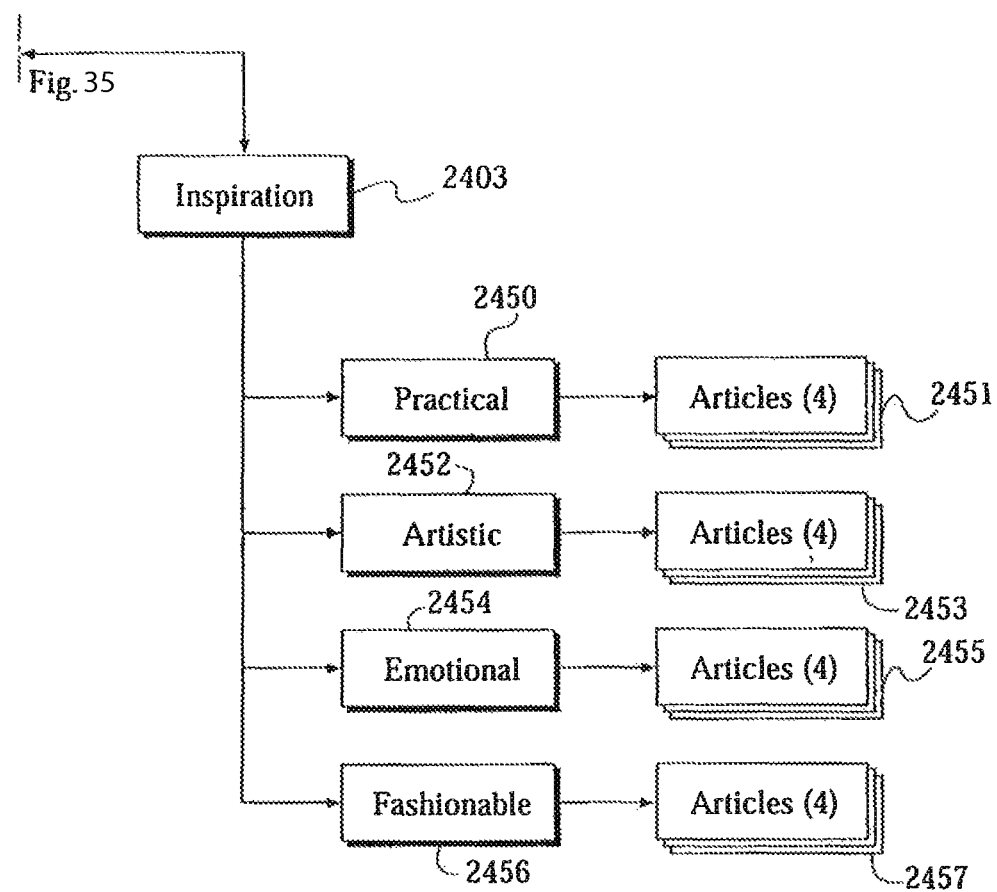
FIG. 37 is a fifth part of the block diagram of a network-based color coordination and selection application according to one implementation of the invention.

Referring now to FIG. 37, if the user elects to browse the inspiration library 2403, various categories of inspirations may be available. For instance, in one implementation of the invention, a practical color scheme category 2450 may include one or more articles 2451 which provide practical colors for different types of rooms or exteriors or lifestyles. Another category may provide artistic colors 2452 with one or more articles showing or describing such color schemes 2453. An emotional category 2454 may provide articles 2455 illustrating color schemes that reflect various emotional states. A fashionable category 2456 may include articles 2457 that are trendy or the current style.

Figure 38:
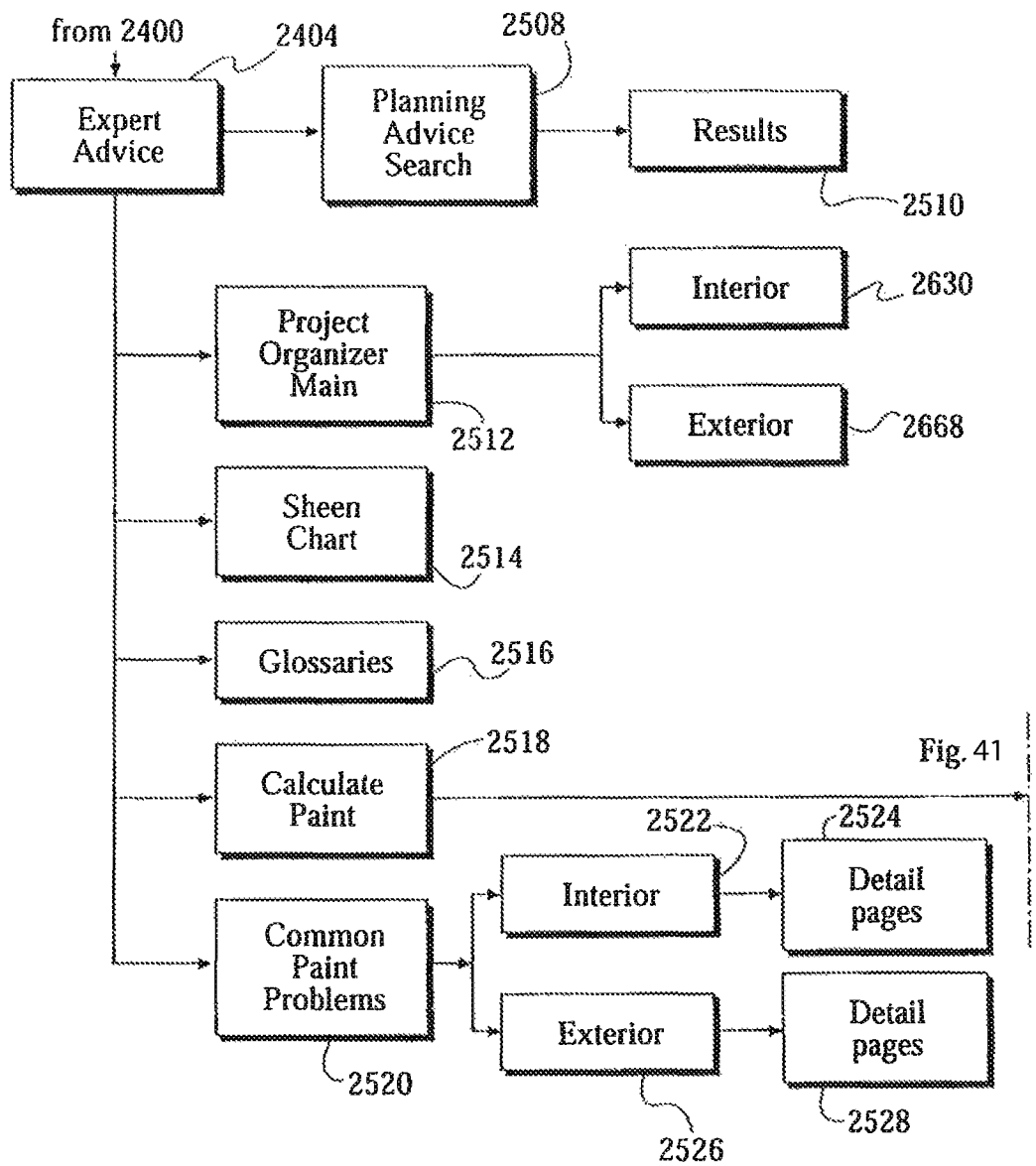
FIG. 38 is a sixth part of the block diagram of a network-based color coordination and selection application according to one implementation of the invention.

Referring now to FIG. 38, if a user selects the Expert Advice option 2404, a search capability 2508 is available from which the user can provide key words or terms, and results are displayed for the user 2510. Additionally, the user may be provided with a plurality of categories from which to browse or search. For instance, the project organizer category 2512 may enable a user to organize interior 2630 or exterior 2668 paint projects, a sheen chart category 2514 may enable a user to learn about various different paint sheens, and a glossary 2516 enables a user to quickly find information related to paint and painting projects. A paint calculator 2518 allows a user to calculate or estimate the quantity of paint that may be necessary for a particular project. A common paint problems option 2520 provides the user information about how to solve interior and/or exterior paint problems 2522, 2524; 2526, 2528 that may exist prior to, during, or after painting.

Figure 39:
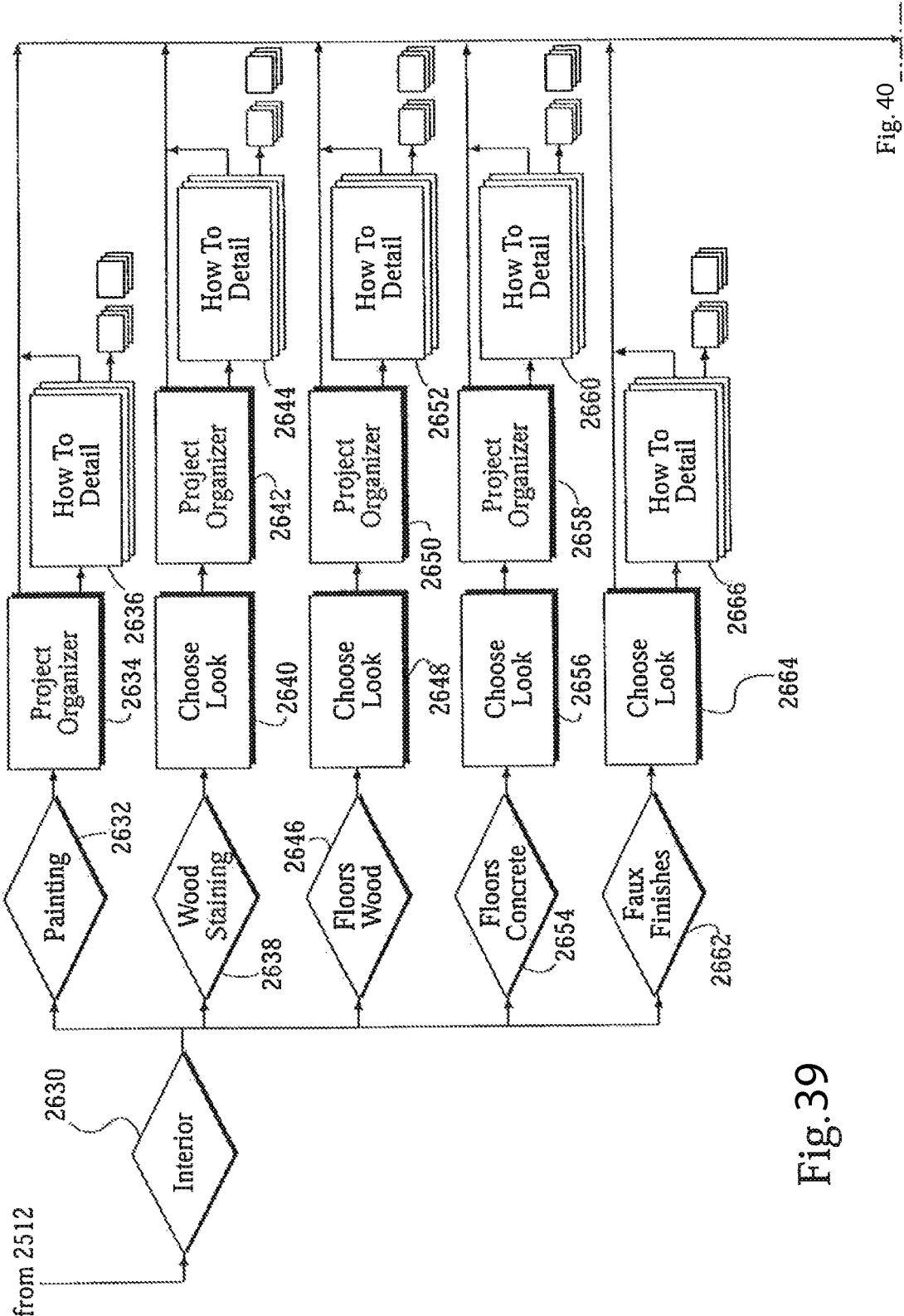
FIG. 39 is a seventh part of the block diagram of a network-based color coordination and selection application according to one implementation of the invention.

If a user selects the paint organizer option 2512, then either the interior or exterior category may be available 2630 and 2668. If a user selects the interior category 2630, then various options for painting interiors and house walls, for instance, may be available. For typical painting projects 2632 (FIG. 39), the system provides project organization tools 2634 and details as well as the required tools, etc. 2636, may be available to the user. Additionally, if the user selects to stain wood 2638, then the desired look may be selected 2640, and the project organizer 2642 may provide organization ideas 2642, details on how to perform the project 2644 and the required tool information. If the user wishes to paint or stain wood floors 2646, the desired look may be chosen 2648, and again, a project organizer 2650 may provide the details, tools and information on how to perform such tasks. Additionally, if concrete floors are to be painted 2654, again, the user may select the look desired for the concrete floor 2656, and a project organizer 2658 may take the user through the necessary tools and information 2660 to perform the project. The user may also select faux finishes for interiors 2662, and again the system may provide the desired looks 2664 from which to choose, and details on how to perform said project 2666 to obtain such look.

Figure 40:
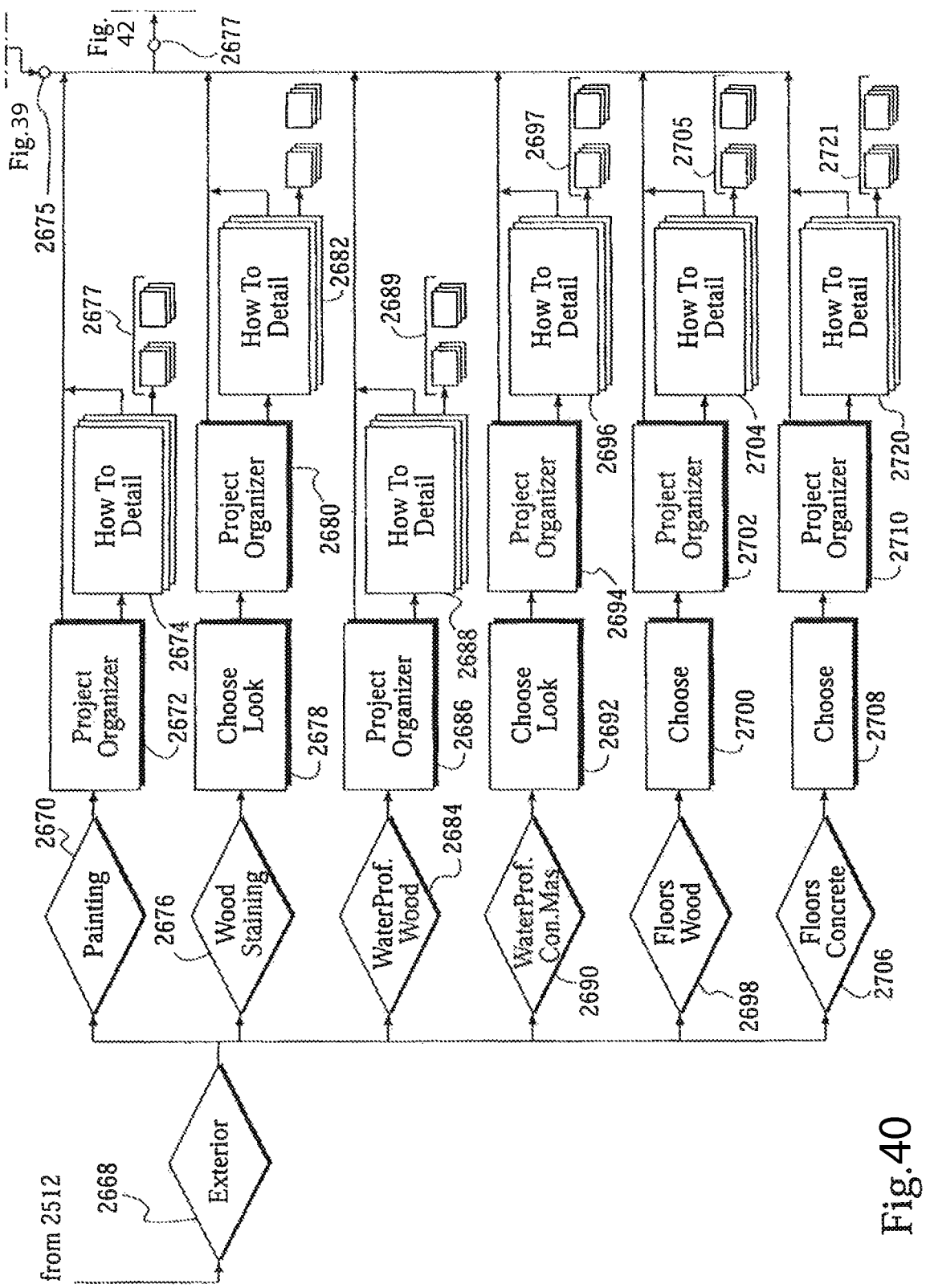
FIG. 40 is an eighth part of the block diagram of a network-based color coordination and selection application according to one implementation of the invention.

Similarly, if a user selects to organize the lookup information on exterior paint projects 2668 (FIG. 40), the user is provided with a painting category 2670, wood staining category 2676, waterproofing category for wood 2684, waterproofing category for masonry 2690, painting or staining of wood floors 2698, and painting or staining of concrete floors 2706. For each category, the system may provide a project organizer 2672, 2680, 2686, 2694, 2702, and 2710 and enables the user to select the look 2678, 2692, 2700, and 2708 for the painting or staining project. Additionally, the system may also provide details 2674, 2682, 2688, 2696, 2704, and 2720 on how to perform each one of these projects and the necessary tools to do so 2677, 2689, 2697, 2705, and 2721.

Figure 42:
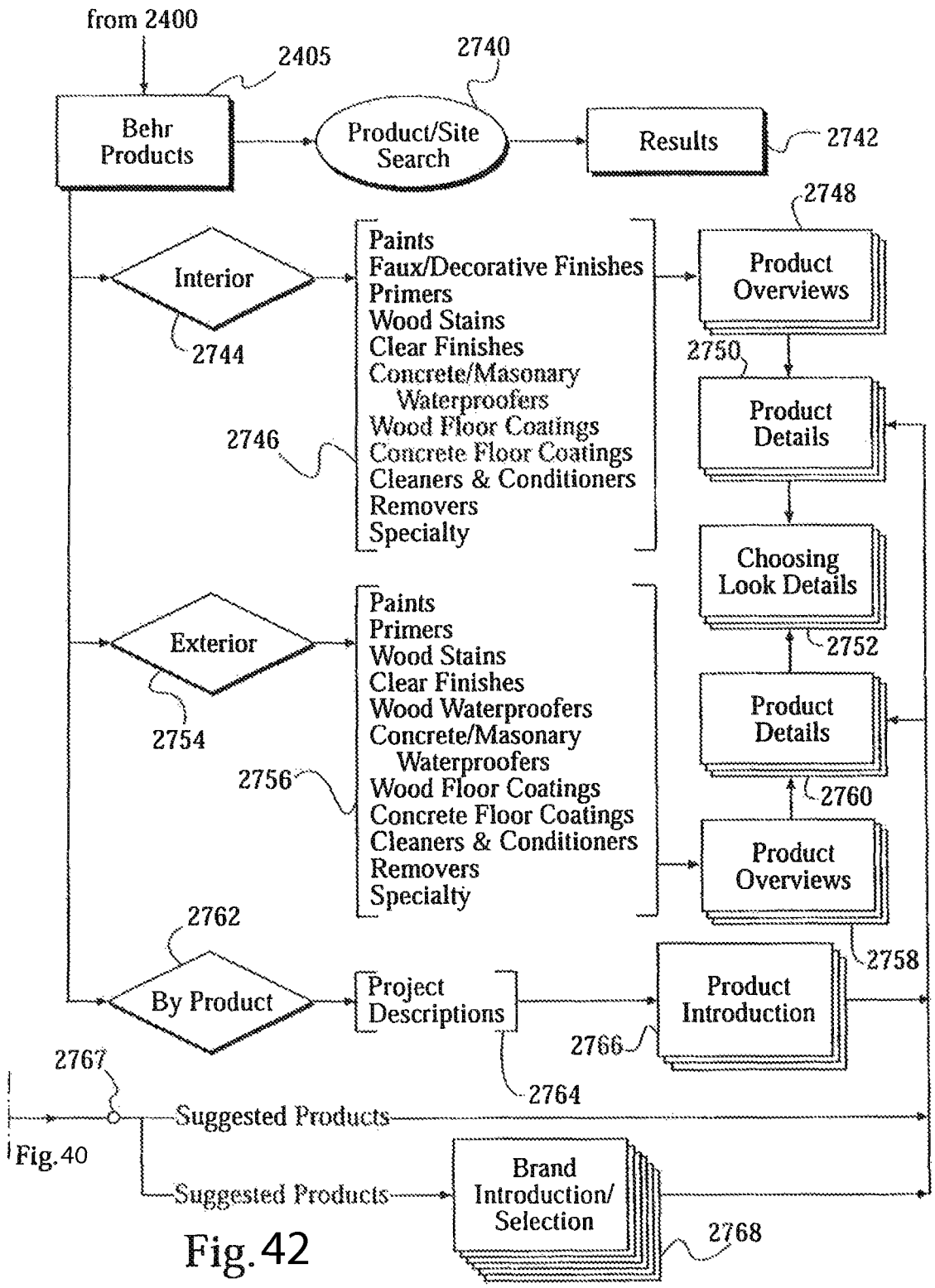
FIG. 42 is a tenth part of the block diagram of a network-based color coordination and selection application according to one implementation of the invention.

Once the user has viewed the selected information for interior or exterior projects, the system may then take the user to product details information, FIG. 42, under the products module 2400 (FIG. 33). This module is also reached if the user has selected to find out product information 2406. In either case, the products module 2405 (FIG. 42) provides the user with particular products that are available to perform the selected paint project. For example, if an interior project is desired, the differing stains, primers, finishes, waterproofers, etc. 2746, may be shown and/or described. The system may also provide product overview 2748 and details 2750 as well as allowing the user to select the look for said stain, finish, etc. 2752. Similarly, if the user selects to paint an exterior 2754, then various products are shown 2756, and a product overview 2758 and details 2760 may be available to the user. In another implementation of the invention, the categories may also include or be organized in terms of particular projects 2762 such as woodworking, decks, etc., and similar project descriptions 2764 and product information 2766 may be available. When the user reaches to the products module 2405 from the expert advice module 2404, the system may suggest products and/or introduce new products 2768 to the user.

Figure 41:
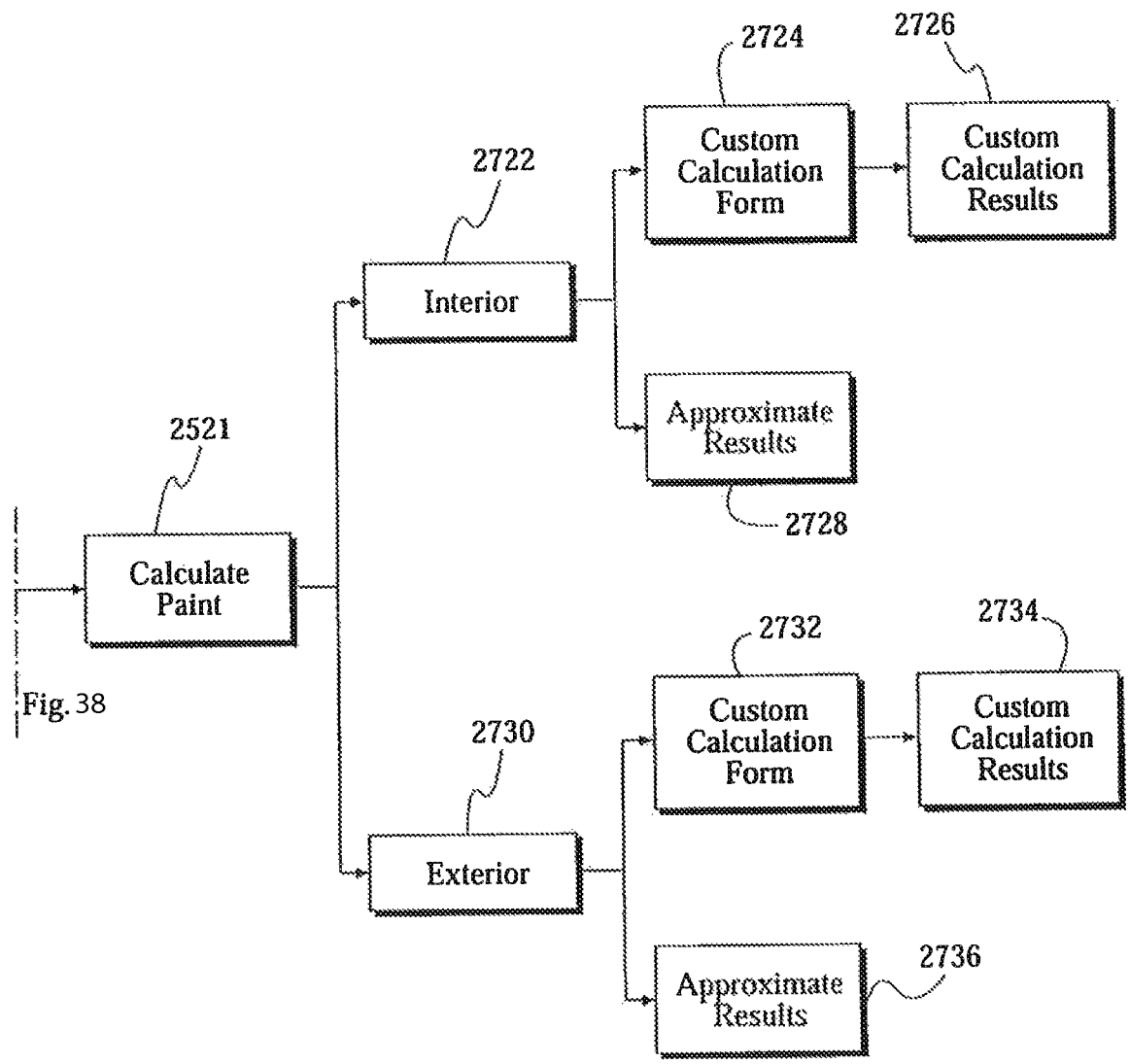
FIG. 41 is a ninth part of the block diagram of a network-based color coordination and selection application according to one implementation of the invention.

Referring now to FIG. 41, if, under the expert advice module 2404, the user has selected the calculate paint option 2518, then interior 2722 and exterior 2730 paint calculation modules would be available. If an interior paint project 2722 is desired, then the user is given the option of a custom calculation 2724 or an approximate calculation 2728. If a custom calculation 2724 is selected, a form is displayed in which the user can enter the dimensions of the room to be painted and a more precise result 2726 is provided. If the user doesn't have exact measurements but just wishes an approximate amount of paint 2728, then such option is also available to the user. Similarly, if the user is further taken an exterior paint project 2730, then the custom calculation 2732 and results 2734 are available if the dimensions are known. Otherwise, an approximate result 2736 of the amount of paint necessary may be provided.

Figure 43:
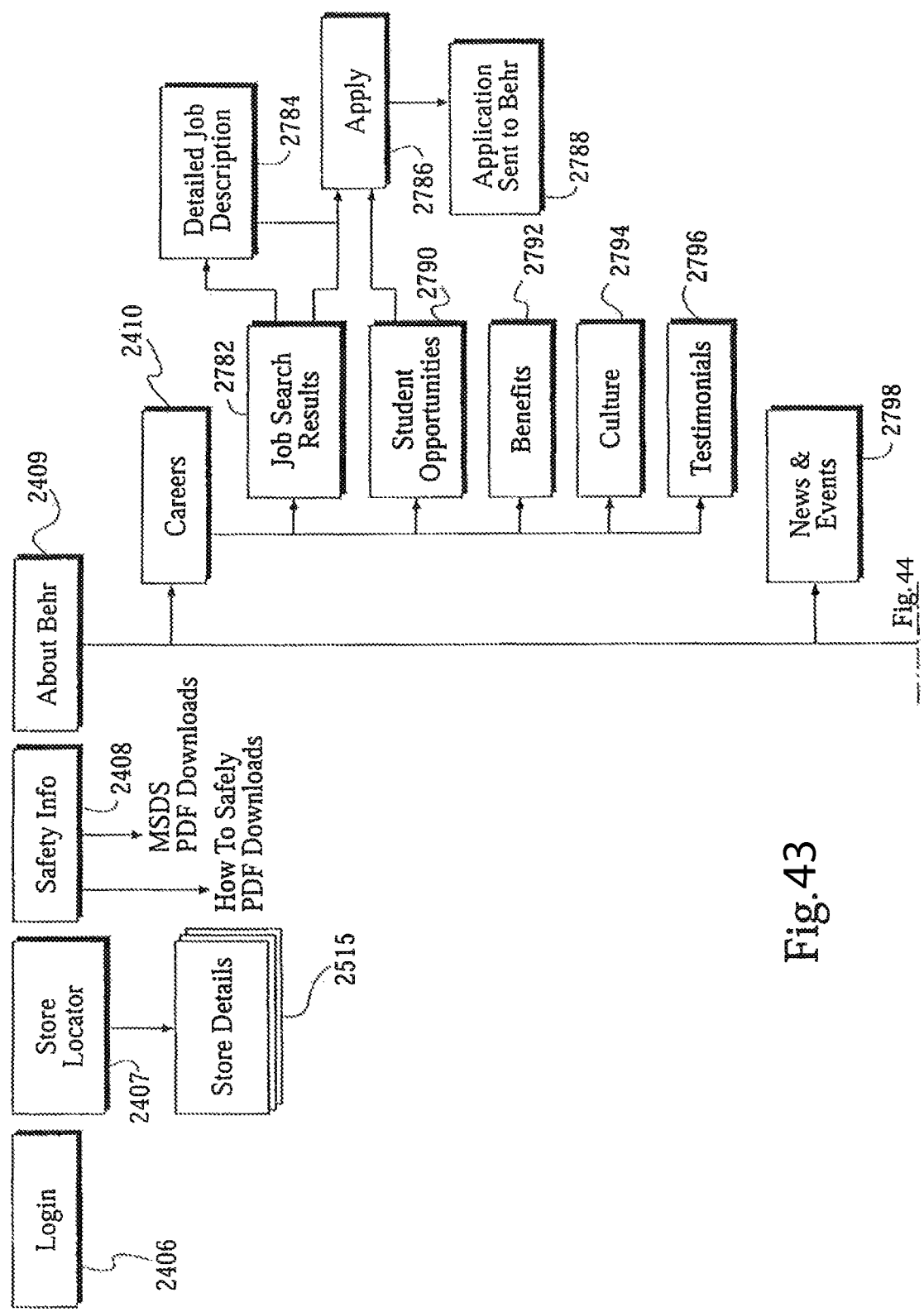
FIG. 43 is an eleventh part of the block diagram of a network-based color coordination and selection application according to one implementation of the invention.

Referring now to FIG. 43, if the user selects the secondary navigation options from the main window 2400, then the user may log into the system 2406 by providing a username and password or may select to search for a new store location. The system may also provide details on how to get a store 2407 and 2515. Safety information 2408 about paints and painting is also available to the user. Additionally, a user may find out more about the particular company 2409, careers within that company 2410, and news and/or events 2798 in that company. The user may also perform a job search 2782, get details on available jobs 2784, and apply for a job 2786 and 2788. Other special categories may also be available such as student opportunities 2790, benefits available 2792, culture of the company 2794, and testimonials about the company 2796.

Figure 44:
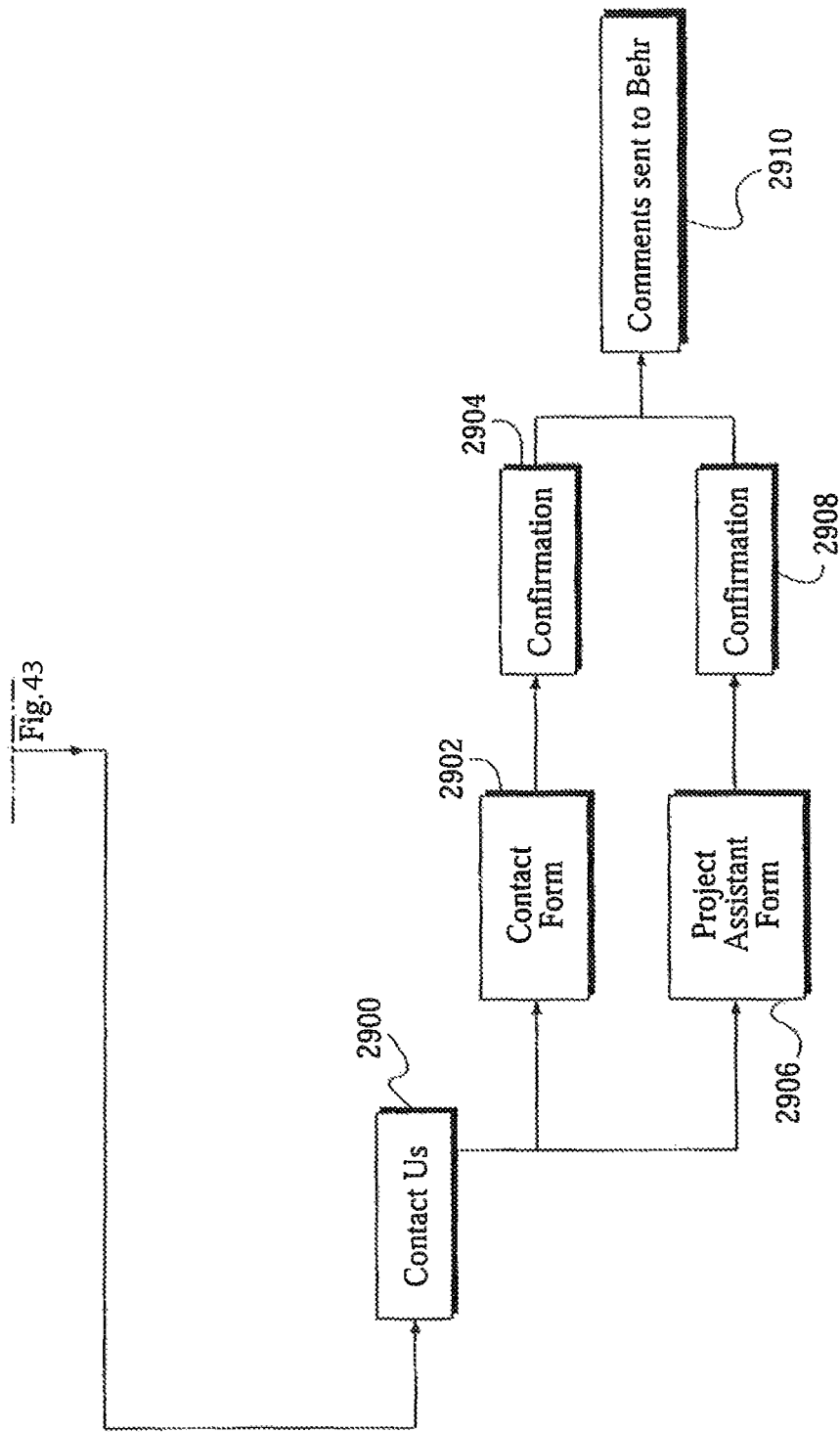
FIG. 44 is a twelfth part of the block diagram of a network-based color coordination and selection application according to one implementation of the invention.
Figure 45:
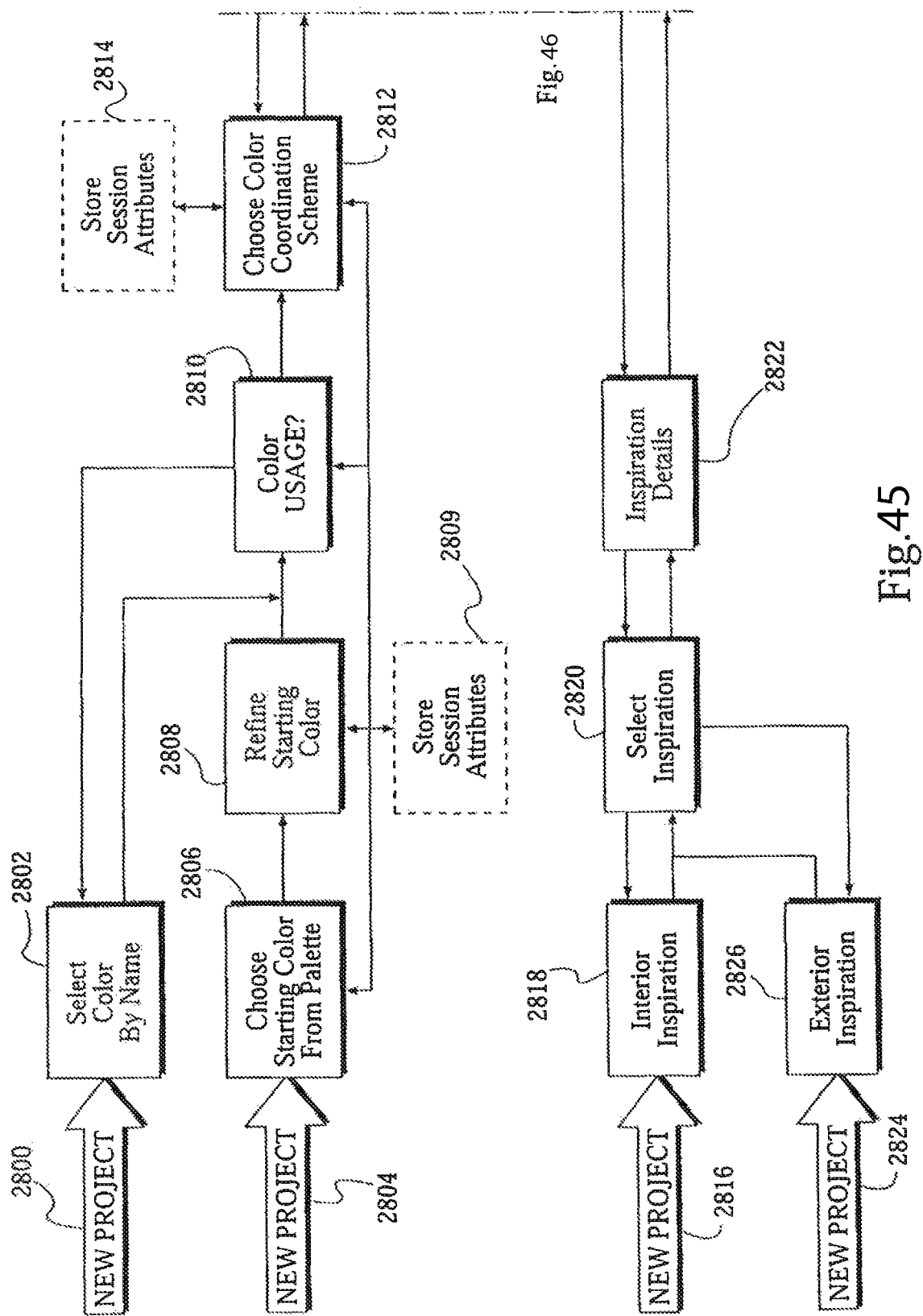
FIG. 45 is a first part of a block diagram illustrating the details of selecting and fine-tuning a paint color over a network-based coordination application according to one implementation of the invention.

Moreover, the system may also provide contact information 2900 (FIG. 44) in order to contact the company. A contact forth may be provided 2902, and a confirmation message 2904 is displayed when the form has been properly submitted 2910. Under contact information 2900, the system may also provide a project assistant form 2906 to aid consumers in performing projects. Once submitted, the system provides a confirmation 2908 that the project assistant form 2906 has been submitted.

FIGS. 45-48 are a block diagram illustrating the details of selecting and fine-tuning a paint color over a network-based coordination application according to one implementation of the invention. A new project may be started by selecting a color name 2802, choosing a starling color for a color pallet 2806 or browsing interior or exterior inspiration options 2818 and 2826.

If a user wishes to select a starting color by name or number 2802 (FIG. 45), the system first requests the purpose or usage of the color 2810, such as bedrooms, bathrooms, and/or kitchen. With this information, the system is then able to provide one or more color coordination schemes from which the user may select one 2812. Each color coordination scheme may include two or more colors that are complementary or somehow aesthetically pleasing when used together.

Figure 46:
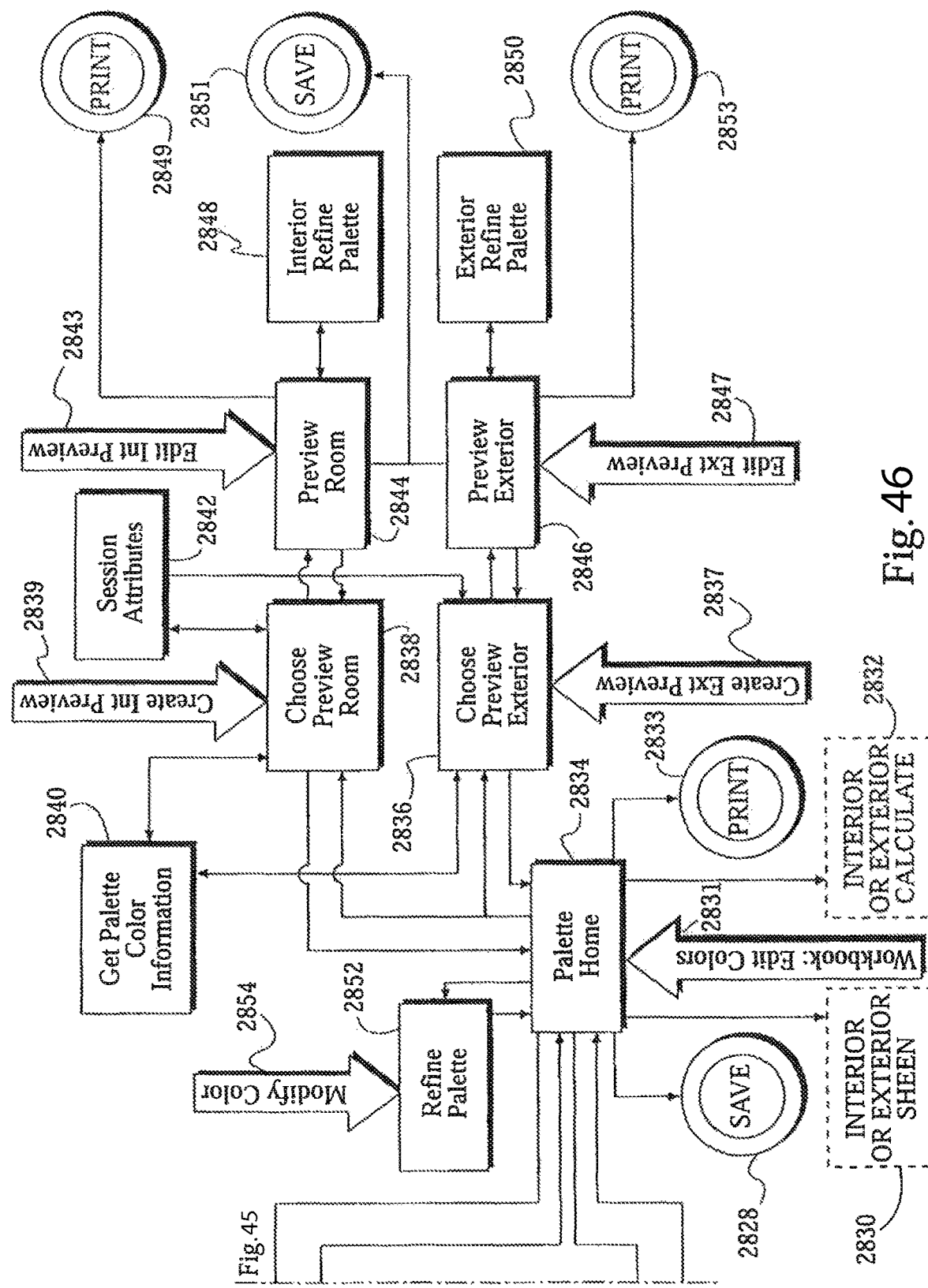
FIG. 46 is a second part of the block diagram illustrating the details of selecting and fine-tuning a paint color over a network-based coordination application according to one implementation of the invention.

If the user selects the starting color from the color pallet 2806, then the starting color may be refined or fine-tuned to a desired starting color 2808. The system also requests usage for the color 2810, and then provides one or more color coordination schemes from which the user selects one 2812. The color coordination scheme information is then stored or maintained under a session attributes module 2814. The selected color scheme may then be viewed and then modified under the color palette home module 2834 (FIG. 46).

From this palette home module 2834, the user may choose to preview a room which is painted a selected color scheme 2838. The system provides the user with the option of selecting a type of room to be previewed 2838 and then displays the room on a screen 2844. The user may then select the colors that are to be placed on one or more of the surfaces of the displayed room and is permitted to refine the colors that are desired 2848. The system may also provide a similar utility for choosing the type of exterior desired 2836, preview the exterior 2846, refine the colors as shown on the surface of the selected exterior 2850. From the preview modules 2844 and 2846, the system allows a user to print out the selected color scheme 2849 and 2853 as seen on the displayed rooms and/or exterior, or save said color scheme and room or exterior 2851. The information may be saved for the project under the session attribute module 2842. From the color scheme home 2834, the user may also refine the colors selected 2852, print the desired color scheme 2833 or save the color scheme 2828.

Referring again to FIG. 45, if the user elects to start by browsing interior or exterior inspirational categories 2818 and 2826, the system provides various categories of inspiration from which the user may select. The system requests that the user to select an inspiration scheme 2820 and then provides details for such inspiration scheme 2822. The system then takes the user to the color scheme palette home 2834 (FIG. 46) from where the color scheme may be previewed or edited or saved as described previously. From the palette home 2834, the user may also modify the sheen of the paint 2830 and/or calculate the amount of paint 2832 necessary for a project.

Figure 47:
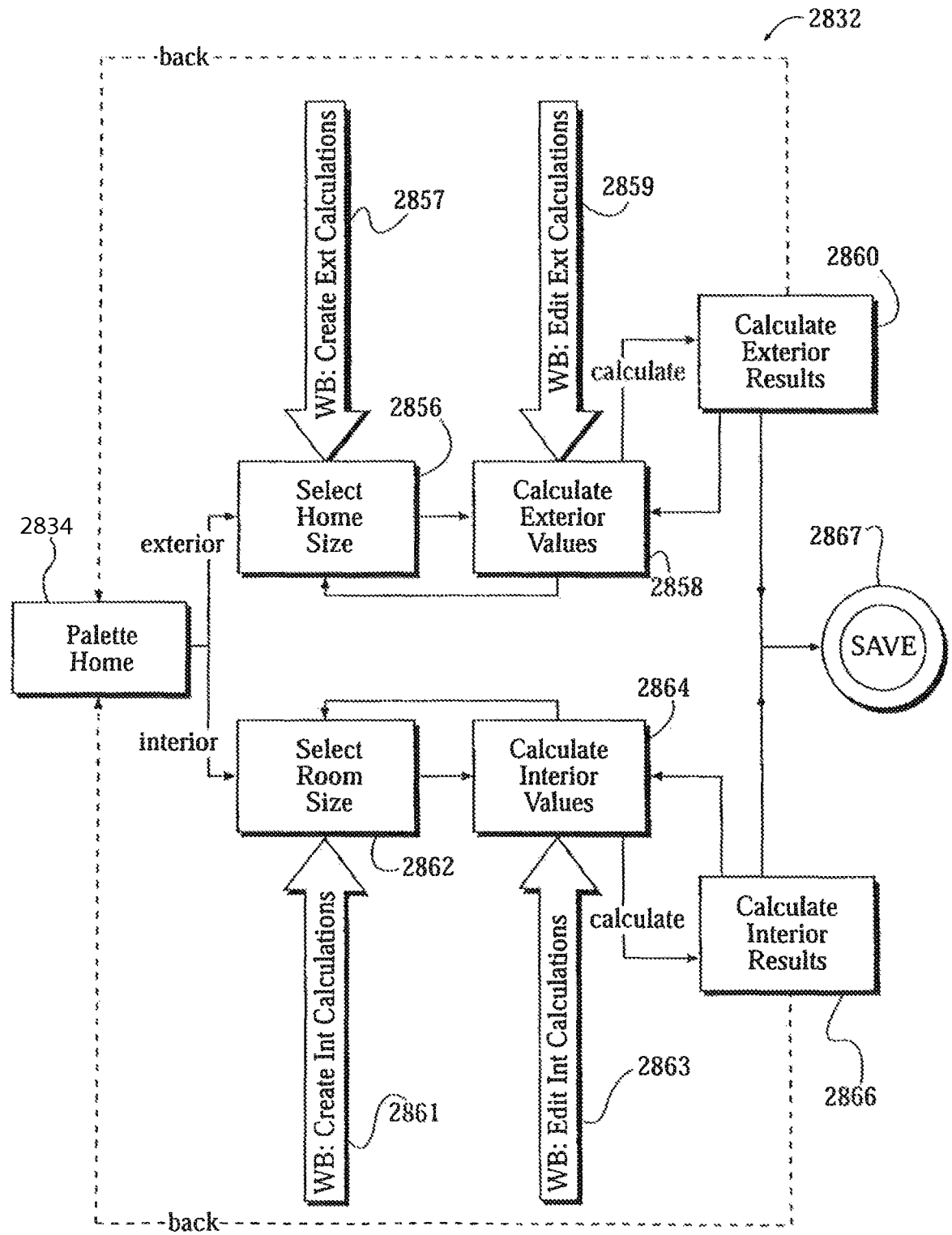
FIG. 47 is a third part of the block diagram illustrating the details of selecting and fine-tuning a paint color over a network-based coordination application according to one implementation of the invention.
Figure 48:
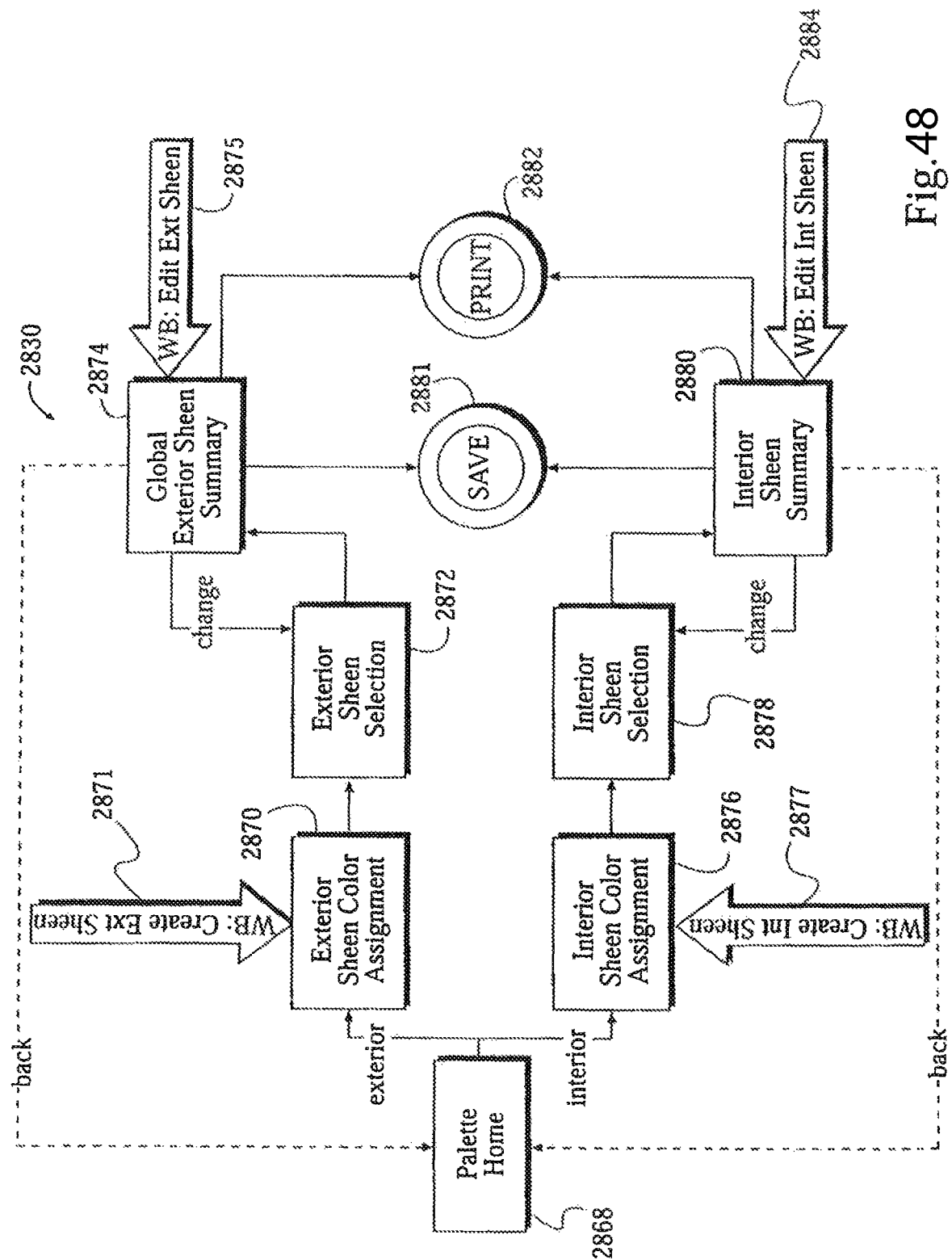
FIG. 48 is a fourth part of the block diagram illustrating the details of selecting and fine-tuning a paint color over a network-based coordination application according to one implementation of the invention.

Referring to FIG. 47, the user is provided a tool by which to calculate the amount of paint 2832 that may be necessary for a room or exterior paint project. If the user is painting an exterior, then the system requests the size of the home 2856, calculates the exterior values 2858, and provides the amount of paint that should be necessary 2860. Where the selected color scheme includes multiple colors, the system may determine the quantities of each paint color that are necessary to perform the particular project. Similarly, if the entire room is being painted, the system may request the user to select the size of the room 2862 and provide other information from which to calculate the amount of paint that is necessary to perform that project 2864 and 2866. A user may save this information 2881 or print it as desired 2882 (FIG. 48).

From the color scheme palette home 2834 (FIG. 46), the user may also select the exterior or interior color sheens that may be desired 2830. For example, as shown in FIG. 48, if an exterior project is being undertaken, the system may assign color sheens 2870 to the different colors of the color scheme. The user may be able to select from these sheens 2872, and this information is then provided in the summary 2874 which can be printed or saved by a user. Similarly, if an interior project is being undertaken, the system may provide the recommended color sheens 2876 (FIG. 48) for the different paint colors, depending on the purpose, etc. The user may then select or edit the recommended sheen colors 2878. This information is then provided in a summary 2880 which can be saved 2881 and printed 2882 by a user.

A help desk feature may also be available with customer support for common paint problems and fixes, FAQ's, a searchable knowledge base and possibly real-time interactive support. As before, the user may be required to enter a user name and password or register in order to access the system. From the login option the user may be led to the menu shown in FIG. 9 and subsequent system components.

According to one embodiment of the invention, while the web site and kiosk applications may include many of the same features, they may have different interfaces. For instance, because the in-store kiosk may be touch-screen driven, buttons are necessarily large and spread out. This may cause functionality to be spread across various screens in the store that would more efficiently be handled on one screen through the web. It is important however that the in-store kiosk and web site resemble each other so that the customer definitely knows they are coming from the same place. To minimize replicated effort, code for access to databases, coordination algorithms, etc., may be shared by the two separate platforms wherever possible.

Though the distributed system illustrated in FIG. 19 has many functional tools, the overall flavor of the system should be friendly and inspirational. Users should be guided through the system step by step, yet have the freedom to use it how they want as well.

A content management feature allows content to be managed with minimal technical skill by persons at various levels of the organization. Rights can be assigned to various content providers and permissions granted according to those rights. For instance, access to product information and/or how-to information may be limited only to those users that have been given permission.

Another aspect of the invention provides tie-ins to promotions and clinics. The faces or entry graphical user interfaces of the kiosk and/or web site can be adjusted to reflect promotions such as discount weekends and inform about various "how-to" clinics upcoming at the local store.

Usage tracking may also be provided for the kiosk and/or web site. The frequency of use, color choices, program usage, walk-aways, etc., can be tracked and analyzed according to region, market, store, feature, etc. This information may be downloaded or sent from a kiosk to a central server for analysis.

Another aspect of the color selection and coordination system provides a data-driven color model to implement the color coordination system according to one embodiment of the invention.

A model encapsulates more than just data and functions that operate on it. A model is meant to serve as a computational approximation or abstraction of some real world process or system. It captures not only the state of a process or system, but how the system works.

In the context of the color coordination system, the color model captures the processes associated with color (e.g., color palette coordination, computing shades and tints, etc.), the state of a user's palettes, and represents the set of colors that comprise the color palette.

In one implementation of the expert color coordinator a real-time color model may be used where coordination of colors, shades and tints are computed in real-time using the principles of color theory. The colors may also be constrained to the limited colors available in the color palette. However, a real-time approach is limited because it doesn't allow for noncolor-theory derived palettes and requires that the color coordination application incorporate and execute the color calculations required to derive the appropriate palettes and corresponding colors every time. Such computationally intensive expert color coordinator may be undesirable in certain situations, such as when implementing the system on a server for Internet users or when processing capabilities are limited.

In another embodiment of the color coordinator, a data-driven color model is implemented in which it isn't necessary to compute color values in real-time because the color palette is composed of a finite set of colors, which, in combination with color-coordinating palettes, shades, and tints, can be pre-calculated and stored in a database. A data-driven color model provides the greatest degree of flexibility and ease of use in implementing an automated color coordination coordinator. A color coordination application need not execute and compute color values in real-time but instead simply query a database. Additionally, this allows for noncolor-theory derived palettes to be incorporated into the color coordinator's color model with no change to the application program design. That is, since the color coordination relationships are defined as data, color coordination relationships from non-color-theory derived palettes may be entered into the database. As those skilled in the art appreciate, such a database comprises computer readable storage apparatus or media, which may include such computer readable storage media as, for example, memories or disks.

Tables 1-7 below illustrate how a data-driven color coordination system may be implemented using various data structures according to one implementation of the invention. Such data-driven color-coordination system may be employed in implementing one embodiment of the expert color coordinator described above. In one implementation of the color coordinator, a color database is maintained which contains every color available to the user.

For each color in the color database, a table or data element (e.g., Table 1) containing the elements shown is generated. The color palette may include both standard colors (e.g., those colors which are part of a paint product line) as well as user-defined colors (e.g., from user color samples, etc.). The fields Color_id and Name serve as color identifiers. The field Source id is a reference to the source in which the color can be located, such as the inspiration library color palette, a user-defined color palette, etc. The field L_value describes the luminosity of the color. The fields A_value and B_value identify the color coordinates for particular color in a three-dimensional color model, C_value identifies the color's chroma, and H_value identifies the color's hue. The fields Next_lighter_id and Next_darker_id identify the color in the database which is lighter and darker, respectively, than the current color. Similarly, the fields Next_chroma_id and Pre_chroma_id identify the color in the database which is more muted and less muted, respectively, than the current color. The fields Next_hue_id and Prev_hue_id identify the colors found in the database which are, respectively, next in the color spectrum or preceding in the color spectrum from the current color. Additionally, one or more fields may integrate human expertise into the color database. For example, the field Is_wall_color_only indicates whether the current color and the field Is_offensive may indicate whether the current color is not well suited as an interior or exterior wall color. Such fields may be based on human experience and aesthetic tastes which may not be reflected using just a color theory.

provide such functionality in a series of buttons that allow the user to indicate what the next color to view. This may be accomplished by specifying relationships between the colors in the color database. These relationships may be specified for each color in the color database using the data structure or table illustrated in Table 1 where the previous and next color for various different characteristics (e.g., L_value, A_value, B_value, C_value, chroma, H_value, Next_lighter_id, Next_darker_id, Next_chroma_id, Prev_chroma_id, Next_hue_id, and Prev_hue_id) are identified. For example, a fine-tuning interface may include a "More Muted" button, which, when pressed, presents the user with a database color that is more muted than the color currently being viewed. Similarly, other buttons, such as "less muted", "lighter", "darker", may be available to refine a color.

The colors in the color database are intended to be displayed on a display screen or printed for the user's convenience. Since many of the display devices (e.g., monitors) and printers employ a combination of a basic colors (e.g., three colors—red, green, and blue) to generate all other colors, having a ready conversion between the colors in the color database and said basic colors would be advantageous

TABLE 1

| Field Name | Description | Type |
| --- | --- | --- |
| Color_id | The primary key for a paint color. This may correspond to a color code in a color sample or swatch (e.g. standard color codes for a paint product line, or a user-provided color sample) | CHAR(6) |
| Name | The display name for this color | VARCHAR(60) |
| Source_id | A reference to the source from which the color can be located (e.g. Color Center, Interior Collection, user-defined color, etc.) | CHAR(6) |
| L_value | The decimal value for the luminosity of the color. | DECIMAL(6,3) |
| A_value | The decimal value for the 'a' coordinate of the color | DECIMAL(6,3) |
| B_value | The decimal value for the 'b' coordinate of the color | DECIMAL(6,3) |
| C_value | The decimal value for the chroma of the color | DECIMAL(6,3) |
| H_value | The decimal value for the hue of the color | DECIMAL(6,3) |
| Next_lighter_id | Foreign Key to a Paint Color that is the corresponding next lighter version of this Paint Color. In most cases this will be the Paint Color whose C_Value and H_Value are the same but whose L_Value is greater. | CHAR(6) |
| Next_darker_id | Foreign Key to a Paint Color that is the corresponding next darker version of this Paint Color. In most cases this will be the Paint Color whose C_Value and H_Value are the same but whose L_Value is less. | CHAR(6) |
| Next_chroma_id | Foreign Key to a corresponding Paint Color that is more muted. In most cases thiss will be the Paint Color whose L_Value and H_Value are the same but whose C_Value is less. | CHAR(6) |
| Prev_chroma_id | Foreign Key to a corresponding Paint Color that is less 'muted'. In most cases this will be the Paint Color whose L_Value and H_Value are the same but whose C_Value is greater. | CHAR(6) |
| Next_hue_id | Foreign Key to a corresponding Paint Color that is next in the color spectrum. In most cases this will be the Paint Color whose L_Value and C_Value are the same but whose H_Value is greater. | CHAR(6) |
| Prev_hue_id | Foreign Key to a corresponding Paint Color that is preceding in the color spectrum. In most cases this will be the Paint Color whose L_Value and C_Value are the same but whose H_Value is less. | CHAR(6) |
| Is_wall_color_only | Boolean value that indicates that this color may only be used as a wall color and not as an accent or trim. | BOOL |
| Is_offensive | Boolean value that indicates that the color is 'offensive' as an interior and/or exterior wall color. | BOOL |

In the color select and coordination system, color refinement is the process of navigating a color palette in a manner that is intuitive to a user. To that end, a fine-tune (refine or modify) color interface (e.g., 1006 or 1018 in FIG. 10) may and expedite processing. For every paint color in the color database, the color coordinator system needs to be able to render a digital equivalent on screen. For example, colors displayed on a display screen may be expressed in terms of red, green, and blue (RGB) values. These RGB values may be stored in a database in a separate table (e.g., Table 3 below) and identified by corresponding kiosk and paint color.

The reason RGB values are not stored directly in the paint color table (e.g., Table 1) is due to the fact that although RGB values can be derived from the values (e.g., L_value, A_value, B_value, C_value, and H_value) stored in the paint color table (e.g., Table 1), they often run the risk of not being visually accurate for every monitor. Various factors impact the visual accuracy of a color expressed on a display monitor such as ambient lighting, temperature, etc. The adjustment of the RGB values to compensate for specific monitors is referred to as calibration.

Calibration is the process of generating a color profile which is used by an application (e.g., the color coordination system) to compute appropriate RGB values for a specific environment (e.g. display monitor, printer, etc.). Unless the color profile changes (as a result of re-calibration), RGB values can be pre-computed and stored in the database for each monitor/paint color combination to prevent the need to evaluate RGB values in real-time. According to one embodiment of the invention, such conversion values (e.g., RGB values) are generated for each color in the database and for each display and/or printing device that may be attached to a kiosk.

Table 2 illustrates how calibration or conversion data values may be arranged and stored in a conversion table for each color in the color database. Such conversion or calibration tables represent a unique color profile for the devices in the kiosk (e.g., printer, display device, etc.). The field Color_id identifies the color in the database to which the conversion data applies. The field Kiosk_id identifies the kiosk device (e.g., display device, printing device, etc.) to which the conversion data applies. According to one embodiment of the invention, three basic colors are used to generate all other colors in the color database. For example, the colors red, green, and blue are used in the data structure illustrated in Table 2. The fields R_value, G_value, and B_value provide the amount of red, green, and blue, respectively, that should be mixed to generate the corresponding color in the color database. In other implementations of the invention, more or fewer basic colors may be used without deviating from the invention.

TABLE 2

| Field Name | Description | Type |
| --- | --- | --- |
| Color_id | Foreign Key to a corresponding Paint Color | CHAR(6) |
| Kiosk_id | Foreign Key to a corresponding Kiosk Element | CHAR(6) |
| R_value | The decimal value for the RED component of the corresponding Paint Color. | Decimal (6,3) |
| G_value | The decimal value for the GREEN component of the corresponding Paint Color. | Decimal (6,3) |
| B_value | The decimal value for the BLUE component of the corresponding Paint Color. | Decimal (6,3) |

Another aspect of the data-driven color model provides a data structure or table (e.g., Table 3) for color palettes. A color palette may be defined as a combination of grouped colors. Palettes may be generated according to and grouped into schemes. For example, color palettes for Monochromatic, Complementary, Warm, and Cool color schemes may be stored. Additionally, custom schemes may be generated and stored by users or others.

In one embodiment of the invention, a palette may be represented as a data structure in which each paint color in the palette is identified with a corresponding surface/location to be painted.

For example, Table 3 illustrates a data structure of a paint color palette according to one embodiment of the data-drive color model invention. The field Palette_id provides a unique identifier for the palette. The field Display_name identifies the palette by a name that may be displayed to the user of the color selection and coordination system. The fields Wall_color_id, Accent_color_id, and Trim_color_id, identifies the colors that may be used along the walls, accent surfaces, and trims, respectively. The field White_color_id identifies the white color that may be used along with the other colors in the palette.

TABLE 3

| Field Name | Description | Type |
| --- | --- | --- |
| Palette_id | The Primary Key for the Palette | CHAR(6) |
| Display_name | The display name for the palette | VARCHAR(60) |
| Wall_color_id | Foreign Key to a corresponding Paint Color that will be the wall color. | CHAR(6) |
| Accent_color_id | Foreign Key to a corresponding Paint Color that will be the accent color. | CHAR(6) |
| Trim_color_id | Foreign Key to a corresponding Paint Color that will be the trim color. | CHAR(6) |
| White_color_id | Foreign Key to a corresponding Paint Color that will be the white color. | CHAR(6) |

According to one implementation of the color coordinator, once the user has selected a starting or core color, the color coordinator accesses the color database and provides a plurality of color combinations. In various embodiments of the invention, a color combination is a coordinating color combination that may be dynamically determined or predetermined. For example, four color schemes may be provided to the user. Each of the four color schemes or palettes may be related to a separate color coordination algorithm. Tables 4-7 illustrate four color palettes that may be provided to the user.

Table 4 illustrates a monochromatic scheme in which colors selected for the Trim and Alternate Trim colors are a tint or shade of the core or starting color. The Accent and Alternate Accent colors are analogous colors (slightly different hue angle but belonging to the same general color area in color space) of equal value (chroma, depth). The White color is a white color of similar hue as the core color.

TABLE 4

| Term | Description |
| --- | --- |
| Core Color | The color the user has chosen to coordinate around. |
| Trim | If core is dark, tint of color. If the core is light, then it's a shade of the core. |
| Accent | Analogous color of equal value (chroma, depth) |
| White | White of similar hue as core |
| Alt Trim | Shade or tint of core |
| Alt accent | Analogous color of equal value on the opposite side of core than the accent |

Table 5 illustrates a complementary color scheme in which complementary colors are those colors approximately one hundred eighty (180) degrees from the core or starting color. The Trim color is a complementary color of equal value to the core color and the Alternate Trim color is a color which is a shade or tint of the complementary color of the core color. The Accent color is a color that is a tint or shade of the core color and the Alternate Ascent color is a color that is a tint or shade of the core color with more contrast. The White color is a white color of similar hue as the core color.

TABLE 5

| Term | Description |
| --- | --- |
| Core Color | The color the user has chosen to coordinate around. |
| Trim | Complement of equal value. |
| Accent | Tint or shade of core color (If light, then dark, if dark, then light) |
| White | White of similar hue as the core color |
| Alt Trim | Shade or tint of complement |
| Alt Accent | Tint or shade of core color with more contract |

Table 6 illustrates a warm triad scheme in which the colors are approximately 120 degree from the core color (on warm side of the hue). The Trim color is a Triad color (on warm side of hue) of equal value and the Alternate Trim is a color which is a shade or tint of the triad (on warm side of hue). The Accent color is a color a tint or shade of core color and the Alternate Accent color is a tint or shade of the core color with more contrast. The White color is a white color of similar hue as the core color.

TABLE 6

| Term | Description |
| --- | --- |
| Core Color | The color the user has chosen to coordinate around. |
| Trim | Triad (on warm side of hue) of equal value |
| Accent | Tint or shade of core color (If light, then dark, if dark, then light) |
| White | White of similar hue as the core color |
| Alt Trim | Tint or shade of triad (on warm side of hue) |
| Alt Accent | Tint or shade of core with more contract |

Table 7 illustrates a cool triad scheme in which the colors are approximately one hundred twenty (120) degrees from the core color (on cool side of the hue). The Trim color is a Triad color (on cool side of hue) of equal value and the Alternate Trim is a color which is a shade or tint of the triad (on cool side of hue). The Accent color is a color that is a tint or shade of core color and the Alternate Ascent is a color that is a tint or shade of the core color with more contrast. The White color is a white color of similar hue as the core color.

TABLE 7

| Term | Description |
| --- | --- |
| Core Color | The color the user has chosen to coordinate around. |
| Trim | Triad (on cool side of hue) of equal value |
| Accent | Tint or shade of core color (If light, then dark, if dark, then light) |
| White | White of similar hue as the core color |
| Alt Trim | Tint or shade of triad (on cool side of hue) |
| Alt Accent | Tint or shade of core with more contract |

Another aspect of the invention provides for generating the necessary color metrics (e.g., in Table 1, L_value, A_value, B_value, C_value_chroma, H_value, Next_lighter id, Next_darker_id, Next_chroma_id, Prev_chroma_id, Next_hue_id, and Prev_hue_id) for a color provided by the user, for instance, via a spectrophotometer. Thus, a user may add colors to the color database and color palette.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A system comprising:
a remote computing device having a display device and an input device; and
a database communicatively coupled to the remote computing device, the database including a plurality of paint colors;
wherein the remote computing device is configured to receive a starting paint color selected from the plurality of paint colors via the input device, to determine a first plurality of coordinating paint colors for the starting paint color based on data received from the database, to display on the display device a first color palette including the starting paint color and the first plurality of coordinating paint colors, to receive input, via the input device, for fine-tuning the starting paint color to achieve a second paint color, to determine a second plurality of coordinating paint colors for the second paint color based on data received from the database, and to display a second color palette including the second paint color and the second plurality of coordinating paint colors, wherein the input for fine-tuning the starting paint color includes input for changing at least one of a tint and a shade of the starting paint color, wherein the remote computing device is configured to display on the display device product information for at least one of the starting paint color and the second paint color, wherein the remote computing device is configured to store at least one of the first color palette and the second color palette with user identification information on a server communicatively coupled to the remote computing device for subsequent retrieval using the user identification information, and wherein the remote computing device is configured to display a tutorial option that includes at least one video demonstration with how-to instructions for a painting project, to receive a selection for a video demonstration from the at least one video demonstration, and to play the selected video demonstration on the display device.

2. The system of claim 1 wherein the remote computing device is configured to display inspirational content including at least one inspirational color palette with a plurality of preselected paint colors from the plurality of paint colors and to receive a selection from the plurality of paint colors.

3. The system of claim 1 wherein the input device of the remote computing device includes a touch screen.

4. The system of claim 1 wherein the product information includes at least one of a color name, a number, and a code.

5. The system of claim 1 wherein the remote computing device is further configured to display on the display device product information for at least one paint color selected from the first plurality of coordinating paint colors and the second plurality of coordinating paint colors for use by a consumer when purchasing paint, the product information including at least one of a color name, a number, and a code for the at least one selected paint color.

6. The system of claim 5 wherein the consumer purchases paint corresponding to the at least one selected paint color.

7. The system of claim 5 wherein the remote computing device is accessible to the consumer while the consumer is at a store for purchasing paint.

8. The system of claim 5 further comprising a printer connected to the remote computing device, wherein the remote computing device is configured to print with the printer the product information for the at least one selected paint color.

9. A method comprising:
receiving, with an input device of a remote computing device, a selection for a starting paint color from a plurality of paint colors, the remote computing device being communicatively coupled to a database including the plurality of paint colors;
determining, with the remote computing device, a first plurality of coordinating paint colors for the starting paint color based on data received from the database;
displaying, with a display device of the remote computing device, a first color palette including the starting paint color and the first plurality of coordinating paint colors;
receiving, with the input device of the remote computing device, input for fine-tuning the starting paint color to achieve a second paint color, the input for fine-tuning the starting paint color including input for changing at least one of a tint and a shade of the starting paint color;
determining, with the remote computing device, a second plurality of coordinating paint colors for the second paint color based on data received from the database;
displaying, with the display device of the remote computing device, a second color palette including the second paint color and the second plurality of coordinating paint colors;
displaying, with the display device of the remote computing device, product information for at least one of the starting paint color and the second paint color;
storing, with the remote computing device, at least one of the first color palette and the second color palette with user identification information on a server communicatively coupled to the remote computing device for subsequent retrieval using the user identification information;
displaying, with the display device of the remote computing device, a tutorial option that includes at least one video demonstration with how-to instruction for a painting project;
receiving, with the input device of the remote computing device, a selection from the plurality of paint colors.

10. The method of claim 9 further comprising:
displaying, with the display device of the remote computing device, inspirational content including at least one inspirational color palette with a plurality of preselected paint colors from the plurality of paint colors; and
receiving, with the input device of the remote computing device, a selection from the plurality of paint colors.

11. The method of claim 9 wherein the input device of the remote computing device includes a touch screen.

12. The method of claim 9, wherein the product information includes at least one of a color name, a number, and a code.

13. The method of claim 9 further comprising displaying, with the display device of the remote computing device, product information for at least one paint color selected from the first plurality of coordinating paint colors and the second plurality of coordinating paint colors for use by a consumer when purchasing paint, the product information including at least one of a color name, a number, and a code for the at least one selected paint color.

14. The method of claim 13 wherein the consumer purchasers paint corresponding to the at least one selected paint color.

15. The method of claim 13 wherein the remote computing device is accessible to the consumer while the consumer is at a store for purchasing paint.

16. The method of claim 13 further comprising printing, with a printer connected to the remote computing device, the product information for the at least one selected paint color.

17. A system comprising:
a server communicatively coupled to a remote computing device having a display device and an input device;
wherein the remote computing device is configured to receive a starting paint color selected from a plurality of paint colors via the input device, to determine a first plurality of coordinating paint colors for the starting paint color based on data received from a database, to display on the display device a first color palette including the starting paint color and the first plurality of coordinating paint colors, to receive input, via the input device, for fine-tuning the starting paint color to achieve a second paint color, to determine a second plurality of coordinating paint colors for the second paint color based on data received from the database, and to display a second color palette including the second paint color and the second plurality of coordinating paint colors, wherein the input for fine-tuning the starting paint color includes input for changing at least one of a tint and a shade of the starting paint color, wherein the remote computing device is configured to display on the display device product information for at least one of the starting paint color and the second paint color, wherein the remote computing device is configured to store at least one of the first color palette and the second color palette with user identification information on the server for subsequent retrieval using the user identification information, and wherein the remote computing device is configured to display at tutorial option that includes at least one video demonstration with how-to instructions for a painting project, to receive a selection for a video demonstration from the at least one video demonstration, and to play the selected video demonstration on the display device.

18. The system of claim 17 wherein the remote computing device is configured to display inspirational content including at least one inspirational color palette with a plurality of preselected paint colors from the plurality of paint colors and to receive a selection from the plurality of paint colors.

19. The system of claim 17 wherein the input device of the remote computing device includes a touch screen.

20. The system of claim 17 wherein the product information includes at least one of a color name, a number, and a code.

21. The system of claim 17 wherein the remote computing device is further configured to display on the display device product information for at least one paint color selected from the first plurality of coordinating paint colors and the second plurality of coordinating paint colors for use by a consumer when purchasing paint, the product information including at least one of a color name, a number, and a code for the at least one selected paint color.

22. The system of claim 21 wherein the consumer purchases paint corresponding to the at least one selected paint color.

23. The system of claim 21 wherein the remote computing device is accessible to the consumer while the consumer is at a store for purchasing paint.

24. The system of claim 21 further comprising a printer connected to the remote computing device, wherein the remote computing device is configured to print with the printer the product information for the at least one selected paint color.

25. A system comprising:
  a server configured to provide an application to a remote computing device, the application being configured to enable the remote computing device to:
    receive a starting paint color selected from a plurality of paint colors via the input device;
    determine a first plurality of coordinating paint colors for the starting paint color based on data received from a database;
    display on the display device a first color palette including the starting paint color and the first plurality of coordinating paint colors;
    receive input, via the input device, for fine-tuning the starting paint color to achieve a second paint color;
    determine a second plurality of coordinating paint colors for the second paint color based on data received from the database;
    display a second color palette including the second paint color and the second plurality of coordinating paint colors, the input for fine-tuning the starting paint color including input for changing at least one of a tint and a shade of the starting paint color;
    display on the display device product information for at least one of the starting paint color and the second paint color;
    store at least one of the first color palette and the second color palette with user identification information on the server for subsequent retrieval using the user identification information;
    display a tutorial option that includes at least one video demonstration with how-to instructions for a painting product;
    receive a selection for a video demonstration from the at least one video demonstration;
    play the selected video demonstration on the display device;
    display inspirational content including at least one inspirational color palette with a plurality of preselected paint colors from the plurality of paint colors; and
    receive a selection from the plurality of paint colors.

26. The system of claim 25 wherein the input device of the remote computing device includes a touch screen.

27. The system of claim 25 wherein the remote computing device is further configured to display on the display device product information for at least one paint color selected from the first plurality of coordinating paint colors and the second plurality of coordinating paint colors for use by a consumer when purchasing paint, the product information including at least one of a color name, a number, and a code for the at least one selected paint color.

28. The system of claim 25 wherein the remote computing device is further configured to display on the display device product information for at least one paint color selected from the first plurality of coordinating paint colors and the second plurality of coordinating paint colors for use by a consumer when purchasing paint, the product information including at least one of a color name, a number, and a code for the at least one selected paint color.

29. The system of claim 25 wherein the remote computing device is accessible to the consumer while the consumer is at a store for purchasing paint.

\* \* \* \* \*